(12) United States Patent
Jung et al.

(10) Patent No.: US 10,608,329 B2
(45) Date of Patent: Mar. 31, 2020

(54) ELECTRONIC DEVICE INCLUDING ANTENNA DEVICE

(71) Applicant: Samsung Electronics Co., Ltd., Gyeonggi-do (KR)

(72) Inventors: Jinwoo Jung, Seoul (KR); Taeyoung Kim, Gyeonggi-do (KR); Inyoung Lee, Gyeonggi-do (KR); Wonseok Jeong, Gyeonggi-do (KR); Jae-Bong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/845,703

(22) Filed: Dec. 18, 2017

(65) Prior Publication Data

US 2018/0123224 A1 May 3, 2018

Related U.S. Application Data

(63) Continuation of application No. 15/234,708, filed on Aug. 11, 2016, now Pat. No. 9,859,612.

(30) Foreign Application Priority Data

Aug. 12, 2015 (KR) .................. 10-2015-0114141

(51) Int. Cl.
 *H01Q 1/32* (2006.01)
 *H01Q 1/27* (2006.01)
 (Continued)

(52) U.S. Cl.
 CPC .............. *H01Q 1/273* (2013.01); *H01Q 1/38* (2013.01); *H01Q 1/48* (2013.01); *H04B 5/0031* (2013.01); *H04W 4/80* (2018.02); *H01Q 9/42* (2013.01)

(58) Field of Classification Search
 CPC ............ H01Q 1/12; H01Q 1/273; H01Q 1/38; H01Q 1/48; H04B 5/0031
 (Continued)

(56) References Cited

U.S. PATENT DOCUMENTS

| 5,886,669 | A | 3/1999 | Kite |
| 7,215,600 | B1 | 5/2007 | DeRosa |

(Continued)

FOREIGN PATENT DOCUMENTS

| EP | 2 405 534 | 1/2012 |
| EP | 2 824 764 | 1/2015 |

(Continued)

OTHER PUBLICATIONS

European Search Report dated Jun. 11, 2018 issued in counterpart application No. 16835466.0-1205, 9 pages.

(Continued)

*Primary Examiner* — Huedung X Mancuso
(74) *Attorney, Agent, or Firm* — The Farrell Law Firm, P.C.

(57) ABSTRACT

A device is provided. The device includes a housing forming at least one portion of a surface of the device, wherein the at least one portion of the surface includes first and second surfaces facing opposite to each other; a display at least partially housed in the housing and including a display area visible via at least one portion of the first surface; a substantially circular radiating element at least partially forming the first surface; a ground element between the first and second surfaces; a conductive element below the ground element; wireless communication circuitry electrically connected with the radiating element and establishing communication with an external electronic device; and a processor electrically connecting the conductive element with the ground element if a radiation characteristic relative to the (Continued)

radiating element satisfies a condition; and disconnecting the conductive element with the ground element if the radiation characteristic does not satisfy the condition.

19 Claims, 31 Drawing Sheets

(51) Int. Cl.
*H01Q 1/48* (2006.01)
*H04B 5/00* (2006.01)
*H01Q 1/38* (2006.01)
*H04W 4/80* (2018.01)
*H01Q 9/42* (2006.01)

(58) Field of Classification Search
USPC .......................................................... 343/718
See application file for complete search history.

(56) References Cited

U.S. PATENT DOCUMENTS

| | | | |
|---|---|---|---|
| 7,903,034 B2 | 3/2011 | Anguera et al. | |
| 8,982,000 B2 | 3/2015 | Kim | |
| 9,680,204 B2 | 6/2017 | Aoki | |
| 2008/0055164 A1* | 3/2008 | Zhang | H01Q 1/243 343/702 |
| 2008/0106478 A1* | 5/2008 | Hill | H01Q 1/243 343/702 |
| 2008/0165064 A1* | 7/2008 | Hill | H01Q 1/243 343/702 |
| 2008/0316116 A1* | 12/2008 | Hobson | H01Q 1/243 343/702 |
| 2010/0112964 A1 | 5/2010 | Yi et al. | |
| 2011/0012796 A1 | 1/2011 | Kim et al. | |
| 2012/0009983 A1* | 1/2012 | Mow | H01Q 1/243 455/575.7 |
| 2012/0076184 A1 | 3/2012 | Tran et al. | |
| 2012/0262343 A1* | 10/2012 | Radojkovic | H01Q 1/48 343/702 |
| 2013/0016016 A1 | 1/2013 | Lin | |
| 2013/0109435 A1 | 5/2013 | McCaughey et al. | |
| 2013/0181873 A1 | 7/2013 | Gutschenritter et al. | |
| 2013/0265199 A1 | 10/2013 | Koskiniemi et al. | |
| 2014/0055309 A1 | 2/2014 | Jenwatanavet | |
| 2014/0162734 A1 | 6/2014 | Shewan et al. | |
| 2014/0354494 A1 | 12/2014 | Katz | |
| 2015/0048979 A1 | 2/2015 | Asrani et al. | |
| 2015/0062844 A1 | 3/2015 | Bae et al. | |
| 2015/0244063 A1* | 8/2015 | Sowpati | H01Q 1/243 343/702 |
| 2016/0173185 A1 | 6/2016 | Kang et al. | |

FOREIGN PATENT DOCUMENTS

| | | |
|---|---|---|
| KR | 10-2010-0050028 | 5/2010 |
| KR | 10-2015-0012644 | 2/2015 |

OTHER PUBLICATIONS

International Search Report dated Nov. 22, 2016 issued in counterpart application No. PCT/KR2016/008863, 7 pages.
European Search Report dated Apr. 2, 2019 issued in counterpart application No. 16835466.0-1205, 9 pages.
European Search Report dated Dec. 17, 2019 issued in counterpart application No. 16835466.0-1205, 6 pages.

* cited by examiner

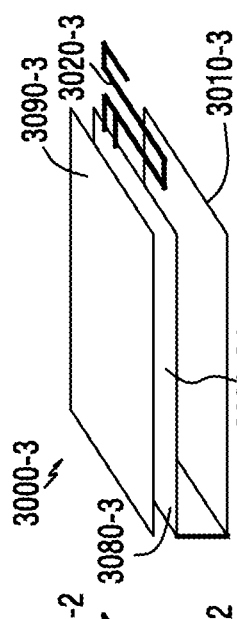
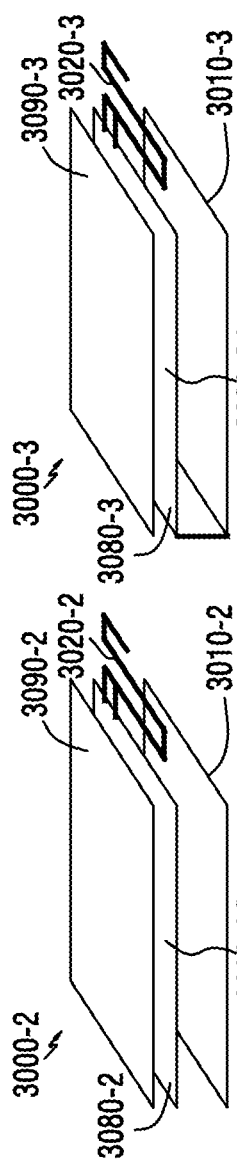
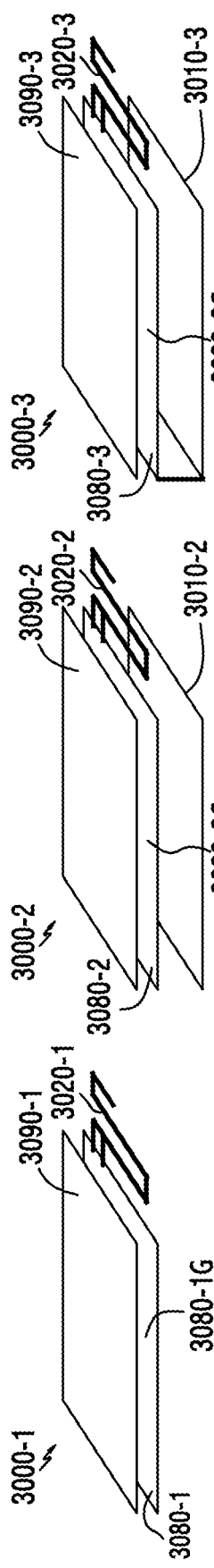
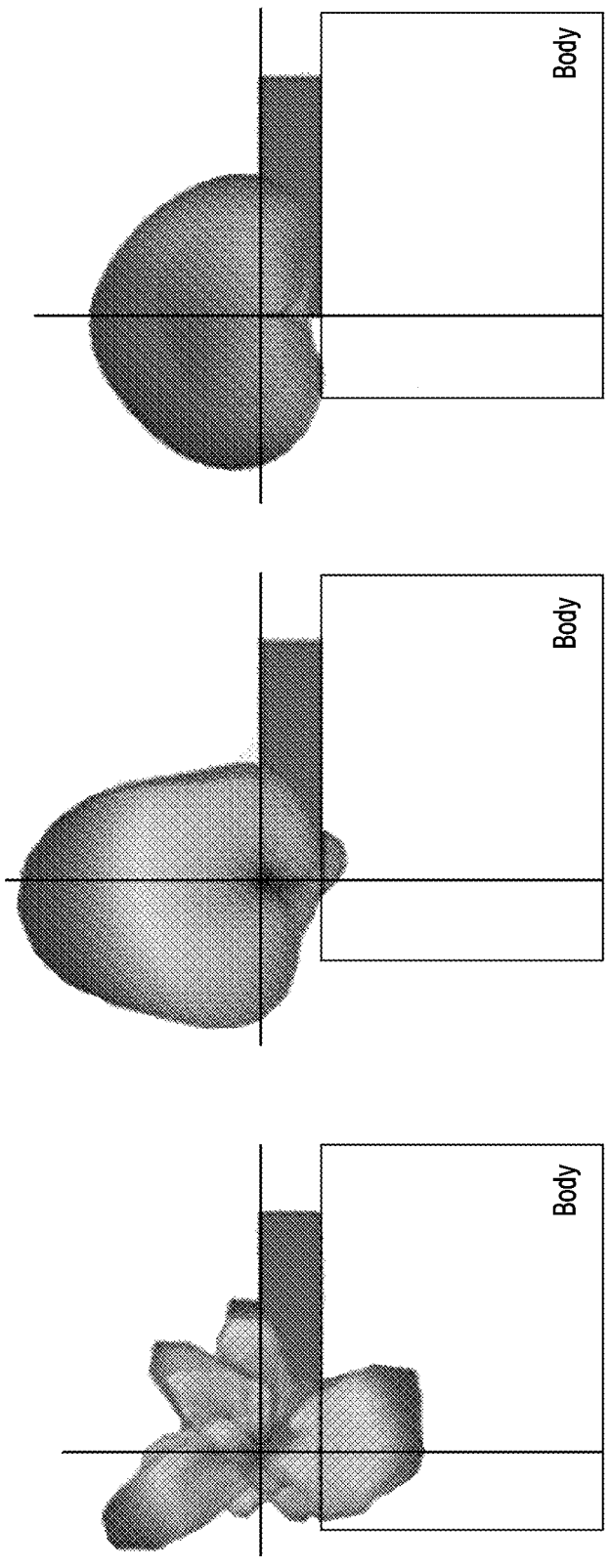

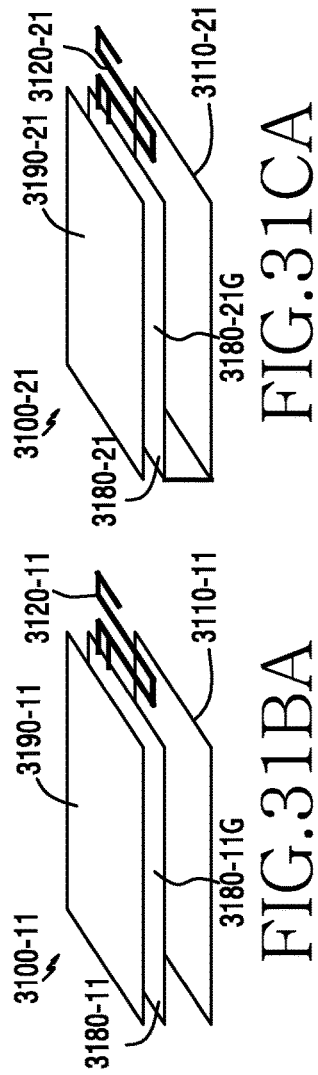
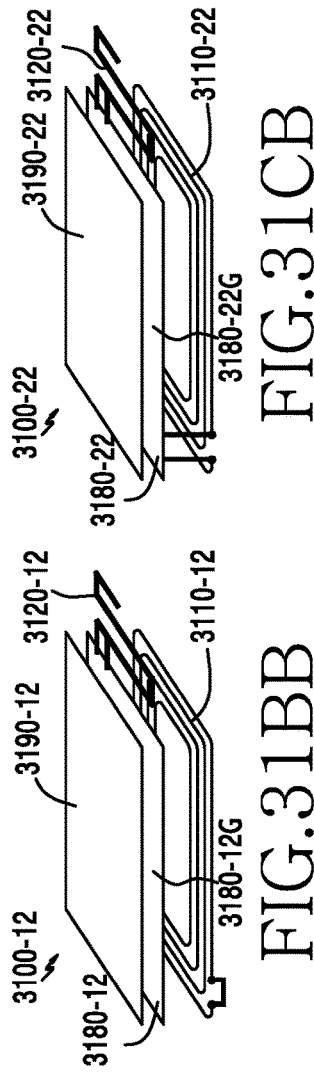
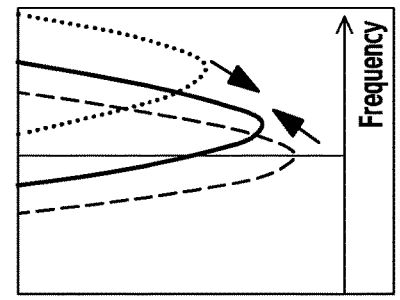
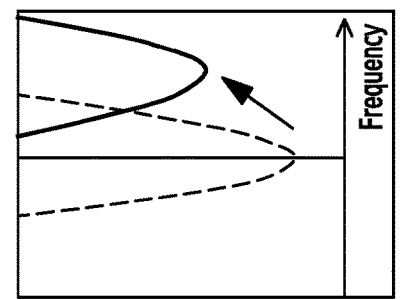
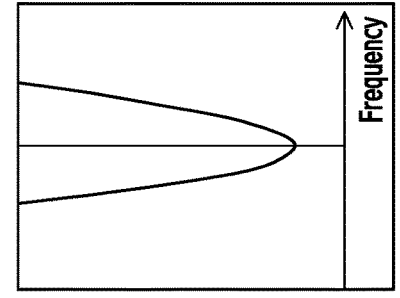

ELECTRONIC DEVICE INCLUDING ANTENNA DEVICE

PRIORITY

This continuation application claims priority under 35 U.S.C. § 120 to a U.S. patent application filed on Aug. 11, 2016 in the United States Patent and Trademark Office and assigned Ser. No. 15/234,708, which claimed priority under 35 U.S.C. § 119(a) to a Korean Patent Application filed on Aug. 12, 2015 in the Korean Intellectual Property Office and assigned Serial No. 10-2015-0114141, the entire contents of each of which is incorporated herein by reference.

BACKGROUND

1. Field of the Disclosure

The present disclosure relates generally to an electronic device that includes an antenna device in order to secure an antenna performance, and more particularly, to an electronic device that includes an antenna device that reduces deteriorative effects of a human body on antenna performance.

2. Description of the Related Art

An electronic device may be equipped with one or more antenna devices that are suitable for a position tracking system, wireless Internet, and an overseas roaming service, respectively. As the thickness of such an electronic device is reduced and the number of components incorporated for multiple functions increases, it may be difficult to secure an antenna performance, which is an important factor for wireless mobile communication.

If an antenna is mounted close to a human body, as in the case of a thin user device, where the mounting space for the antenna is insufficient, the performance of the antenna may deteriorate due to the human body. In the case of a wearable device worn by a user, deterioration of antenna performance may also be caused by the user's body.

SUMMARY

An aspect of the present disclosure provides an electronic device to secure an antenna performance through the restriction of the size of an electronic device having a wireless communication function or by reducing the deteriorative effects caused by a user's body.

Another aspect of the present disclosure provides an electronic device that may reduce the deteriorative effects of a human body on antenna performance.

Another aspect of the present disclosure provides an electronic device that may reduce the influence of electromagnetic waves on a user's body.

Another aspect of the present disclosure provides an electronic device that may provide various designs by solving a spatial restriction.

According to an aspect of the present disclosure, a portable communication device is provided. The portable communication device includes a housing forming at least one portion of a surface of the portable communication device, wherein the at least one portion of the surface includes a first surface and a second surface that faces in a direction opposite to the first surface; a display at least partially housed in the housing and including a display area visible via at least one portion of the first surface; a radiating element at least partially forming the first surface, wherein the radiating element has a substantially circular shape; a ground element disposed between the first surface and the second surface; a conductive element disposed below the ground element; wireless communication circuitry electrically connected with the radiating element and configured to establish a communication connection with an external electronic device; and a processor configured to electrically connect the conductive element with the ground element if a radiation characteristic relative to the radiating element satisfies a specified condition; and electrically disconnect the conductive element with the ground element if the radiation characteristic does not satisfy the specified condition.

According to another aspect of the present disclosure, a portable communication device is provided. The portable communication device includes a housing configured to form at least one portion of a surface of the portable communication device, wherein the at least one portion of the surface includes a first surface and a second surface that faces in a direction opposite to the first surface; a display at least partially housed in the housing and including a display area visible via at least one portion of the first surface; a radiating element at least partially forming at least one portion of the first surface; a printed circuit board (PCB) disposed below the display and including a ground element; a conductive element disposed below the PCB; a processor configured to transmit a control signal; and a switch configured to selectively electrically connect the conductive element with the ground element based at least in part on the control signal.

According to another aspect of the present disclosure, a wearable electronic device is provided. The wearable electronic device includes a display including a display area visible via at least one portion of a front surface of the wearable electronic device; a radiating element at least partially surrounding the at least one portion of the front surface; a PCB disposed below the display and including a ground element; a conductive element disposed below the PCB and electrically connected with the radiating element; a processor configured to transmit a control signal; and a switch adapted to selectively electrically connect the conductive element with the ground element based at least in part on the control signal.

BRIEF DESCRIPTION OF THE DRAWINGS

The above and other aspects, features, and advantages of the present disclosure will be more apparent from the following detailed description, taken in conjunction with the accompanying drawings, in which:

FIGS. 30AA to 30CB illustrate an influence by a human body depending on whether a conductive member is used according to embodiments of the present disclosure; and FIGS. 31AA to 31CC are views and diagrams of maintaining an antenna performance by using a conductive member according to embodiments of the present disclosure.

DETAILED DESCRIPTION OF EMBODIMENTS OF THE PRESENT DISCLOSURE

Figure 1:
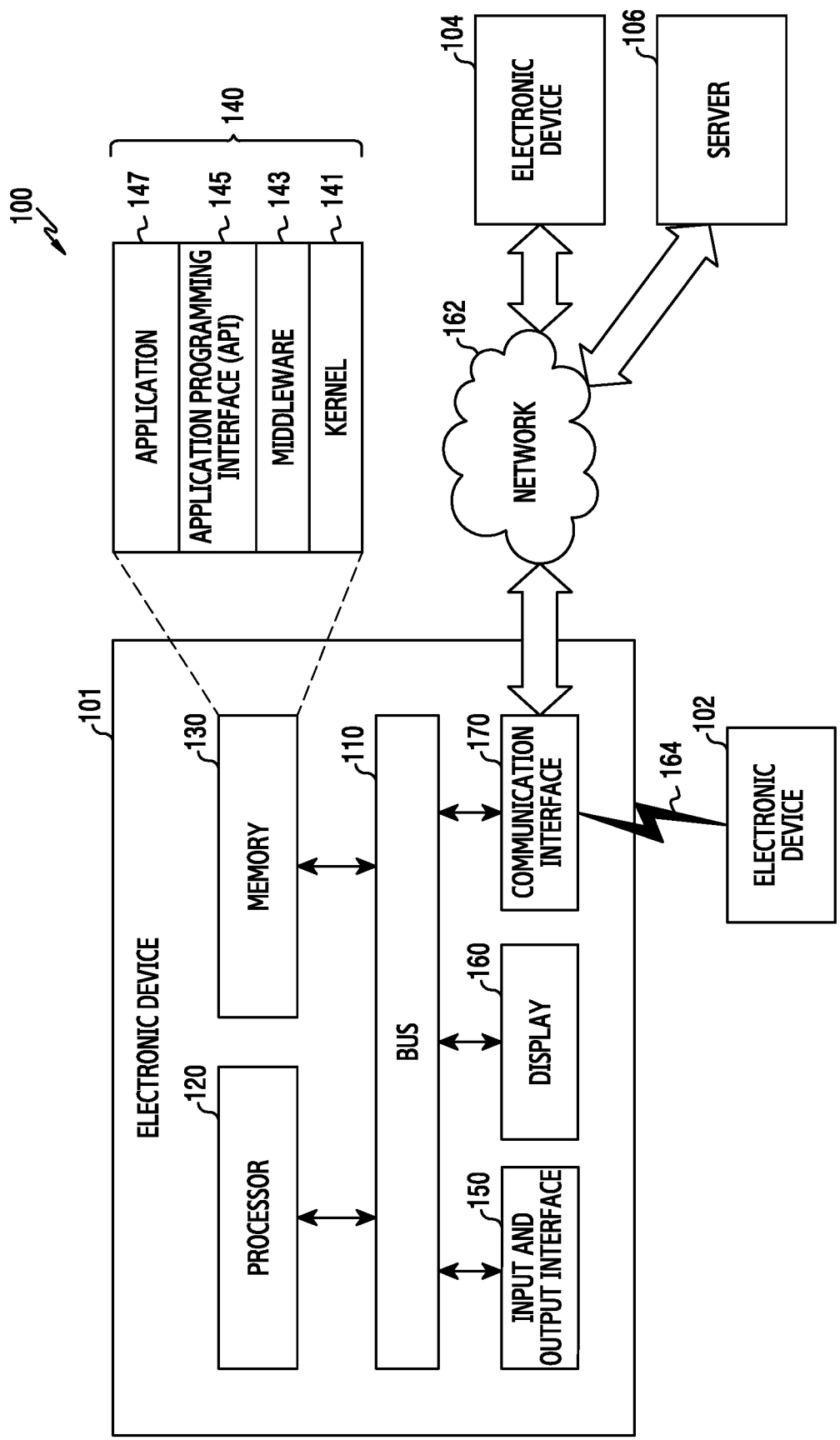
FIG. 1 is a block diagram of a network environment that includes an electronic device according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure as defined by the appended claims and their equivalents. In describing the accompanying drawings, similar reference numerals may be used to designate similar elements.

As used herein, the expressions "have," "may have," "include," and "may include" refer to the existence of a corresponding feature (e.g., a numeral, a function, an operation, or an element such as a component), but does not exclude one or more additional features.

In the present disclosure, the expressions "A or B," "at least one of A and/or B," and "one or more of A and/or B" may include all possible combinations of the items listed. For example, the expressions "A or B," "at least one of A and B," and "at least one of A or B" refers to all of (1) including at least one A, (2) including at least one B, and (3) including all of at least one A and at least one B.

The expressions "a first," "a second," "the first," and "the second" used in various embodiments of the present disclosure may modify various components regardless of the order and/or the importance but does not limit the corresponding components. For example, a first user device and a second user device indicate different user devices although both of them are user devices. For example, a first element may be referred to as a second element, and similarly, a second element may be referred to as a first element without departing from the scope and spirit of the present disclosure.

It should be understood that if an element (e.g., a first element) is referred to as being (operatively or communicatively) "connected," or "coupled," to another element (e.g., a second element), it may be directly connected or directly coupled to the other element or any other element (e.g., a third element) may be interposed between them. In contrast, it may be understood that if an element (e.g., a first element) is referred to as being "directly connected," or "directly coupled," to another element (e.g., a second element), there is no element (e.g., a third element) interposed between them.

The expression "configured to" used in the present disclosure may be used interchangeably with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may indicate that the device, together with other devices or components, "is able to." For example, the phrase "processor adapted (or configured) to perform A, B, and C" may indicate a dedicated processor (e.g., an embedded processor) only for performing the corresponding operations or a general purpose processor (e.g., a central processing unit (CPU) or an application processor (AP)) that can perform the corresponding operations by executing one or more software programs stored in a memory device.

The terms used in the present disclosure are only used to describe certain embodiments, and are not intended to limit the present disclosure. As used herein, singular forms may include plural forms as well unless the context clearly indicates otherwise. Unless defined otherwise, all terms used herein, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. According to various embodiments of the present disclosure, a wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, an electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

According to an embodiment of the present disclosure, the electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, a point of sales (POS) device in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, an electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device may be a combination of one or more of the aforementioned various devices. The electronic device may be a flexible device. Further, an electronic device is not limited to the aforementioned devices, and may include a new electronic device according to the development of new technology.

Hereinafter, an electronic device according to an embodiment of the present disclosure is described with reference to the accompanying drawings. In the present disclosure, the term "user" may indicate a person using an electronic device or a device (e.g., an electronic device for artificial intelligence) using an electronic device.

FIG. 1 is a block diagram of a network environment that includes an electronic device according to an embodiment of the present disclosure.

Referring to FIG. 1, descriptions are provided below of an electronic device 101 within a network environment 100. The electronic device 101 may include a bus 110, a processor 120, a memory 130, an input/output interface 150, a display 160, and a communication interface 170. In an embodiment of the present disclosure, the electronic device 101 may omit at least one of the above-mentioned components or may additionally include other components.

The bus 110 may include, for example, a circuit that interconnects the above-mentioned components 110 to 170 and transmits communication (e.g., a control message or data) among the components 110 to 170.

The processor 120 may include one or more of a central processing unit (CPU), an application processor (AP), and a communication processor (CP). The processor 120 may execute, for example, an arithmetic operation or process data that is related to a control and/or communication of one or more other components of the electronic device 101.

The memory 130 may include a volatile memory and/or a non-volatile memory. The memory 130 may store, for example, commands or data that are related to one or more other components of the electronic device 101. According to an embodiment of the present disclosure, the memory 130 may store software and/or a program 140. The program 140 may include, for example, a kernel 141, a middleware 143, an application programming interface (API) 145, and/or an application program (or an "application") 147. At least one of the kernel 141, the middleware 143, and the API 145 may be referred to as an operating system (OS).

The kernel 141 may control or manage, for example, system resources (e.g., the bus 110, the processor 120, or the memory 130) that are used for executing operations or functions implemented in the other programs (e.g., the middleware 143, the API 145, or the application 147). In addition, the kernel 141 may provide an interface that allows the middleware 143, the API 145, or the application 147 to access individual components of the electronic device 101 so as to control or manage the system resources.

The middleware 143 may play an intermediary role such that, for example, the API 145 or the application 147 may communicate with the kernel 141 so as to exchange data.

In addition, the middleware 143 may process one or more task requests which are received from the application 147, according to priority. For example, the middleware 143 may assign a priority for using a system resource of the electronic device 101 (e.g., the bus 110, the processor 120, or the memory 130) to at least one of the application 147. For example, the middleware 143 may perform scheduling, load balancing, or the like for one or more task requests by processing the one or more requests according to the assigned priority.

The API 145 is, for example, an interface that allows the application 147 to control functions provided from the kernel 141 or the middleware 143, and may include, for example, one or more interfaces or functions (e.g., commands) for file control, window control, image processing, character control, or the like.

The input/output interface 150 may serve as an interface to transmit commands or data entered from, for example, a user or any other external device to the other component(s) of the electronic device 101. Also, the input/output interface 150 may output commands or data, which are received from the other component(s) of the electronic device 101, to the user or the other external device.

The display 160 may include, for example, a liquid crystal display (LCD), a light emitting diode (LED) display, an organic LED (OLED) display, a microelectromechanical systems (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of a user's body.

The communication interface 170 may set, for example, communication between the electronic device 101 and a first external electronic device 102, a second external device 104, or a server 106. For example, the communication interface 170 may be connected with a network 162 through wired or wireless communication so as to communicate with the second external electronic device 104 or the server 106.

The wireless communication may use at least one of, for example, long term evolution (LTE), LTE advanced (LTE-A), code division multiple access (CDMA), wideband CDMA (WCDMA), universal mobile telecommunication system (UMTS), wireless broadband (WiBro), or global system for mobile communication (GSM), as a cellular communication protocol. In addition, the wireless communication may include, for example, short range communication 164. The short range communication 164 may include at least one of, for example, wireless fidelity (WiFi), Bluetooth (BT), near field communication (NFC), and global navigation satellite system (GNSS). GNSS may include, for example, at least one of global positioning system (GPS), global navigation satellite system (Glonass), Beidou navigation satellite system (Beidou), and the European global satellite-based navigation system (Galileo), according to, for example, a use area or bandwidth. Herein, "GPS" may be interchangeably used with "GNSS" below. A wired communication may use at least one of, for example, a universal serial bus (USB), high definition multimedia interface (HDMI), recommended standard 232 (RS-232), and plain old telephone service (POTS). The network 162 may include a telecommunication network (e.g., at least one of a computer network (e.g., a local area network (LAN) or a wide area network (WAN)), the Internet, and a telephone network).

Each of the first and second external electronic devices 102 and 104 may be a type of device that is the same as, or different from, the electronic device 101. According to an embodiment of the present disclosure, the server 106 may include a group of one or more servers.

According to an embodiment of the present disclosure, all or some of the operations to be executed by the electronic device 101 may be executed by another electronic device or a plurality of other electronic devices (e.g., the electronic devices 102 and 104 or the server 106). In the case where the electronic device 101 should perform a certain function or service automatically or by a request, the electronic device 101 may request some functions or services that are associated therewith from the electronic devices 102 and 104 or the server 106, instead of, or in addition to, executing the functions or service by itself. The electronic devices 102 and 104 or the server 106 may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
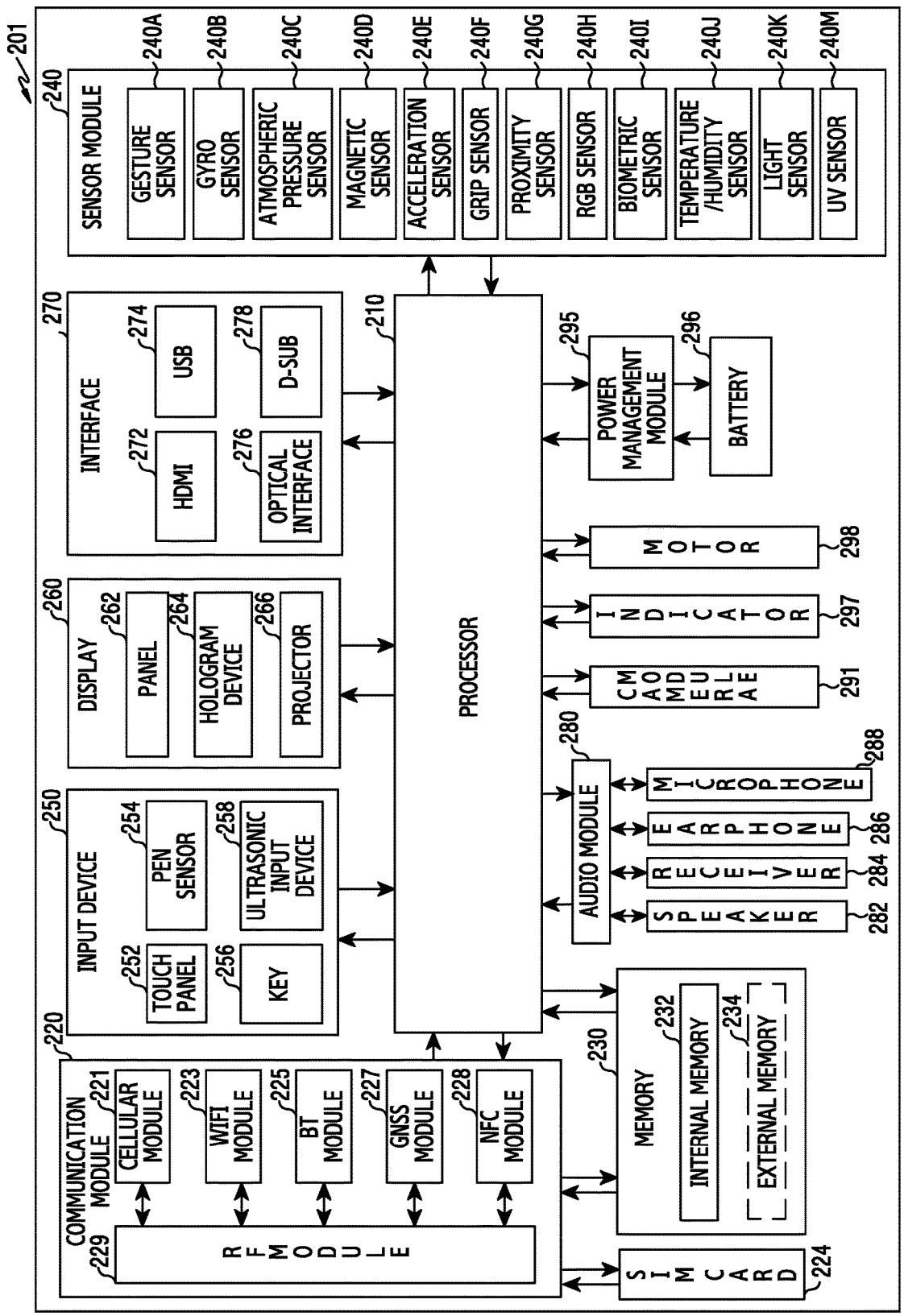
FIG. 2 is a block diagram of an electronic device according to an embodiment of the present disclosure.

FIG. 2 is a block diagram of an electronic device according to an embodiment of the present disclosure.

Referring to FIG. 2, the electronic device 201 may include, for example, the whole or a portion of the electronic device 101 illustrated in FIG. 1. The electronic device 201 may include at least one processor (e.g., an AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or an application program so as to control a plurality of hardware or software components connected thereto, and may also perform various data processing and arithmetic operations. The processor 210 may be implemented by, for example, a system-on-chip (SoC). According to an embodiment of the present disclosure, the processor 210 may further include a graphics processing unit (GPU) and/or an image signal processor (ISP). The processor 210 may include at least some components (e.g., the cellular module 221) among the components illustrated in FIG. 2. The processor 210 may load a command or data received from at least one of the other components (e.g., a non-volatile memory) in a volatile memory to process the command and data, and may store various data in a non-volatile memory.

The communication module 220 may have a configuration that is the same as, or similar to, the communication interface 170 of FIG. 1. The communication module 220 may include, for example, a cellular module 221, a WiFi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a message service, or an Internet service through a communication network. According to an embodiment of the present disclosure, the cellular module 221 may perform discrimination and authentication of the electronic device 201 within the communication network by using the SIM (e.g., a SIM card) 224. The cellular module 221 may perform at least some of the multimedia control functions that may be provided by the processor 210. The cellular module 221 may include a CP.

Each of the WiFi module 223, the Bluetooth module 225, the GNSS module 227, and the NFC module 228 may include, for example, a processor to process data transmitted/received through a corresponding module. According to an embodiment of the present disclosure, at least some (e.g., two or more) of the cellular module 221, the WiFi module 223, the Bluetooth module 225, the GNSS module 227, and the NFC module 228 may be incorporated in a single integrated circuit (IC) or an IC package.

The RF module 229 may transmit/receive a communication signal (e.g., an RF signal). The RF module 229 may include, for example, a transceiver, a power amplifier module (PAM), a frequency filter, a low noise amplifier (LNA), or an antenna. According to an embodiment of the present disclosure, at least one of the cellular module 221, the WiFi module 223, the Bluetooth module 225, the GNSS module 227, and the NFC module 228 may transmit/receive an RF signal through one or more separate RF modules.

The SIM card 224 may include, for example, an embedded SIM, and may also include intrinsic identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic random access memory (DRAM), static RAM (SRAM), or synchronous DRAM (SDRAM)), a non-volatile memory (e.g., a one time programmable read only memory (OTPROM), programmable ROM (PROM), erasable and programmable ROM (EPROM), electrically erasable and programmable ROM (EEPROM), mask ROM, flash ROM, flash memory (e.g., NAND flash memory, or NOR flash memory), a hard drive, or a solid state drive (SSD)).

The external memory 234 may further include a flash drive (e.g., a compact flash (CF) drive, a secure digital (SD) drive, a micro SD (Micro-SD) drive, a mini SD (Mini-SD) drive, an extreme digital (xD) drive, a multi-media card (MMC), or a memory stick). The external memory 234 may be functionally and/or physically connected to the electronic device 201 through various interfaces.

For example, the sensor module 240 may measure a physical quantity or may sense an operating status of the electronic device 201, and may then convert the measured or sensed information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric (or "bio") sensor 240I, a temperature/humidity sensor 240J, an illuminance sensor 240K, and an ultra-violet (UV) light sensor 240M. Additionally or alternatively, the sensor module 240 may include, for example, an electronic nose (E-nose) sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 may further include a control circuit for controlling one or more sensors incorporated therein. In an embodiment of the present disclosure, the electronic device 201 may further include a processor configured to control the sensor module 240 as a part of the processor 210 or separate from the processor 210 so as to control the sensor module 240 while the processor 210 is in low power (e.g. sleep) state.

The input device 250 may include a touch panel 252, a (digital) pen sensor 254, a key 256, or an ultrasonic input device 258. The touch panel 252 may be at least one of, for example, a capacitive type touch panel, a resistive type touch panel, an infrared type touch panel, and an ultrasonic type touch panel. In addition, the touch panel 252 may further include a control circuit. The touch panel 252 may further include a tactile layer so as to provide a tactile reaction to a user.

The (digital) pen sensor 254 may be, for example, a portion of the touch panel 252 or may include a separate recognition sheet. The key 256 may include, for example, a physical button, an optical key, or a keypad. The ultrasonic input device 258 may sense, through a microphone 288, ultrasonic waves generated by an input tool so as to confirm data corresponding to the sensed ultrasonic waves.

The display 260 (e.g., the display 160) may include a panel 262, a hologram device 264, or a projector 266. The panel 262 may include a configuration that is the same as, or similar to, that of the display 160 of FIG. 1. The panel 262 may be implemented to be, for example, flexible, transparent, or wearable. The panel 262 may be configured as a single module with the touch panel 252. The hologram device 264 may show a stereoscopic image in the air using the interference of light. The projector 266 may project light onto a screen so as to display an image. The screen may be located, for example, internal or external to the electronic device 201. According to an embodiment of the present disclosure, the display 260 may further include a control circuit to control the panel 262, the hologram device 264, or the projector 266.

The interface 270 may include, for example, an HDMI 272, a USB) 274, an optical interface 276, or a D-subminiature (D-sub) connector 278. For example, the interface 270 may be included in the communication interface 170 illustrated in FIG. 1. Additionally or alternatively, the interface 270 may include, for example, a mobile high-definition link (MHL) interface, an SD card/multi-media card (MMC) interface, or an Infrared Data Association (IrDA) standard interface.

The audio module 280 may bi-directionally convert, for example, sound and electrical signals. At least some of the components of the audio module 280 may be included in, for example, the input/output interface 150 illustrated in FIG. 1. The audio module 280 may process sound information input or output through, for example, a speaker 282, a receiver 284, an earphone 286, or a microphone 288.

The camera module 291 is a device that is capable of photographing, for example, a still image and a video image, and according to an embodiment of the present disclosure, the camera module 291 may include at least one image sensor (e.g., a front sensor or a back sensor), a lens, an ISP, or a flash (e.g., an LED or xenon lamp).

The power management module 295 may manage, for example, the electrical power of the electronic device 201. According to an embodiment of the present disclosure, the power management module 295 may include a power management IC (PMIC), a charger IC), or a battery 296 gauge. The PMIC may be configured as a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery 296 gauge may measure the residual capacity of the battery 296, a voltage, a current, or a temperature during the charge. The battery 296 may include, for example, a rechargeable battery and/or a solar battery.

The indicator 297 may indicate a certain status (e.g., a booting status, a message status, or a charged status) of the electronic device 201 or of a part thereof (e.g., the processor 210). The motor 298 may convert an electrical signal into a mechanical vibration, and may generate, for example, a vibration or a haptic effect. The electronic device 201 may include a processor (e.g., a GPU) to support a mobile TV. The processor to support a mobile TV may process media data according to the standards of, for example, digital multimedia broadcasting (DMB), digital video broadcasting (DVB), or MediaFlo®.

According to an embodiment of the present disclosure, the electronic device 201 may have one or more conductive members configured as a floating ground or may be electrically connected to a ground for the purpose of maintaining an antenna performance and/or reducing the effect of electromagnetic waves on a human body. A control circuit may be a part of the processor 210, or a circuit separate from the processor 210. Alternatively, the control circuit may be provided in the form of a program. A detailed description for this is provided below with reference to FIG. 4.

Each of the above-described component elements of hardware according to the present disclosure may be configured with one or more components, and the names of the corresponding component elements may vary based on the type of electronic device 201. In an embodiment of the present disclosure, the electronic device 201 may include at least one of the above-described elements. Some of the above-described elements may be omitted from the electronic device 201, or the electronic device 201 may further include additional elements. Also, some of the hardware components according to an embodiment of the present disclosure may be combined into one entity, which may perform functions identical to those of the relevant components before the combination.

Figure 3:
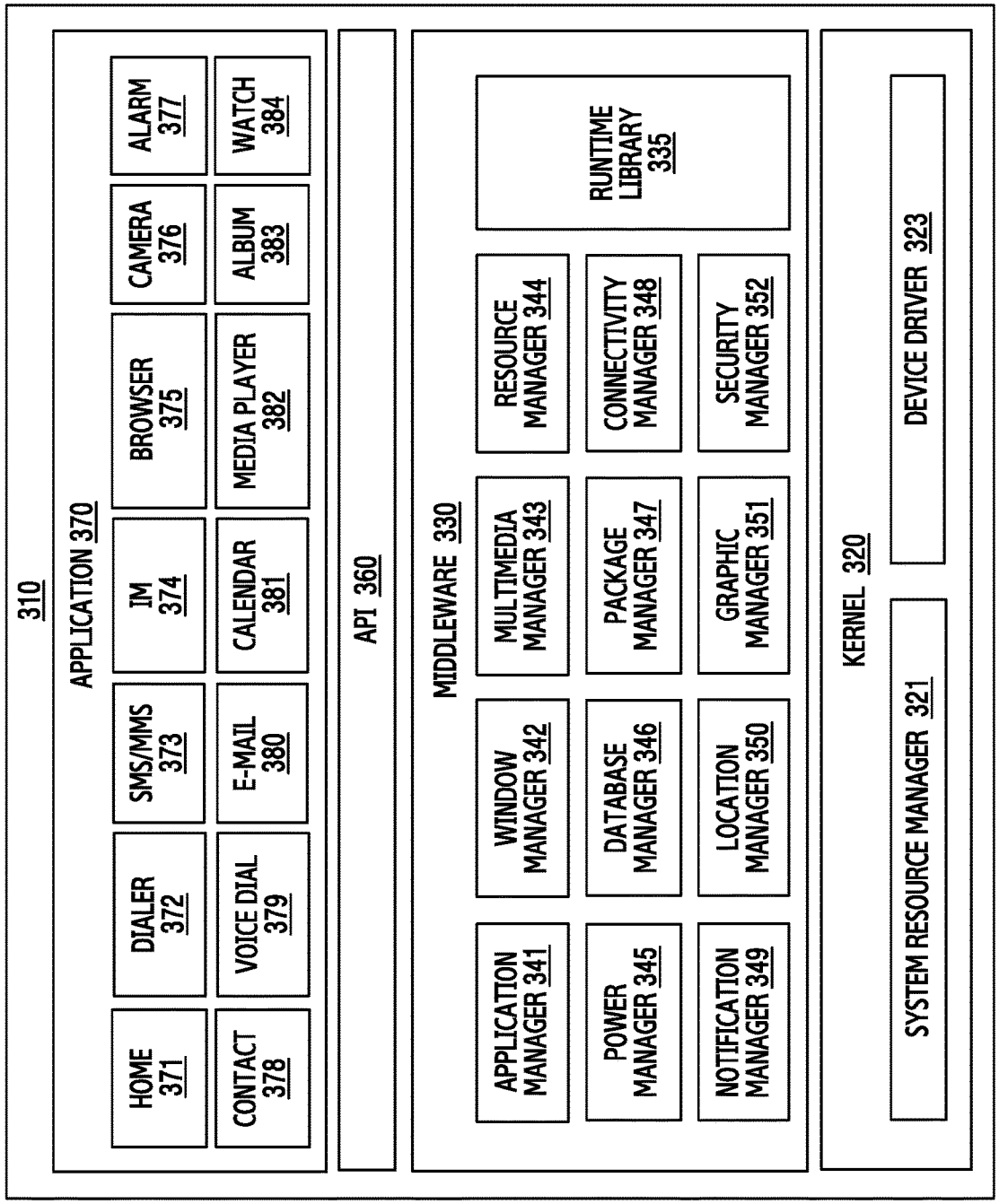
FIG. 3 is a block diagram of a program module according to an embodiment of the present disclosure.

FIG. 3 is a block diagram of a program module according to an embodiment of the present disclosure.

Referring to FIG. 3, a program module 310 (e.g., the program 140) may include an OS that controls resources associated with an electronic device (e.g., the electronic device 101) and/or various applications (e.g., the application program 147) that are driven on the OS. The OS may be, for example, Android®, iOS®, Windows®, Symbian™, Tizen®, or Bada™.

The program module 310 may include a kernel 320, middleware 330, an API 360, and/or an application 370. At least a part of the program module 310 may be preloaded on the electronic device, or may be downloaded from the electronic device 102 or 104, or the server 106.

The kernel 320 (e.g., the kernel 141) may include, for example, a system resource manager 321 and/or a device driver 323. The system resource manager 321 may perform, for example, a control, an allocation, or a recovery of a system resource. According to an embodiment of the present disclosure, the system resource manager 321 may include, for example, a process management unit, a memory management unit, or a file system management unit. The device driver 323 may include, for example, a display driver, a camera driver, a Bluetooth driver, a common memory driver, a USB driver, a keypad driver, a WiFi driver, an audio driver, or an inter-process communication (IPC) driver.

The middleware 330 may provide, for example, a function that is commonly required by the application 370, or may provide various functions to the application 370 through the API 360 such that the application 370 can efficiently use the limited system resources within the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that is used by a compiler in order to add a new function through a program language while the application 370 is executed. The runtime library 335 may perform, for example, input/output management, memory management, or a function for an arithmetic function.

The application manager 341 may manage, for example, a life cycle of at least one application among the application 370. The window manager 342 may manage a graphical user interface (GUI) resource that is used in a screen. The multimedia manager 343 may grasp a format required for reproducing various media files, and may perform encoding or decoding of the media files by using a codec that is suitable for the corresponding format. The resource manager 344 may manage a resource, such as source code, a memory, or a storage space, of at least one application among the application 370.

The power manager 345 is operated together with, for example, a basic input/output system (BIOS) so as to manage a battery or a power source, and may provide, for example, power information that is required for operating the electronic device. The database manager 346 may generate, retrieve, or change a database to be used by at least one application among the application 370. The package manager 347 may manage the installation or update of an application that is distributed in the form of a package file.

The connectivity manager 348 may manage, for example, a wireless connection of WiFi, Bluetooth, or the like. The notification manager 349 may display or notify of events, such as an arrival of a message, an appointment, and proximity notification in a manner that does not disturb a user. The location manager 350 may manage position information of the electronic device. The graphic manager 351 may manage a graphic effect to be provided to a user or a user interface associated therewith. The security manager 352 may provide all security functions required for, for example, system security, or user authentication. According to an embodiment of the present disclosure, in the case where the electronic device (e.g., the electronic device 101) includes a phone function, the middleware 330 may include a telephony manager to manage a voice or video call function of the electronic device.

The middleware 330 may include a middleware module that forms a combination of various functions of the above-described components. The middleware 330 may provide a module that is specialized for each kind of operation system in order to provide differentiated functions. In addition, the middleware 330 may dynamically delete some of the existing components or add new components.

The API 360 (e.g., the API 145) is, for example, a collection of API programming functions, and may be provided in different configurations according to operation systems. For example, Android® or iOS® may provide one API set for each platform and Tizen® may provide two or more API sets for each platform.

The application 370 (e.g., the application program 147) may include, for example, one or more applications that can execute, for example, the functions of a home application 371, a dialer application 372, a short message service/multimedia messaging service (SMS/MMS) application 373, an instant messaging (IM) application 374, a browser application 375, a camera application 376, an alarm application 377, a contact application 378, a voice dial application 379, an e-mail application 380, a calendar application 381, a media player application 382, an album application 383, a watch application 384, a health care application (e.g., an application for measurement of a quantity of motion, or blood sugar level), or a provision of environmental information application (e.g., an application for provision of atmospheric pressure, humidity, or temperature information).

According to an embodiment of the present disclosure, the application 370 may include an application that supports information exchange between the electronic device (e.g., the electronic device 101) and the electronic devices 102 and 104 (hereinafter an "information exchange application"). The information exchange application may include, for example, a notification relay application to transmit certain information to the external electronic devices, or a device management application to manage the external electronic devices.

For example, the notification relay application may include a function of relaying notification information generated from any other application of the electronic device (e.g., an SMS/MMS application 373, an e-mail application 380, a healthcare application, or an environment information application) to the electronic devices 102 and 104. In addition, the notification relay application may receive notification information from, for example, an external electronic device, and may provide the notification information to a user.

The device management application may manage (e.g., install, delete, or update) at least one function of the electronic device 102 or 104 that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to an embodiment of the present disclosure, the application 370 may include an application designated according to an attribute of the electronic device 102 or 104 (e.g., a healthcare application of a mobile medical device). The application 370 may include an application received from the server 106 or the electronic device 102 or 104. The application 370 may include a preloaded application or a third party application that is capable of being downloaded from a server. The names of the components of the program module 310 may vary depending on the kind of OS.

According to an embodiment of the present disclosure, at least a portion of the program module 310 may be implemented by software, firmware, hardware, or a combination of two or more thereof. At least a portion of the program module 310 may be implemented (e.g., executed) by, for example, a processor (e.g., the processor 210). At least a portion of the program module 310 may include, for example, a module, a program, a routine, a set of instructions, or a process for performing one or more functions.

The term "module" as used herein may indicate, for example, a unit that includes hardware, software, firmware, or a combination of two or more thereof. The term "module" may be interchangeably used with, for example, the terms "unit," "logic," "logical block," "component," and "circuit." The term "module" may indicate a minimum unit of an integrated component element or a part thereof. The term "module" may indicate a minimum unit for performing one or more functions or a part thereof. The term "module" may indicate a device that may be mechanically or electronically implemented. For example, the term "module" may include at least one of an application specific IC (ASIC) chip, a field-programmable gate array (FPGA), and a programmable-logic device for performing operations which are known or will be developed.

At least some of devices (e.g., modules or functions thereof) or methods (e.g., operations), according to an embodiment of the present disclosure, may be implemented by an instruction stored in a non-transitory computer-readable recording medium in the form of a programming module. If the instruction is executed by a processor (e.g., the processor 120), the one or more processors may execute the function that corresponds to the instruction. The non-transitory computer-readable recoding medium may be, for example, the memory 130.

The non-transitory computer readable recoding medium may include a hard disk, a floppy disk, magnetic media (e.g., a magnetic tape), optical media (e.g., a compact disk read only memory (CD-ROM) and a digital versatile disc (DVD)), magneto-optical media (e.g., a floptical disk), a hardware device (e.g., a ROM, a random access memory (RAM), a flash memory), and the like. In addition, program instructions may include high level language code, which may be executed in a computer by using an interpreter, as well as machine code generated by a compiler. The aforementioned hardware device may be configured to operate as one or more software modules in order to perform the operation of the present disclosure, and vice versa.

Modules or programming modules, according to an embodiment of the present disclosure, may include at least one of the above-described elements, exclude some of the elements, or further include other additional elements. The operations performed by the modules, the programming module, or other elements, may be executed in a sequential, parallel, repetitive, or heuristic manner. Further, some operations may be executed according to another order or may be omitted, or other operations may be added. Various embodiments of the present disclosure are provided merely to easily describe technical details of the present disclosure and to facilitate understanding of the present disclosure, but are not intended to limit the scope of the present disclosure. Therefore, it is intended that all modifications and changes or modified and changed forms based on the present disclosure fall within the scope of the present disclosure, as defined by the appended claims and their equivalents.

Hereinafter, the display method and device, according to the various embodiments of the present disclosure, are described with reference to the accompanying drawings. However, since the various embodiments of the present disclosure are not intended to be restricted or limited by the following description, it should be noted that applications may be made to the various embodiments based on embodiments that are described below. Hereinafter, various embodiments of the present disclosure are described based on hardware. However, various embodiments of the present disclosure may include both hardware and software and thus, the various embodiments of the present disclosure may not exclude software.

Figure 4:
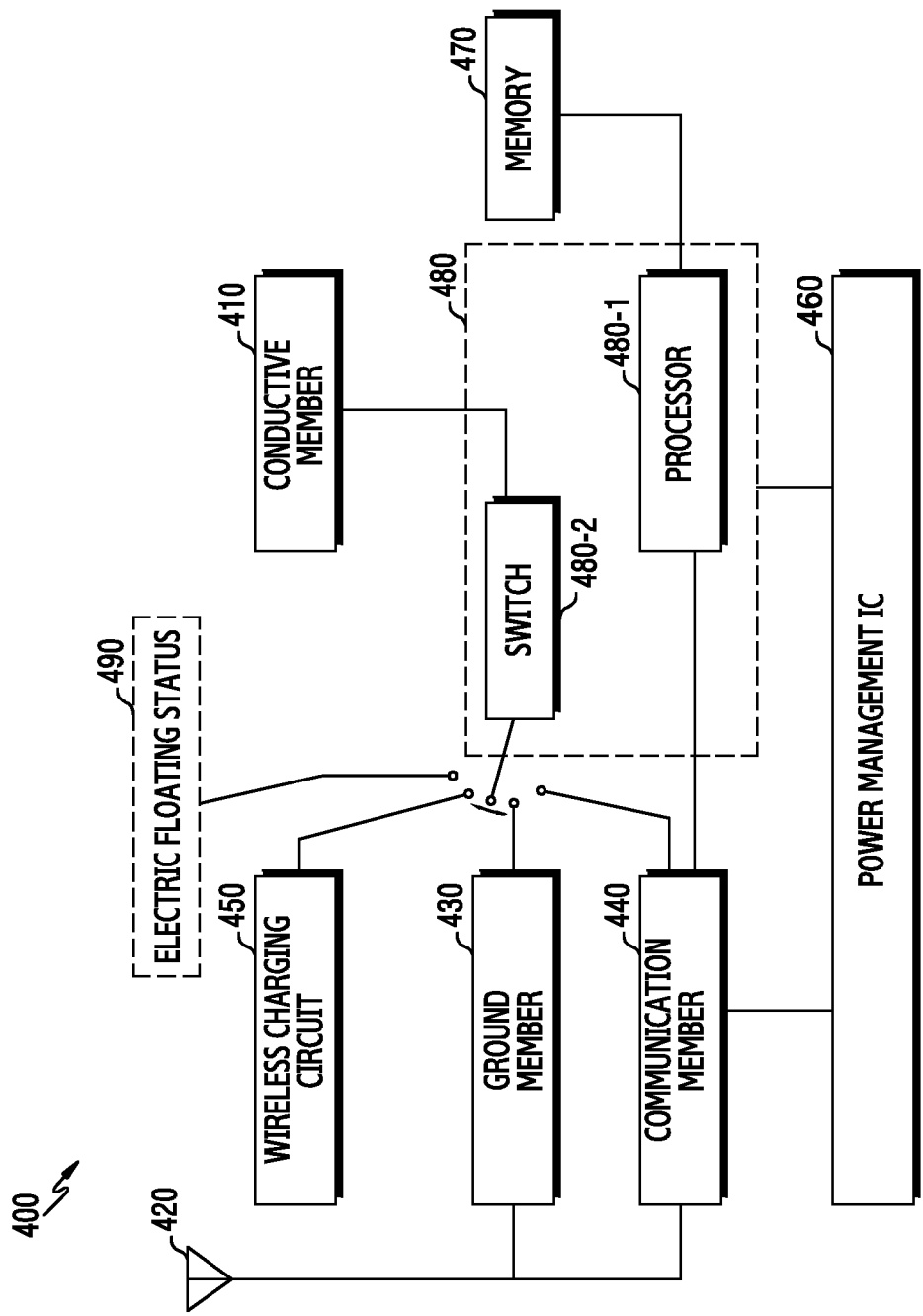
FIG. 4 is a block diagram of an electronic device according to an embodiment of the present disclosure.

FIG. 4 is a block diagram of an electronic device according to an embodiment of the present disclosure. The electronic device 400 may be the electronic device 101 of FIG. 1.

Referring to FIG. 4, the electronic device 400 may include one or more conductive members 410, one or more antenna radiators 420, one or more ground members 430, a communication member 440, a wireless charging circuit 450, a power management IC 460, a memory 470, and a control circuit 480.

According to an embodiment of the present disclosure, the one or more conductive members 410 may be various types of metal members that are provided in the electronic device 400. For example, the one or more conductive members 410 may be disposed inside a housing that forms an exterior of the electronic device 400, or may form a portion of one face of the housing.

According to an embodiment of the present disclosure, the housing may include a first face that forms the front face of the electronic device 400 and a second face that forms the back face of the electronic device 400. The one or more conductive members 410 may be disposed on the second face, or may form a portion of the second face. A display of the electronic device 400 may be exposed through the first face.

According to an embodiment of the present disclosure, the one or more conductive members 410 may be separated from a printed circuit board (PCB) on which the communication member 440, the wireless charging circuit 450, and the control circuit 480 are mounted.

For example, the one or more conductive members 410 may take at least one of a form of a metal plate, a coil type metal pattern, and an annular metal member.

According to an embodiment of the present disclosure, the one or more conductive members 410 may include a radiator (e.g., a wireless charging coil) configured to support the wireless charging circuit 450. For example, the one or more conductive members 410 may be used for transmitting wireless power to an external device, or for wirelessly receiving power from the external device.

According to an embodiment of the present disclosure, the one or more conductive members 410 may include an antenna radiator configured to support various types of communication of the communication member 440.

According to an embodiment of the present disclosure, the one or more conductive members 410 may support short range communication. The short range communication may include at least one of, for example, WiFi, Bluetooth, NFC, and GNSS.

According to an embodiment of the present disclosure, the one or more conductive members 410 may support magnetic signal transmission/reception.

According to an embodiment of the present disclosure, the one or more conductive members 410 may be a metal pattern or a metal member that does not support communication or wireless charging.

According to an embodiment of the present disclosure, the conductive member 410 may include an annular metal pattern or a metal member that surrounds a wireless charging coil.

According to an embodiment of the present disclosure, the one or more conductive members 410 may be electrically connected to the control circuit 480. The one or more conductive members 410 may be electrically connected to a switch 480-2 of the control circuit 480, and may be electrically connected to one of the one or more ground members 430, the communication member 440, and the wireless charging circuit 450, depending on the operation of controlling the switch 480-2 by the processor 480-1. Alternatively, the one or more conductive members 410 may be configured as an electric floating status 490. In this case, the electric floating status 490 may refer to an electrically non-connected status in relation to any other electrical component.

According to an embodiment of the present disclosure, the one or more antenna radiators 420 may support various types of communication. For example, the one or more antenna radiators 460 may be used for cellular communication. The cellular communication may use at least one of, for example, LTE, LTE-A, CDMA, WCDMA, UMTS, WiBro, and GSM.

According to an embodiment of the present disclosure, at least some of the antenna radiators 420 may be configured to resonate in the same communication frequency band or in different communication frequency bands.

According to an embodiment of the present disclosure, the antenna radiators 420 may be disposed at various positions of the electronic device 400. For example, the one or more antenna radiators 420 may be at least partially disposed internal to a housing that forms the exterior of the electronic device 400 and/or on a portion of the housing.

According to an embodiment of the present disclosure, the one or more antenna radiators 420 may have a shape surrounding at least a portion of a display. For example, the one or more antenna radiators 420 may include an annular metal member.

According to an embodiment of the present disclosure, the housing may include the one or more antenna radiators 420 while forming the exterior of the electronic device 400. In the case where the housing is formed of a metal, the one or more antenna radiators 420 may include a partial metal region or the entire metal region of the housing. Alternatively, the one or more antenna radiators 420 that include at least a portion of the housing may be exposed.

According to an embodiment of the present disclosure, the one or more antenna radiators 420 may be mounted on a PCB on which the communication member 440, the wireless charging circuit 450, and the control circuit 480 are mounted.

According to an embodiment of the present disclosure, the one or more antenna radiators 420 may be electrically connected to the communication member 440. The one or more antenna radiators 420 may be electrically connected to a ground of a PCB. For example, the one or more antenna radiators 420 may include a conductive pattern including a first end and a second end, which are electrically connected to the communication member 440 and the ground of the PCB, respectively. The communication member 440 may provide a current to the one or more antenna radiators 420, and the current is circulated along the conductive pattern of the one or more antenna radiators 420 to flow into the ground of the PCB, thereby forming a transmission line that is capable of transmitting/receiving wireless electromagnetic waves.

According to an embodiment of the present disclosure, the one or more antenna radiators 420 may be configured as at least one type that may be selected from a mono-pole antenna, a dipole antenna, an inverted-F antenna (IFA), a planar inverted-F antenna (PIFA), a loop antenna, and a slot antenna.

According to an embodiment of the present disclosure, the one or more ground members 430 may be arranged between the first face and the second face of the housing.

According to an embodiment of the present disclosure, the one or more ground members 430 may be at least partially disposed internal to the housing that forms the exterior of the electronic device 400 and/or on a portion of the housing.

According to an embodiment of the present disclosure, the one or more ground members 430 may include a portion of a PCB of the electronic device 400. The one or more ground members 430 may include a PCB ground.

According to an embodiment of the present disclosure, the one or more ground members 430 may be separated from the PCB ground.

According to an embodiment of the present disclosure, the one or more ground members 430 may be electrically connected to the one or more antenna radiators 420. The one or more ground members 430 may serve as an antenna ground for resonance of the one or more antenna radiators 420.

According to an embodiment of the present disclosure, the communication member 440 may be electrically connected to the one or more antenna radiators 420. For example, the communication member 440 may be electrically connected to a processor 480-1 of the control circuit 480.

According to an embodiment an embodiment of the present disclosure, the communication member 440 may support various types of communication (e.g., cellular communication) that use one or more of the antenna radiators 420. The communication member 440 may transmit/receive a radio frequency signal through the one or more antenna radiators 420. The communication member 440 may include all of the RF components between the one or more antenna radiators 420 and the control circuit 480. For example, the communication member 440 may include an RF IC (RFIC) and a front end module (FEM). The RFIC (e.g., an RF transceiver) may receive radio waves from a base station, and may modulate received high frequency waves into a low frequency band (a base band) that is processable by the processor 480-1. For example, the RFIC may modulate the low frequency waves processed by the processor 480-1 into high frequency waves for the purpose of base station transmission. For example, the FEM may be a transceiver device that is capable of controlling an RF signal. For example, the FEM may interconnect the one or more antenna radiators 420 and the RFIC, and may separate transmitted signals and received signals. For example, the FEM may perform filtering and amplification, and may include a reception end FEM in which a filter is embedded to filter a received signal and a transmission end FEM in which a PAM is embedded to amplify a transmitted signal.

For example, in the reception of a wireless signal according to an embodiment of the present disclosure, the communication member 440 may receive a wireless signal from the one or more antenna radiators 420, convert the received wireless signal into a baseband signal, and transmit the converted baseband signal to the processor 480-1. The processor 480-1 may process the received baseband signal, and control a human/mechanical interface of the electronic device 400, which corresponds to the received baseband signal.

According to an embodiment of the present disclosure, in the transmission of a wireless signal, the processor 480-1 may generate and output a baseband signal to the communication member 440. The communication member 440 may receive the baseband signal from the processor 480-1, convert the received baseband signal into a wireless signal, and transmit the wireless signal over the air through the one or more antenna radiators 420.

According to an embodiment of the present disclosure, the communication member 440 may support at least one communication system among single input multiple output (SIMO), multiple input single output (MISO), diversity, and multiple input multiple output (MIMO) by using the one or more antenna radiators 420.

According to an embodiment of the present disclosure, in the case where the one or more conductive members 410 are configured as one or more antenna radiators in order to support communication as described above, the communication member 440 may support various types of communication that use the one or more conductive members 410. For example, the communication member 440 may include a short range communication circuit, and may support short range communication with an external device (e.g., WiFi, Bluetooth, NFC, or GNSS) by using the one or more conductive members 410. For example, the communication member 440 may include a communication circuit based on a magnetic signal, and may support magnetic signal transmission/reception (MST) (e.g., magnetic security transmission for electronic payment) with an external device by using the one or more conductive members 410.

According to an embodiment of the present disclosure, the one or more conductive members 410 may be a radiator that supports wireless charging. For example, the wireless charging circuit 450 may be configured to transmit wireless power to an external device, or for wirelessly receiving power from the external device, by using the one or more conductive members 410. The wireless charging circuit 450 may be configured as, for example, a magnetic resonance type, a magnetic induction type, or an electromagnetic wave type. The wireless charging circuit 450 may include an additional circuit for wireless charging (e.g., a resonance circuit or a rectifier).

According to an embodiment of the present disclosure, the one or more conductive members 410 may include a metal member that does not support communication or wireless charging.

According to an embodiment, the PMIC 460 may be electrically connected to the control circuit 480 and the communication member 440. The PMIC 460 may efficiently manage and optimize power usage within a system. For example, the processor 480-1 may transmit, to the PMIC 460, a signal according to a load to be processed. The PMIC 460 may adjust a core voltage to be supplied to the processor 480-1 to be suitable to the processor 480-1.

According to an embodiment, the PMIC 460 may optimize a power distribution between a battery charging circuit and a system power supply device if the wireless charging circuit 450 is electrically connected to the control circuit 480.

According to an embodiment of the present disclosure, the memory 470 may be electrically connected to the processor 480-1 of the control circuit 480. The memory 470 may store a software-related program (a set of commands) that may be executed by the processor 480-1. The memory 470 may include at least one high speed RAM (e.g., a magnetic disc storage device) and/or a non-volatile memory or at least one optical storage device and/or a flash memory (e.g., NAND or NOR flash memory).

According to an embodiment of the present disclosure, the memory 470 may include a program (hereinafter "switch control program") for controlling the switch 480-2 by the control circuit 480. A program may also be referred to as a group of commands or a command set. The switch control program may be configured to selectively connect the one or more conductive members 410 to the one or more ground members 430 if the one or more antenna radiators 420 are electrically connected to the communication member 440. For example, by the switch control program, the one or more conductive members 410 may be electrically connected to the one or more ground members 430 (e.g., the PCB ground) without being electrically connected to the communication member 440 or the wireless communication circuit 450. For example, by the switch control program, the one or more conductive members 410 may be electrically connected to the communication member 440 without being connected to the one or more ground members 430 (e.g., the PCB ground)

or the wireless charging circuit 450. For example, by the switch control program, the one or more conductive members 410 may be electrically connected to the wireless charging circuit 450 without being connected to the one or more ground members 430 (e.g., the PCB ground) or the communication member 440. For example, by the switch control program, the one or more conductive members 410 may be configured as an electric floating status 490 without being electrically connected to the one or more ground members 430, the communication member 440, or the wireless charging circuit 450.

According to an embodiment of the present disclosure, the switch control program may be configured to control the switch 480-2 based on various inputs generated by the electronic device 400. For example, the switch control program may be configured to control the switch 480-2 based on at least a part of information acquired from one or more sensors of the electronic device 400. For example, the switch control program may be configured to control the switch 480-2 based on at least a part of a user input generated from an input device of the electronic device 400.

According to an embodiment of the present disclosure, the control circuit 480 may include the processor 480-1 and the switch 480-2. The processor 480-1 may execute various software programs (command sets) stored in the memory 470 so as to perform various functions for the electronic device 400. The processor 480-1 may execute the switch control program stored in the memory 470 so as to control the switch 480-2 and to perform a function that is suitable thereto.

According to an embodiment of the present disclosure, the processor 480-1 may control the switch 480-2 such that the one or more conductive members 410 are not electrically connected to the one or more ground members 430 (e.g., the PCB ground). The one or more antenna radiators 420 are electrically connected to the one or more ground members 430 (e.g., the PCB ground), but may be in a state where the one or more antenna radiators 420 are electrically connected to the conductive member 410 (hereinafter, a "first state").

According to an embodiment of the present disclosure, in the first state, the conductive member 410 may not be used as an antenna ground, and the ground member 430 may be used as an antenna ground.

According to an embodiment of the present disclosure, in the first state, the processor 480-1 may control the switch 480-2 such that the one or more conductive members 410 are electrically connected to the communication member 440. For example, in a case where the one or more conductive members 410 are connected for short range communication and the short range communication is set as an activation state, the processor 480-1 may make an adjustment such that the one or more conductive members 410 are electrically connected to the communication member 440. For example, in a case where the one or more conductive members 410 are used for MST and the MST is set as an activation state, the processor 480-1 may make an adjustment such that the one or more conductive members 401 are electrically connected to the communication member 440. The processor 480-1 may perform the corresponding communication (e.g., short range communication or magnetic signal-based communication) with an external device by using the one or more conductive members 410 and the communication member 440.

According to an embodiment of the present disclosure, in the first state, the processor 480-1 may control the switch 480-2 such that the one or more conductive members 410 are electrically connected to the wireless charging circuit 450.

For example, in a case where the one or more conductive members 410 are used for wireless charging, and the wireless charging is set as an activation state, the processor 480-1 may control the switch 480-2 such that the one or more conductive members 410 are electrically connected to the wireless charging circuit 450. In this case, the processor 480-1 may be configured to wirelessly transmit power to an external device, or to wirelessly receive power from the external device by using the wireless charging circuit 450.

According to an embodiment of the present disclosure, in the first state, the processor 480-1 may control the switch 480-2 such that the one or more conductive members 410 are configured as the electric floating status 490. For example, the one or more conductive members 410 may include a conductive pattern that includes a first end and a second end, and in the first state, the processor 480-1 controls the switch 480-2 such that the first end and the second end on the one or more conductive members 410 are electrically connected to each other, thereby configuring the one or more conductive members 410 in the electric floating status 490. For example, the one or more conductive members 410 may include an NFC antenna radiator, and in the first state, the processor 480-1 may control the switch 480-2 such that the positive (+) terminal and the negative (−) terminal of the NFC antenna radiator are electrically connected to each other. For example, the one or more conductive members 410 may include a coil type metal pattern for wireless charging, and in the first state, the processor 480-1 may control the switch 480-2 such that the positive (+) terminal and the negative (−) terminal of the coil type metal pattern are electrically connected to each other.

According to an embodiment of the present disclosure, the processor 480-1 may control the switch 480-2 such that the one or more conductive members 410 are electrically connected to the one or more ground members 430 (e.g., the PCB ground). The one or more antenna radiators 420 may be in a state of being electrically connected to the one or more ground members 430 (e.g., the PCB ground) and the one or more conductive members 410 (hereinafter, a "second state").

According to an embodiment of the present disclosure, the one or more conductive members 410 may include a conductive pattern that includes a first end and a second end, the processor 480-1 may provide the second state by controlling the switch 480-2 such that at least one of the first end and the second end on the one or more conductive members 410 is selectively electrically connected to the ground member (e.g., the PCB ground). For example, the one or more conductive members 410 may include an NFC antenna radiator, and the processor 480-1 may provide the second state by controlling the switch 480-2 such that any one of the positive (+) terminal and the negative (−) terminal of the NFC antenna radiator is electrically connected to the one or more ground members 430 (e.g., the PCB ground), or by controlling the switch 480-2 such that both the positive (+) terminal and the (−) terminal of the NFC antenna radiator are electrically connected to the one or more ground members 430 (e.g., the PCB ground). For example, the one or more conductive members 410 may include a coil type metal pattern for wireless charging, and the processor 480-1 may provide the second state by controlling the switch 480-2 such that any one of the positive (+) terminal and the negative (−) terminal of the coil type metal pattern for wireless charging is electrically connected to the one or more ground members 430 (e.g., the PCB ground), or by controlling the switch 480-2 such that both the positive (+) terminal and the (−) terminal of the coil type metal pattern are electrically connected to the one or more ground members 430 (e.g., the PCB ground).

According to an embodiment of the present disclosure, in the second state, the processor 480-1 may control the switch 480-2 such that the one or more conductive members 410 are not electrically connected to the communication member 440. For example, although the one or more conductive members 410 are used for short range communication, in a case where the short range communication is set as a deactivation state, the processor 480-1 may control the switch 480-2 such that the one or more conductive members 410 are not electrically connected to the communication member 440. For example, although the one or more conductive members 410 are used for magnetic signal transmission/reception, in a case where the MST is set as a non-activation state, the processor 480-1 may control the switch 480-2 such that the one or more conductive members 410 are not electrically connected to the communication member 440.

According to an embodiment of the present disclosure, in the second state, the processor 480-1 may control the switch 480-2 such that the one or more conductive members 410 are not electrically connected to the wireless charging circuit 450. For example, although the one or more conductive members 410 are used for wireless charging, in a case where the wireless charging is set as a non-activation state, the processor 480-1 may control the switch 480-2 such that the one or more conductive members 410 are not electrically connected to the wireless charging circuit 450.

According to an embodiment of the present disclosure, the one or more conductive members 410 may include a plurality of antenna radiators 420 that support different types of communication. For example, the one or more conductive members 410 may include an antenna radiator 420 for first communication (e.g., an antenna radiator 420 for short range communication) and an antenna radiator 420 for second communication (e.g., an antenna radiator 420 for magnetic signal transmission/reception). In this case, the first communication and the second communication may be set as an activation state or a deactivation state by a user input. If both the first communication and the second communication are set as the activation state, the processor 480-1 may control the switch 480-2 such that the antenna radiator 420 for first communication and the antenna radiator 420 for second communication are electrically connected to the communication member 440. If both the first communication and the second communication are set as the deactivation state, the processor 480-1 may control the switch 480-2 such that the antenna radiator 420 for first communication and the antenna radiator 420 for second communication are not electrically connected to the communication member 440. If both the first communication and the second communication are set as the deactivation state, the processor 480-1 may selectively provide one of a first state, in which at least one of the antenna radiator 420 for first communication and the antenna radiator 420 for second communication is configured as the electric floating status 490, and a second state, in which at least one of the antenna radiator 420 for first communication and the antenna radiator 420 for second communication is connected to the one or more ground members 430.

For example, if the first communication is set as the activation state and the second communication is set as the deactivation state, the processor 480-1 may control the switch 480-2 such that the antenna radiator 420 for first communication of the one or more conductive members 410 is electrically connected to the communication member 440.

The processor 480-1 may selectively provide one of a first state, in which the antenna radiator 420 for the second communication of the one or more conductive members 410 is configured as the electric floating status 490 without being electrically connected to the communication member 440, and a second state, in which the antenna radiator 420 for the second communication of the one or more conductive members 410 is electrically connected to the one or more ground members 430 (e.g., the PCB ground).

According to an embodiment of the present disclosure, the one or more conductive members 410 may include a first antenna radiator 420 for wireless charging and a second antenna radiator 420 for short range communication. In this case, the wireless charging and the short range communication may be set as an activation state or a deactivation state by a user input. If both the wireless charging and the short range communication are set as the activation state, the processor 480-1 may control the switch 480-2 such that a first antenna radiator 420 for wireless charging is electrically connected to the wireless charging circuit 450 and the second antenna radiator 420 for short range communication is electrically connected to the communication member 440. For example, if both the wireless charging and the short range communication are set as the activation state, the processor 480-1 may control the switch 480-2 such that the first antenna radiator 420 for wireless charging is not electrically connected to the wireless charging circuit 450 and the second antenna radiator 420 for short range communication is not electrically connected to the communication member 440. For example, if both the wireless charging and the short range communication are set as the deactivation state, the processor 480-1 may selectively provide one of a first state, in which at least one of the first antenna radiator 420 for wireless charging and the second antenna radiator 420 for short range communication is configured as the electric floating status 490, and a second state, in which at least one of the first antenna radiator 420 for wireless charging and the second antenna radiator 420 for short range communication is electrically connected to the one or more ground members 430 (e.g., the PCB ground).

For example, if the wireless charging is set as the activation state and the short range communication is set as the deactivation state, the processor 480-1 may control the switch 480-2 such that the first antenna radiator 420 for wireless charging is electrically connected to the wireless charging circuit 450 and the second antenna radiator 420 for short range communication is not electrically connected to the communication member 440. For example, the processor 480-1 may selectively provide one of a first state, in which the second antenna radiator 420 for short range communication is configured as the electric floating status 490, and a second state, in which the second antenna radiator 420 is electrically connected to the one or more ground members 430 (e.g., the PCB ground).

For example, if the wireless charging is set as the deactivation state and the short range communication is set as the activation state, the processor 480-1 may control the switch 480-2 such that the first antenna radiator 420 for wireless charging is not electrically connected to the wireless charging circuit 450 and the second antenna radiator 420 for short range communication is electrically connected to the communication member 440. For example, the processor 480-1 may selectively provide one of a first state, in which the first antenna radiator 420 for wireless charging is configured as the electric floating status 490, and a second state, in which the first antenna radiator 420 for wireless charging is electrically connected to the one or more ground members 430 (e.g., the PCB ground).

According to an embodiment of the present disclosure, the processor 480-1 may selectively provide, based on whether a user is positioned close to the electronic device 400, one of a first state, in which the one or more conductive members 410 are configured as the electric floating status 490, and a second state, in which the one or more conductive members 410 are electrically connected to the one or more ground members 430 (e.g., the PCB ground). For example, the electronic device may 400 may further include a sensor configured to generate a signal indicating whether the user is positioned close to the electronic device 400, and the processor 480-1 may selectively provide, at least partially based on the signal from the sensor, one of a first state, in which the one or more conductive members 410 are configured as the electric floating status 490, and a second state, in which the one or more conductive members 410 are electrically connected to the one or more ground members 430 (e.g., the PCB ground). For example, if it is sensed that a user is positioned close to the electronic device 400, the processor 480-1 may provide a first state, in which the one or more conductive members 410 are configured as the electric floating status 490.

For example, the processor 480-1 may confirm whether a user is positioned close to the electronic device 400, based on at least a part of information acquired from at least one sensor selected among a heart rate monitor (HRM) sensor, an exercise information sensor, a temperature sensor, and a proximity sensor. For example, in a case where heart rate is measured through the HRM sensor, the processor 480-1 may recognize that a user is in the state of being positioned close to the electronic device 400, and in the other case, the electronic device 400 may recognize that the user is in the state of not being positioned close to the electronic device 400. In a case where a movement of the electronic device 400 is sensed through an acceleration sensor or a gyro sensor, the processor 480-1 may recognize that a user is in the state of being positioned close to the electronic device 400, and in the other case, the electronic device 400 may recognize that the user is in the state of not being positioned close to the electronic device 400. For example, in a case where it is sensed, through the temperature sensor, a temperature close to a user's body temperature is maintained, the processor 480-1 may recognize that the user is in the state of being positioned close to the electronic device 400, and in the other case, the electronic device 400 may recognize that the user is in the state of not being positioned close to the electronic device 400.

For example, the processor 480-1 may identify whether a user is in the state of being positioned close to the electronic device 400 based on at least a part of an amount of a return current or a variation of capacitance that is acquired based on the one or more antenna radiators 420.

According to an embodiment of the present disclosure, the processor 480-1 may monitor a reception sensitivity of the one or more antenna radiators 420, and selectively provide, at least partially based on the monitored reception sensitivity, whether a user is positioned close to the electronic device 400, one of a first state, in which the one or more conductive members 410 are configured as the electric floating status 490, and a second state, in which the one or more conductive members 410 are electrically connected to the one or more ground members 430 (e.g., the PCB ground). For example, if the reception sensitivity of the one or more antenna radiators 420 is less than or equal to a reference, the processor 480-1 may provide the second state where the one or more conductive members 410 are electrically connected to the one or more ground members 430 (e.g., the PCB ground).

According to an embodiment of the present disclosure, the processor 480-1 may selectively provide, based on at least a part of a user input, one of a first state, in which the one or more conductive members 410 are configured as the electric floating status 490, and a second state, in which the one or more conductive members 410 are electrically connected to the one or more ground members 430 (e.g., the PCB ground).

According to an embodiment of the present disclosure, the electronic device 400 may further include a user interface, and the processor 480-1 may selectively provide, based on at least a part of a user input received through the user interface, one of a first state, in which the one or more conductive members 410 are configured as the electric floating status 490, and a second state, in which the one or more conductive members 410 are electrically connected to the one or more ground members 430 (e.g., the PCB ground).

For example, in a case where the electronic device 400 provides an antenna performance improvement mode, and the antenna performance improvement mode is activated by the user input, the processor 480-1 may selectively provide one of a first state, in which the one or more conductive members 410 are configured as the electric floating status 490, and a second state, in which the one or more conductive members 410 are electrically connected to the one or more ground members 430 (e.g., the PCB ground). According to an embodiment of the present disclosure, in the antenna performance improvement mode, the processor 480-1 may selectively provide, depending on whether a user is positioned close to the electronic device 400, one of a first state, in which the one or more conductive members 410 are configured as the electric floating status 490, and a second state, in which the one or more conductive members 410 are electrically connected to the one or more ground members 430 (e.g., the PCB ground). For example, in a case where it is sensed in the antenna performance improvement mode that a user is not positioned close to the electronic device 400, the processor 480-1 may provide a second state where the one or more conductive members 410 are electrically connected to the one or more ground members 430 (e.g., the PCB ground). The processor 480-1 may selectively provide, based on the reception sensitivity of the one or more antenna radiators 420, one of a first state, in which the one or more conductive members 410 are configured as the electric floating status 490, and a second state, in which the one or more conductive members 410 are electrically connected to the one or more ground members 430 (e.g., the PCB ground).

For example, in a case where the electronic device 400 provides a specific absorption rate (SAR) reduction mode, and the SAR reduction mode is activated by a user input, the processor 480-1 may selectively provide one of a first state, in which the one or more conductive members 410 are configured as the electric floating status 490, and a second state, in which the one or more conductive members 410 are electrically connected to the one or more ground members 430 (e.g., the PCB ground). According to an embodiment of the present disclosure, in the SAR reduction mode, the processor 480-1 may selectively provide, depending on whether the user is positioned close to the electronic device 400, one of a first state, in which the one or more conductive members 410 are configured as the electric floating status 490, and a second state, in which the one or more conductive members 410 are electrically connected to the one or more ground members 430 (e.g., the PCB ground). For example, if it is sensed that a user is positioned close to the electronic device 400 in the SAR reduction mode, the processor 480-1 may provide a first state, in which the one or more conductive members 410 are configured as the electric floating status 490.

For example, in a case where the electronic device 400 provides a wearing mode and the wearing mode is activated based on at least a part of a user input or information acquired from at least one sensor, the processor 480-1 may selectively provide one of a first state, in which the one or more conductive members 410 are configured as the electric floating status 490, and a second state, in which the one or more conductive members 410 are electrically connected to the one or more ground members 430 (e.g., the PCB ground). For example, the wearing mode may include, for example, a watch mode that refers to a wrist-wearing mode of the electronic device 400 and a necklace mode that refers to a neck-wearing mode of the electronic device 400. According to an embodiment of the present disclosure, in the wearing mode, the processor 480-1 may provide a first state, in which the one or more conductive members 410 are configured as the electric floating status 490.

According to an embodiment of the present disclosure, the one or more conductive members 410, which are in the electric floating status 490, may reduce an influence of electromagnetic waves generated from the electronic device 400 on the user's body. For example, if a user is positioned close to the electronic device 400, the one or more conductive members 410, which are in the electric floating status 490, may reduce the absorption of electromagnetic waves, which are generated from the electronic device 400, into the user's body. The electromagnetic waves may be emitted due to the radiation of the one or more antenna radiators 420. The one or more conductive members 410, which are in the electric floating status 490, may reduce the SAR related to the electronic device 400.

According to an embodiment of the present disclosure, the one or more conductive members 410, which are in the electric floating status 490, may support the maintaining of the antenna performance of an antenna device that uses the one or more antenna radiators 420.

According to an embodiment of the present disclosure, the one or more conductive members 410, which are electrically connected to the PCB ground, may support the maintaining of the antenna performance of an antenna device that uses the one or more antenna radiators 420. For example, in a case where the electronic device 400 is a wearable electronic device and is in a state of not being worn on a user's body, if the user's body, which is a potential body, moves away from the electronic device 400, the antenna device is designed in consideration of permittivity of the user's body. Thus, in a situation where no permittivity of a body exists, the electrical length of the one or more antenna radiators 420 is reduced to have a relatively high resonance frequency, which may cause the deterioration of the performance of the antenna device. In a state where the electronic device 400 is not worn on a user's body, the one or more conductive members 410 of the second state are electrically connected to the PCB ground, which may suppress the deterioration of the antenna performance of the antenna device. Even in a state where the electronic device 400 is not worn on a user's body, the antenna performance of the antenna device may be maintained.

According to an embodiment of the present disclosure, the one or more conductive members 410, which are electrically connected to the one or more ground members (e.g., the PCB ground), may reduce an influence of electromagnetic waves generated from the electronic device 400 on a user's body.

According to an embodiment of the present disclosure, the electronic device 400 may further include other various components. For example, the electronic device 400 may further include a memory (e.g., the memory 230 in FIG. 2), a sensor module (e.g., the sensor module 240 in FIG. 2), an input device (e.g., the input device 250 in FIG. 2), a display (e.g., the display 260 in FIG. 2), an audio module (e.g., the audio module 280 in FIG. 2), a camera module (e.g., the camera module 291 in FIG. 2), or the like.

According to an embodiment of the present disclosure, the control circuit 480 may control one or more switches such that the one or more conductive members 410 may be configured as a floating ground or may be electrically connected to the one or more ground members 430 (e.g., the PCB ground). This is described below with reference to FIGS. 5A to 12B.

Figure 5A:
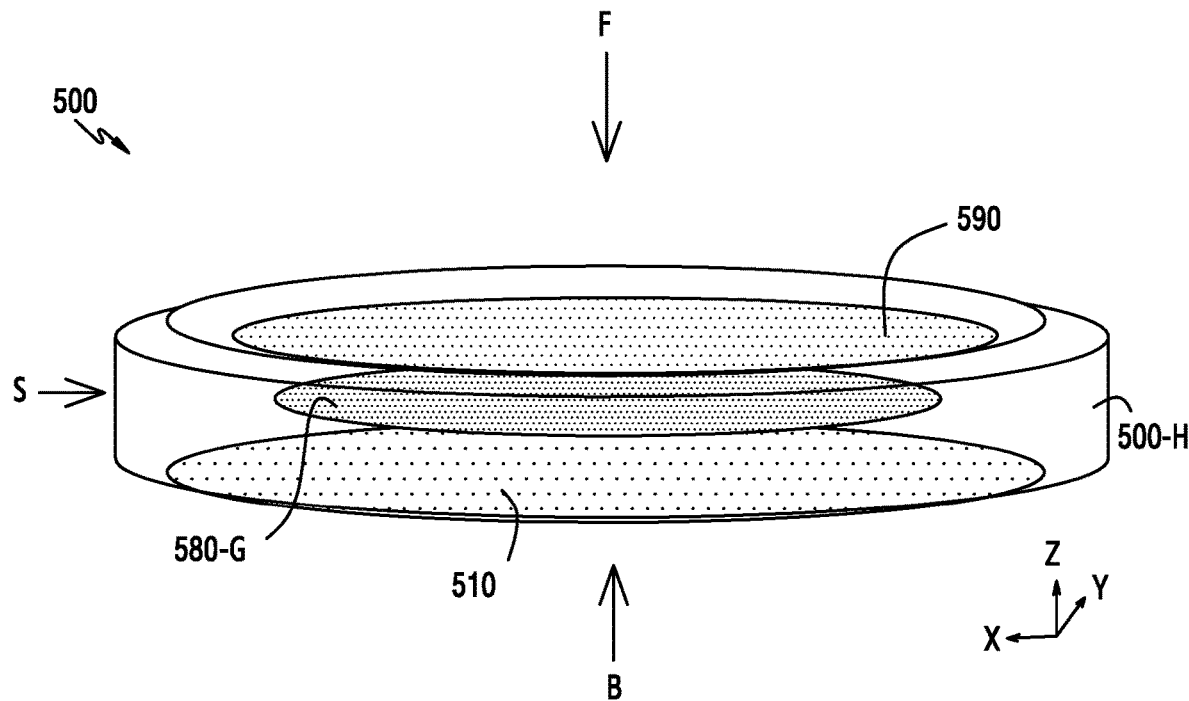
FIGS. 5A, 5B, and 6 are views of electronic devices according to embodiments of the present disclosure.
Figure 5B:
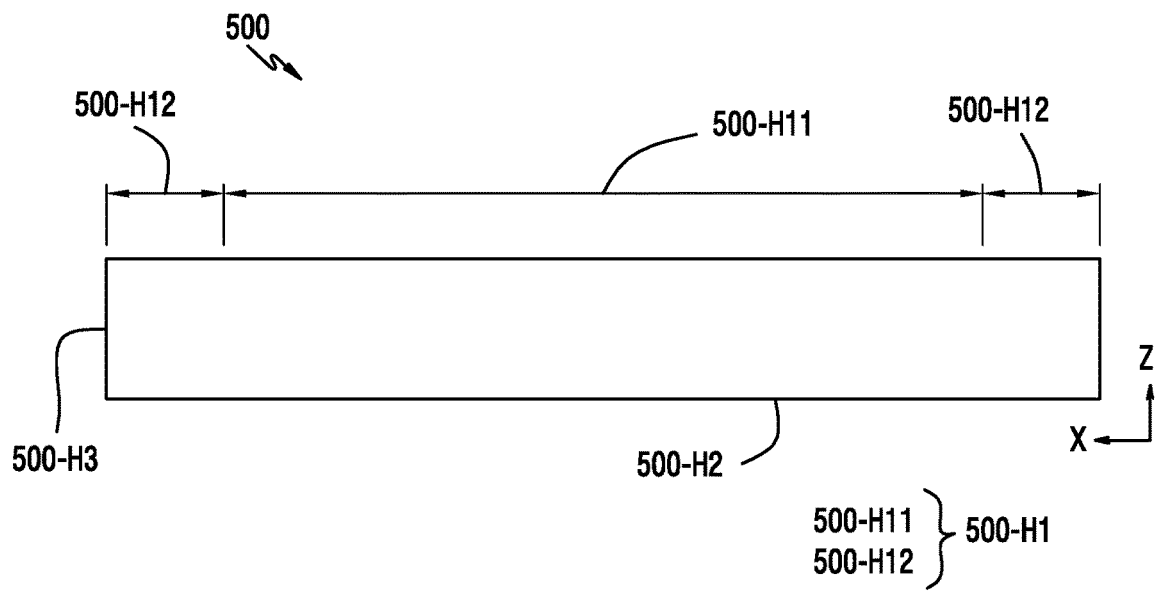
Figure 6:
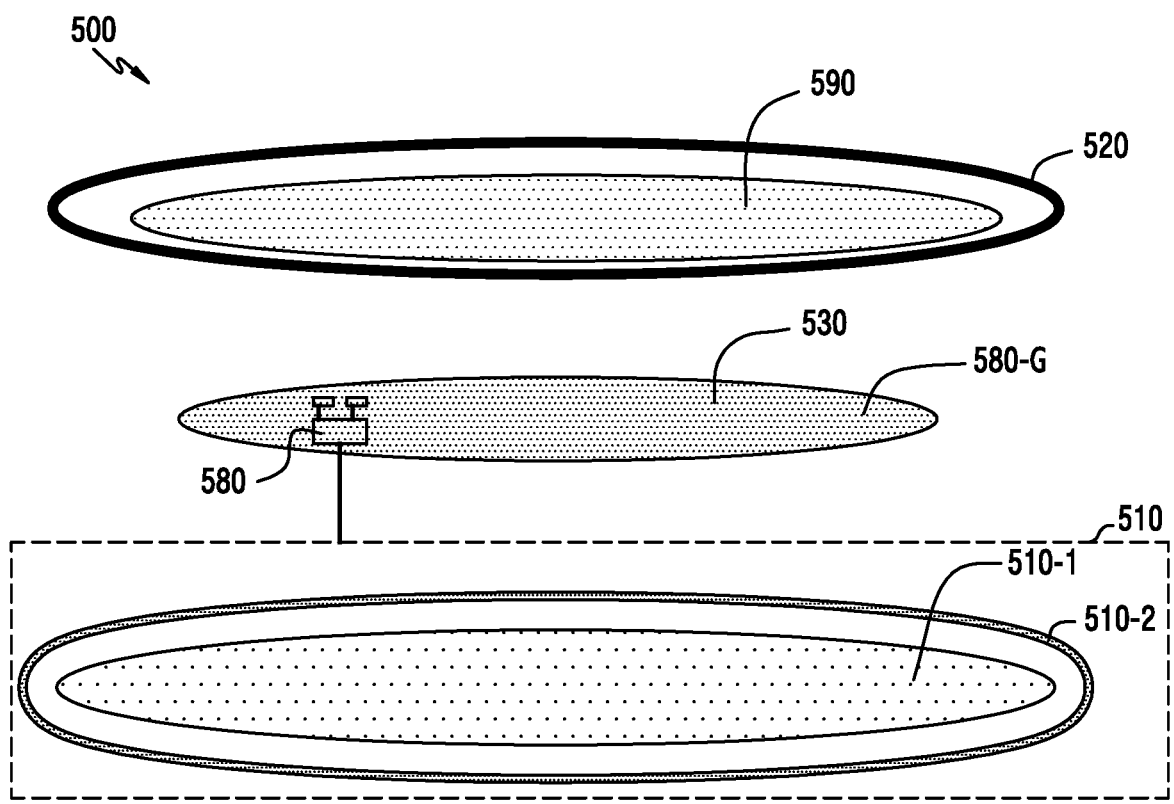

FIGS. 5A, 5B, and 6 are views of electronic devices 500 according to an embodiment of the present disclosure. The electronic device 500 may be the electronic device 101 of FIG. 1.

Referring to FIGS. 5A, 5B, and 6, the electronic device 500 may include a housing 500-H, a display 590, a ground member 580-G; a conductive member 510, an antenna radiator 520, and a control circuit 580.

According to an embodiment of the present disclosure, the housing 500-H is configured to form an exterior of the electronic device 500, and may have a substantially cylindrical shape.

According to an embodiment of the present disclosure, the housing 500-H may include a first face 500-H1 and a second face 500-H2 that faces in a direction opposite to the first face 500-H1. The first face 500-H1 may form the front face F of the electronic device 500, and the second face 500-H2 may form the back face B of the electronic device 500. As described above, the housing 500-H may have a substantially cylindrical shape. The first face 500-H1 may have a substantially circular shape if viewed in a direction from the front face F toward the back face B of the electronic device 500. The second face 500-H2 may have a substantially circular shape if viewed in a direction from the back face B toward the front face F of the electronic device 500.

According to an embodiment of the present disclosure, although the housing 500-H may have a substantially cylindrical shape, the housing 500-H may have various shapes depending on the shape of the display 590 without being limited thereto. For example, if the shape of the display 590 is a square, the housing 500-H may have a square ring shape to substantially correspond thereto. A related example is schematically illustrated in FIG. 30 described below.

According to an embodiment of the present disclosure, if the shape of the display 590 is a substantially plate-like shape, the housing 500-H may have a plate shape to substantially correspond thereto.

According to an embodiment of the present disclosure, if the shape of the display 590 is a substantially curved shape, the housing 500-H may have a curved shape to substantially correspond thereto.

According to one embodiment, the first face 500-H1 may include a transparent central region 500-H11 and an edge region 500-H12 that surrounds the transparent region 500-

H11. The transparent central region 500-H11 may have a substantially circular shape, and the edge region 500-H12 may have an annular shape.

According to an embodiment of the present disclosure, the transparent central region 500-H11 of the first face 500-H1 may be flat, and the annular edge region 500-H12 of the first face 500-H1 may be flat or inclined.

According to an embodiment of the present disclosure, the display 590 may output an electric signal as an image. The display 590 may be exposed through the transparent central region 500-H11 of the first face 500-H1 of the housing 500-H.

According to an embodiment of the present disclosure, the ground member 580-G may be arranged between the first face 500-H1 and the second face 500-H2 of the housing 500-H. For example, the ground member 580-G may be disposed between the display 590 and the conductive member 510.

According to an embodiment of the present disclosure, the ground member 580-G may be a part of a PCB 530. For example, the ground member 580-G may include a PCB ground. The PCB is configured to mount a plurality of components of the electronic device 500 thereon, and may support the data input/output and exchange of electronic components within the electronic device 500 while setting the execution environment of the electronic device 500. For example, the PCB may include a first face that faces the front face F of the electronic device 500 and a second face that faces the back face B of the electronic device 500, and the ground member 580-G (e.g., a PCB ground) may be disposed on the first face and/or the second face of the PCB. Alternatively, the ground member 580-G (e.g., a PCB ground) may be a layer disposed between the first face and the second face of the PCB.

According to an embodiment of the present disclosure, the ground member 580-G may be a metal pattern or a metal member that includes a ground region separately from the PCB. Alternatively, the ground member 580-G may be configured on a structure that is separate from the PCB.

According to an embodiment of the present disclosure, the conductive member 510 may be disposed within the housing 500-H. Alternatively, the conductive member 510 may be disposed between the ground member 580-G (e.g., a PCB ground) and the second face 500-H2 of the housing 500-H.

According to an embodiment of the present disclosure, the conductive member 510 may be disposed on at least a portion of the housing 500-H. For example, the conductive member 510 may form a portion of the second face 500-H2 of the housing 500-H. Alternatively, the conductive member 510 may form a portion of the third face 500-H3 that forms a side face S of the electronic device 500 between the first face 500-H1 and the second face 500-H2 of the housing 500-H. Alternatively, the conductive member 510 may form a portion of the first face 500-H1 of the housing 500-H.

According to an embodiment of the present disclosure, the conductive member 510 may be at least partially formed between the ground member 580-G (e.g., a PCB ground) and the second face 500-H2 of the housing 500-H.

According to an embodiment of the present disclosure, the electronic device 500 may include at least one conductive member 510. For example, the at least one conductive member 510 may support communication (e.g., short range communication or magnetic signal transmission/reception). Alternatively, the at least one conductive member 510 may support wireless charging. Alternatively, the one conductive member 510 may be a metal pattern or a metal member that does not support communication or wireless charging.

According to an embodiment of the present disclosure, the at least one conductive member 510 may include a plurality of conductive members. For example, the at least one conductive member 510 may include a first conductive member 510-1 and a second conductive member 510-2.

According to an embodiment of the present disclosure, the second conductive member 510-2 may have a shape that surrounds, for example, at least a portion of the first conductive member 510-1. Alternatively, the second conductive member 510-2 may be an annular metal pattern or metal member.

According to an embodiment of the present disclosure, the housing 500-H may include a third face 500-H3 that forms a side face S of the electronic device 500 between the first face 500-H1 and the second face 500-H2. For example, the conductive member 510 (e.g., the second conductive member 510-2) may form a portion of the third face 500-H3 of the housing 500-H.

According to an embodiment of the present disclosure, the antenna radiator 520 may be disposed internally to the housing 500-H and/or on at least a portion of the housing 500-H. For example, the housing 500-H may include a cylindrical portion formed of a metallic material, and may be configured as at least a portion of the antenna radiator 520.

According to an embodiment of the present disclosure, the antenna radiator 520 may include at least a portion of the housing 500-H. For example, the antenna radiator 520 may be configured as the entire housing 500-H.

According to an embodiment of the present disclosure, the housing 500-H may be configured as an antenna radiators 520 while forming the exterior of the electronic device 500. In the case where the housing 500-H is formed of a metal, the antenna radiator 520 may include a partial metal region or an entire metal region of the housing 500-H. Alternatively, the antenna radiator 520 that includes at least a portion of the housing 500-H may be exposed.

According to an embodiment of the present disclosure, the antenna radiator 520 may be electrically connected to a power feeding unit of the PCB 530 on which the ground member 580-G (e.g., a PCB ground) is mounted, and may also be electrically connected to the ground member 580-G (e.g., a PCB ground). For example, the ground member 580-G may serve as an antenna ground for resonance of the antenna radiator 520.

According to an embodiment of the present disclosure, a control circuit 580 (e.g., the control circuit 480 of FIG. 4) may be mounted on the PCB 530 on which the ground member 580-G (e.g., a PCB ground) is mounted. The control circuit 580 may be electrically connected to the conductive member 510 and the ground member 580-G (e.g., a PCB ground)

According to an embodiment of the present disclosure, the control circuit 580 may be configured as an electric floating status without electrically connecting the conductive member 510 to the ground member 580-G (e.g., a PCB ground). The antenna radiator 520 may be in a first state where the antenna radiator 520 is electrically connected to the ground members 580-G (e.g., a PCB ground), but is not electrically connected to the conductive member 510.

According to an embodiment of the present disclosure, the control circuit 580 may electrically connect the conductive member 510 to the ground member 580-G (e.g., a PCB ground). If the conductive member 510 is electrically connected to the ground member 580-G (e.g., a PCB ground), the antenna radiator 520 may be in a second state where the antenna radiator 520 is electrically connected to the ground members 580-G (e.g., a PCB ground) and the conductive member 510. For example, the ground member 580-G and the conductive member 510 may serve as an antenna ground for resonance of the antenna radiator 520.

According to an embodiment of the present disclosure, the conductive member 510 may include an antenna radiator configured to support various types of communication (e.g., short range communication or magnetic transmission/reception). In the case where the communication supported by the conductive member 510 is set as an activation state, the control circuit 580 may make an adjustment such that the conductive member 510 is electrically connected to the communication circuit (e.g., the communication member 440 of FIG. 4). Alternatively, in the case where the communication supported by the conductive member 510 is set as a deactivation state, the control circuit 580 may provide a first state, in which the conductive member 510 is configured as an electric floating status, or a second state, in which the conductive member 510 are electrically connected to the ground member 580-G (e.g., the PCB ground). The first conductive member 510-1 may support various types of communication.

According to an embodiment of the present disclosure, the conductive member 510 may include a radiator configured to support wireless charging (e.g., a wireless charging coil). In a case where the wireless charging supported by the conductive member 510 is set as an activation state, the control circuit 580 may make an adjustment such that the conductive member 510 is electrically connected to the wireless charging circuit (e.g., the wireless charging circuit 450 of FIG. 4). Alternatively, in a case where the wireless charging supported by the conductive member 510 is set as a deactivation state, the control circuit 580 may provide a first state, in which the conductive member 510 is configured as an electric floating status, or a second state, in which the conductive member 510 are electrically connected to the ground member 580-G (e.g., the PCB ground). The first conductive member 510-1 may support wireless charging.

According to an embodiment of the present disclosure, the conductive member 510 may include a metal pattern or a metal member that does not support communication and wireless charging. The second conductive member 510-2 may not support communication and wireless charging.

According to an embodiment of the present disclosure, both the first conductive member 510-1 and the second conductive member 510-2 may be configured to support communication.

According to an embodiment of the present disclosure, the first conductive member 510-1 may be configured to support communication, and the second conductive member 510-2 may be configured to support wireless charging.

According to an embodiment of the present disclosure, the first conductive member 510-1 may be configured to support wireless charging and the second conductive member 510-2 may be configured to support communication.

According to an embodiment of the present disclosure, the first conductive member 510-1 may be configured to support communication and the second conductive member 510-2 may be configured to support wireless charging.

According to an embodiment of the present disclosure, both the first conductive member 510-1 and the second conductive member 510-2 may be configured not to support communication and wireless charging.

According to an embodiment of the present disclosure, the electronic device 500 may selectively provide, based on whether a user is positioned close to the electronic device 500, one of a first state, in which the conductive member 510 is configured as the electric floating status, and a second state, in which the conductive member 510 is electrically connected to the ground member 580-G (e.g., the PCB ground).

According to an embodiment of the present disclosure, the electronic device 500 may monitor a reception sensitivity of the antenna radiator 520 and may selectively provide, at least partially based on the monitored reception sensitivity, one of a first state, in which the conductive member 510 is configured as the electric floating status, and a second state, in which the conductive member 510 is electrically connected to the ground member 580-G (e.g., the PCB ground).

According to an embodiment of the present disclosure, the electronic device 500 may selectively provide, at least partially based on a user input, one of a first state, in which the conductive member 510 is configured as the electric floating status, and a second state, in which the conductive member 510 is electrically connected to the ground member 580-G (e.g., the PCB ground).

According to an embodiment of the present disclosure, the conductive members 510, which are in the electric floating status, may reduce an influence of electromagnetic waves generated from the electronic device 500 on a user's body.

According to an embodiment of the present disclosure, the conductive member 510, which is in the electric floating status, may support the maintaining of the antenna performance of an antenna device that uses the antenna radiator 520.

According to an embodiment of the present disclosure, the conductive member 510, which is electrically connected to the ground member 580-G (e.g., the PCB ground), may support the maintaining of the antenna performance of an antenna device that uses the antenna radiator 520.

According to an embodiment of the present disclosure, the conductive member 510, which is electrically connected to the ground member 580-G (e.g., the PCB ground), may reduce an influence of electromagnetic waves generated from the electronic device 500 on a user's body.

According to an embodiment of the present disclosure, the conductive member 510 may take at least one of a form of a metal plate, a form of a coil type metal pattern, and a form of an annular metal member.

Figure 7A:
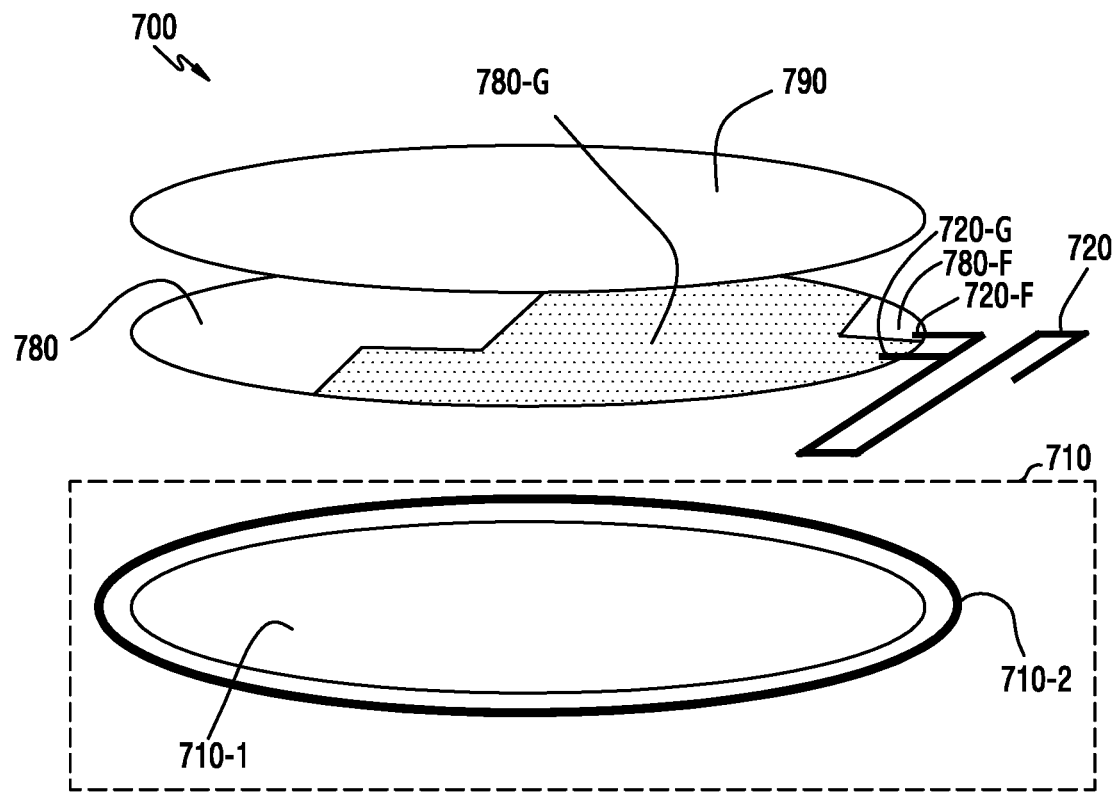
FIGS. 7A and 7B are a view and a block diagram of an electronic device according to embodiments of the present disclosure.
Figure 7B:
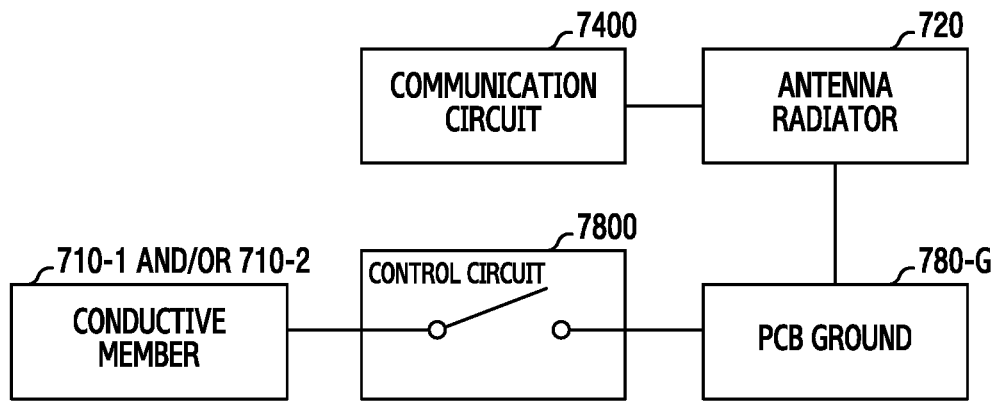

FIGS. 7A and 7B are a view and a block diagram of an electronic device 700 according to embodiments of the present disclosure.

Referring to FIGS. 7A and 7B, an electronic device 700 may include a display 790, a PCB 780, an antenna radiator 720, a conductive member 710, a communication circuit 7400, and a control circuit 7800. According to an embodiment of the present disclosure, the electronic device 700 may be the electronic device 101 of FIG. 1.

According to an embodiment of the present disclosure, the display 790 may output an electrical signal as an image. The display 790 may include, for example, an LCD, an OLED, an active matrix OLED (AMOLED), a plasma display panel (PDP), an electronic paper (E-Paper), or an electro wetting display (EWD).

According to an embodiment of the present disclosure, the display 790 may be configured to receive a touch input or a hovering input. For example, the display 790 may include a touch panel or a digitizer for an electronic pen (or a pen sensor).

According to an embodiment of the present disclosure, the display 790 may be exposed through one face of a housing that forms the exterior of the electronic device 700. The housing may include a first face that forms the front face of the electronic device 700 and a second face that faces in a direction opposite to the first face, and forms the rear face of the electronic device 700. The display 790 may be exposed through the first face of the housing.

According to an embodiment of the present disclosure, the display 790 may take various shapes. For example, the display 790 may have a circular shape as illustrated. In a certain case, the display 790 may have an oval shape, a triangular shape, or a square shape.

According to an embodiment of the present disclosure, the display 790 may have a substantially plate-like shape.

According to an embodiment of the present disclosure, the display 790 may have a substantially curved shape.

According to an embodiment of the present disclosure, the PCB 780 may be disposed between the display 790 and the conductive member 710. The PCB 780 is a part that is configured to mount a plurality of electronic components thereon and configures an electrical circuit that interconnects the electronic components, and may set an execution environment of the electronic device 700, maintain information of the electronic device 700, and support data input/out and exchange of the electronic components within the electronic component 700.

According to an embodiment of the present disclosure, the PCB 780 may include a ground member 780-G (hereinafter, "a PCB ground") and a power feeding unit 780-F. The PCB ground 780-G may be used as an antenna ground for an antenna device that uses the antenna radiator 720.

According to an embodiment of the present disclosure, the PCB ground 780-G may include at least one ground member 430 of FIG. 4.

According to an embodiment of the present disclosure, the antenna radiator 720 may be electrically connected to the PCB 780. The antenna radiator 720 may include a power feeding member 720-F formed at one end thereof and a ground member 720-G formed at the other end. The power feeding member 720-F of the antenna radiator 720 may be electrically connected to the power feeding unit 780-F of the PCB 780, and the ground member 720-G of the antenna radiator 720 may be electrically connected to the PCB ground 780-G of the PCB 780.

According to an embodiment of the present disclosure, the antenna radiator 720 may be, for example, a mono-pole antenna, a loop antenna, an IFA, or a PIFA.

According to an embodiment of the present disclosure, the antenna radiator 720 may be disposed internally to a housing and/or on at least a portion of the housing. For example, at least a portion of the antenna radiator 720 may be disposed between the display 790 and the PCB 780 or may not be disposed between the display 790 and the PCB 780.

According to an embodiment of the present disclosure, a housing forming an exterior of the electronic device 700 may be formed as the antenna radiator 720. In the case where a housing is formed of a metal, the antenna radiator 720 may include a partial metal region or an entire metal region of the housing. Alternatively, the antenna radiator 720 that includes at least a portion of the housing may be exposed.

According to an embodiment of the present disclosure, the conductive member 710 may be electrically connected to the control circuit 7800. The conductive member 710 may be disposed internally to a housing and/or on at least a portion of the housing. For example, the conductive member 710 may form a portion of the second face of the housing.

According to an embodiment of the present disclosure, the conductive member 710 may include a plurality of conductive members. For example, the conductive member 710 may include a first conductive member 710-1 and a second conductive member 710-2.

According to an embodiment of the present disclosure, the second conductive member 710-2 may have a shape that surrounds, for example, at least a portion of the first conductive member 710-1. Alternatively, the second conductive member 710-2 may be an annular metal pattern or metal member.

According to an embodiment of the present disclosure, the communication circuit 7400 may be electrically connected to the antenna radiator 720. For example, the communication circuit 7400 may support various types of communication (e.g., cellular communication) by using the antenna radiator 720.

According to an embodiment of the present disclosure, the control circuit 7800 may be electrically connected to the conductive member 710. The control circuit 7800 may provide, based on various inputs generated from the electronic device 700, a first state, in which the first conductive member 710-1 and/or the second conductive member 710-2 of the conductive member 710 are configured as an electric floating status.

According to an embodiment of the present disclosure, the control circuit 7800 may provide, at least partially based on whether a user is positioned close to the electronic device 700, a first state, in which the first conductive member 710-1 and/or the second conductive member 710-2 of the conductive member 710 are configured as an electric floating status.

According to an embodiment of the present disclosure, the control circuit 7800 may monitor a reception sensitivity of the antenna radiator 720, and may provide, at least partially based on the monitored reception sensitivity, a first state, in which the first conductive member 710-1 and/or the second conductive member 710-2 of the conductive member 710 are configured as an electric floating status.

According to an embodiment of the present disclosure, the control circuit 7800 may provide, at least partially based on a user input, a first state, in which the first conductive member 710-1 and/or the second conductive member 710-2 of the conductive member 710 are configured as an electric floating status.

According to an embodiment of the present disclosure, the first conductive member 710-1 and/or the second conductive member 710-2 of the conductive member 710, which are in the electric floating status, may reduce an influence of electromagnetic waves generated from the electronic device 700 on a user's body.

According to an embodiment of the present disclosure, the first conductive member 710-1 and/or the second conductive member 710-2 of the conductive member 710, which are in the electric floating status, may support maintaining the antenna performance of the antenna device that uses the antenna radiator 720.

Figure 8A:
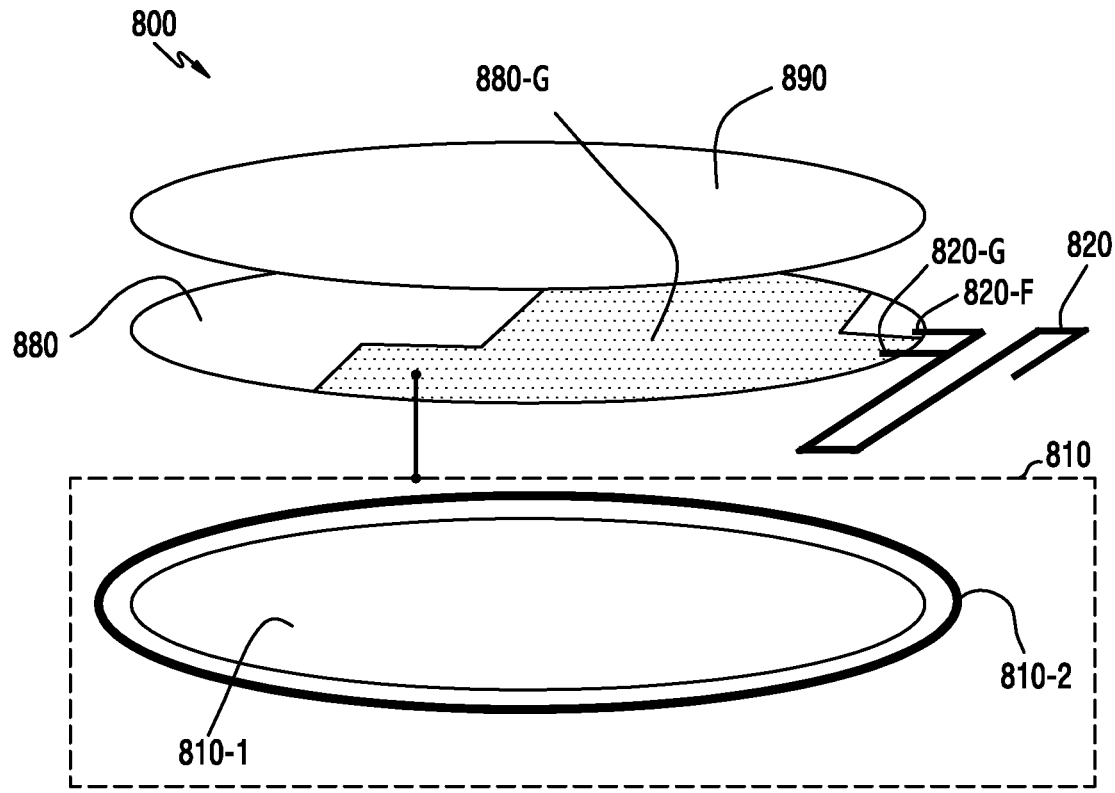
FIGS. 8A and 8B are a view and a block diagram of an electronic device according to embodiments of the present disclosure.
Figure 8B:
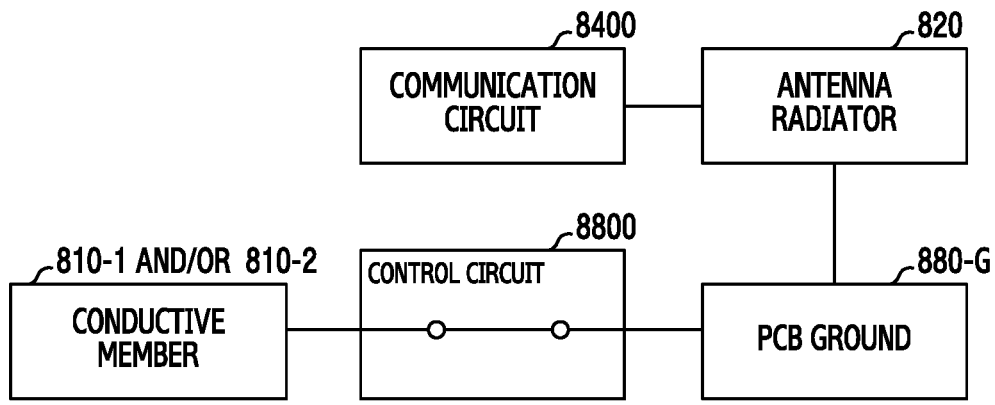

FIGS. 8A and 8B are a view and a block diagram of an electronic device 800 according to embodiments of the present disclosure. The electronic device 800 may be the electronic device 101 of FIG. 1.

Referring to FIGS. 8A and 8B, an electronic device 800 may include a display 890, a PCB 880, an antenna radiator 820, a conductive member 810, a communication circuit 8400, and a control circuit 8800. The display 890, the PCB 880, the antenna radiator 820, the conductive member 810, the communication circuit 8400, and the control circuit 8800 are similar to the display 790, the PCB 780, the antenna radiator 720, the conductive member 710, the communication circuit 7400, and the control circuit 7800 of FIGS. 7A and 7B, and thus the descriptions thereof will be omitted.

According to an embodiment of the present disclosure, the antenna radiator 820 may be electrically connected to the PCB 880. The antenna radiator 820 may include a power feeding member 820-F formed at one end thereof and a ground member 820-G formed at the other end. The power feeding member 820-F of the antenna radiator 820 may be electrically connected to the power feeding unit (not shown) of the PCB 880, and the ground member 820-G of the antenna radiator 820 may be electrically connected to the PCB ground 880-G of the PCB 880.

According to an embodiment of the present disclosure, the PCB 880 may include a ground member 880-G (hereinafter, "a PCB ground").

According to an embodiment of the present disclosure, the PCB ground member 880-G may include at least one ground member 430 of FIG. 4.

According to an embodiment of the present disclosure, the control circuit 8800 may provide, based on various inputs generated from the electronic device 800, a second state, in which the first conductive member 810-1 and/or the second conductive member 810-2 of the conductive member 810 are electrically connected to the PCB ground 880-G.

According to an embodiment of the present disclosure, the control circuit 8800 may provide, at least partially based on whether a user is positioned close to the electronic device 800, a second state, in which the first conductive member 810-1 and/or the second conductive member 810-2 of the conductive member 810 are electrically connected to the PCB ground 880-G.

According to an embodiment of the present disclosure, the control circuit 8800 may monitor a reception sensitivity of the antenna radiator 820, and may provide, at least partially based on the monitored reception sensitivity, a second state, in which the first conductive member 810-1 and/or the second conductive member 810-2 of the conductive member 810 are electrically connected to the PCB ground 880-G.

According to an embodiment of the present disclosure, the control circuit 8800 may provide, at least partially based on a user input, a second state, in which the first conductive member 810-1 and/or the second conductive member 810-2 of the conductive member 810 are electrically connected to the PCB ground 880-G.

According to an embodiment of the present disclosure, the first conductive member 810-1 and/or the second conductive member 810-2 of the conductive member 810, which are electrically connected to the PCB ground 880-G, may support maintaining the antenna performance of the antenna device that uses the antenna radiator 820.

According to an embodiment of the present disclosure, the first conductive member 810-1 and/or the second conductive member 810-2 of the conductive member 810, which are electrically connected to the PCB ground 880-G, may reduce an influence of electromagnetic waves generated from the electronic device 800 on a user's body.

Figure 9A:
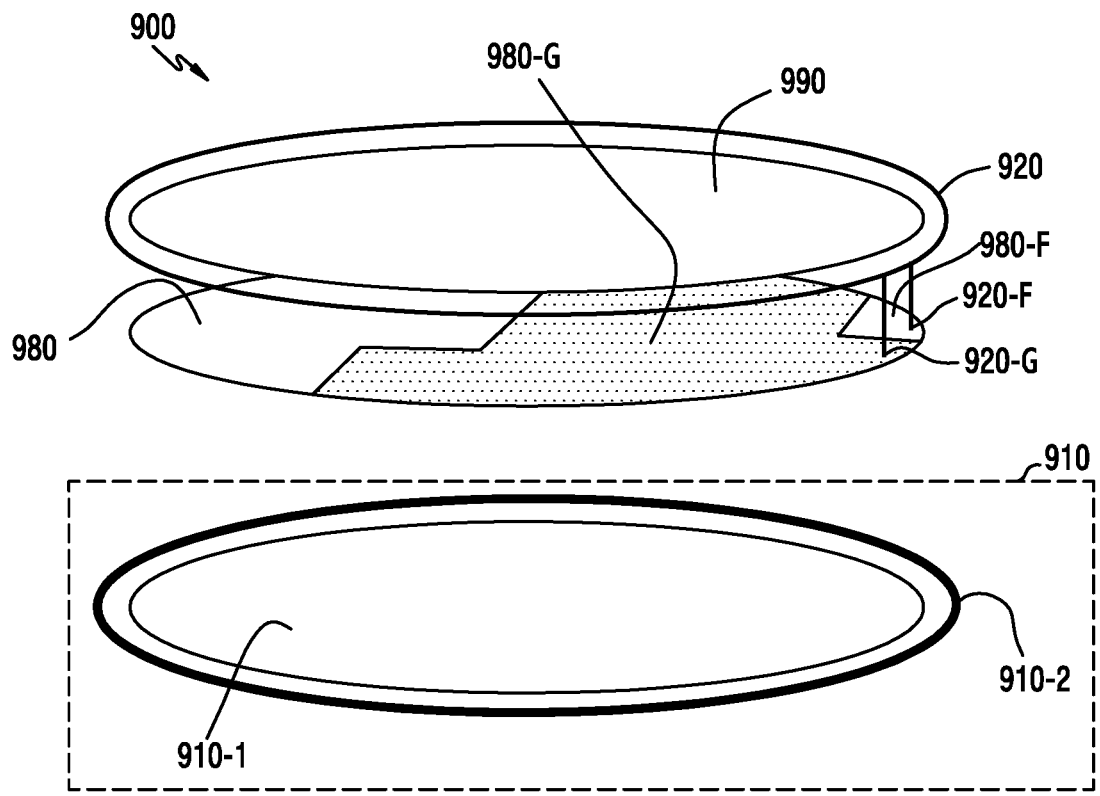
FIGS. 9A and 9B are a view and a block diagram of an electronic device according to embodiments of the present disclosure.
Figure 9B:
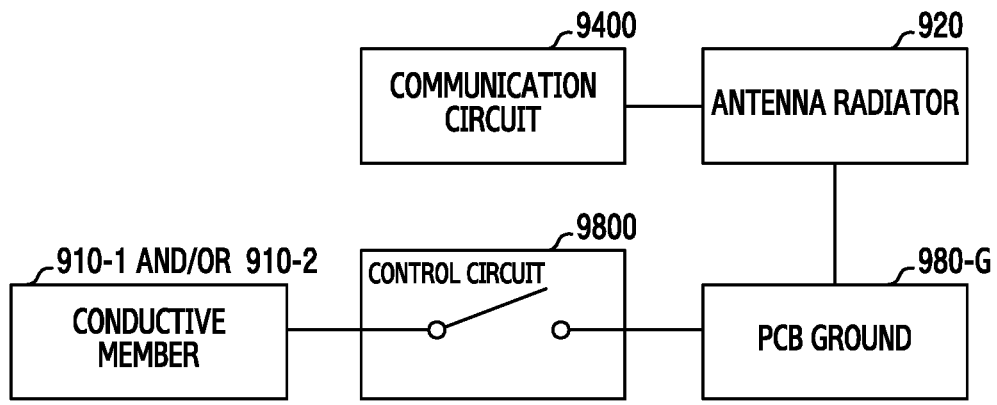

FIGS. 9A and 9B are a view and a block diagram of an electronic device 900 according to embodiments of the present disclosure.

Referring to FIGS. 9A AND 9B, an electronic device 900 may include a display 990, a PCB 980, an antenna radiator 920, a conductive member 910, a communication circuit 9400, and a control circuit 9800. According to an embodiment of the present disclosure, the electronic device 900 may be the electronic device 101 of FIG. 1.

According to an embodiment of the present disclosure, the display 990 may output an electrical signal as an image.

According to an embodiment of the present disclosure, the display 990 may be configured to receive a touch input or a hovering input. For example, the display 990 may include a touch panel or a digitizer for an electronic pen (or a pen sensor).

According to an embodiment of the present disclosure, the display 990 may be exposed through one face of a housing that forms an exterior of the electronic device 900. The housing may include a first face that forms a front face of the electronic device 900 and a second face that faces in a direction opposite to the first face and forms a rear face of the electronic device 900. The display 990 may be exposed through the first face of the housing.

According to an embodiment of the present disclosure, the display 990 may take various shapes. For example, the display 990 may have a circular shape as illustrated. In a certain case, the display 990 may have an oval shape, a triangular shape, or a square shape.

According to an embodiment of the present disclosure, the display 990 may have a substantially plate-like shape.

According to an embodiment of the present disclosure, the display 990 may have a substantially curved shape.

According to an embodiment of the present disclosure, the PCB 980 may be disposed between the display 990 and the conductive member 910. The PCB 980 is a part that is configured to mount a plurality of electronic components thereon and configures an electrical circuit that interconnects the electronic components, and may set an execution environment of the electronic device 900, maintain information of the electronic device 900, and support data input/out and exchange of the electronic components within the electronic device 900.

According to an embodiment of the present disclosure, the PCB 980 may include a ground member 980-G (hereinafter, "a PCB ground") and a power feeding unit 980-F. The PCB ground 980-G may be used as an antenna ground for an antenna device that uses the antenna radiator 920.

According to an embodiment of the present disclosure, the PCB ground member 980-G may include at least one ground member 430 of FIG. 4.

According to an embodiment of the present disclosure, the antenna radiator 920 may be electrically connected to the PCB 980. The antenna radiator 920 may include a power feeding member 920-F formed at one end thereof and a ground member 920-G formed at the other end. For example, the power feeding member 920-F of the antenna radiator 920 may be electrically connected to the power feeding unit 980-F of the PCB 980, and the ground member 920-G of the antenna radiator 920 may be electrically connected to the PCB ground 980-G of the PCB 980. The ground position of the ground member 920-G may be close to the power feeding unit 980-F.

According to an embodiment of the present disclosure, the antenna radiator 920 may be disposed internally to a housing and/or on at least a portion of the housing.

According to an embodiment of the present disclosure, a housing forming an exterior of the electronic device 900 may be formed as the antenna radiator 920. In the case where the housing is formed of a metal, the antenna radiator 920 may include a partial metal region or an entire metal region of the housing. Alternatively, the antenna radiator 920 that includes at least a portion of the housing may be exposed.

According to an embodiment of the present disclosure, the antenna radiator 920 may have a shape surrounding at least a portion of a display 990. For example, the antenna radiator 920 may have an annular shape.

According to an embodiment of the present disclosure, in a case where a distance between the ground member 920-G of the antenna radiator 920 (or a connection point between the PCB 980 and the PCB ground 980-G) and the power feeding unit 980-F of the PCB 980 is equal to or more than a reference, the antenna radiator 920 may operate as a loop antenna radiator.

According to an embodiment of the present disclosure, in a case where a distance between the ground member 920-G of the antenna radiator 920 (or a connection point between the PCB 980 and the PCB ground 980-G) and the power feeding unit 980-F of the PCB 980 is less than or equal to a reference, the antenna radiator 920 may operate as an IFA.

According to an embodiment of the present disclosure, the antenna radiator 920 may form a resonance in one or more frequency bands. Alternatively, the antenna radiator 920 may form multiple resonances in a plurality of frequency bands.

According to an embodiment of the present disclosure, the conductive member 910 may be electrically connected to the control circuit 9800. The conductive member 910 may be disposed internally to a housing and/or on at least a portion of the housing. For example, the conductive member 910 may form a portion of the second face of the housing.

According to an embodiment of the present disclosure, the conductive member 910 may include a plurality of conductive members. For example, the conductive member 910 may include a first conductive member 910-1 and a second conductive member 910-2.

According to an embodiment of the present disclosure, the second conductive member 910-2 may have a shape that surrounds, for example, at least a portion of the first conductive member 910-1. Alternatively, the second conductive member 910-2 may be an annular metal pattern or metal member.

According to an embodiment of the present disclosure, the communication circuit 9400 may be electrically connected to the antenna radiator 920. For example, the communication circuit 9400 may support various types of communication (e.g., cellular communication) by using the antenna radiator 920.

According to an embodiment of the present disclosure, the control circuit 9800 may be electrically connected to the conductive member 910. The control circuit 9800 may provide, based on various inputs generated from the electronic device 900, a first state, in which the first conductive member 910-1 and/or the second conductive member 910-2 of the conductive member 910 are configured as an electric floating status.

According to an embodiment of the present disclosure, the control circuit 9800 may provide, at least partially based on whether a user is positioned close to the electronic device 900, a first state, in which the first conductive member 910-1 and/or the second conductive member 910-2 of the conductive member 910 are configured as an electric floating status.

According to an embodiment, the control circuit 9800 may monitor a reception sensitivity of the antenna radiator 920, and may provide, at least partially based on the monitored reception sensitivity, a first state, in which the first conductive member 910-1 and/or the second conductive member 910-2 of the conductive member 910 are configured as an electric floating status.

According to an embodiment of the present disclosure, the control circuit 9800 may provide, at least partially based on a user input, a first state, in which the first conductive member 910-1 and/or the second conductive member 910-2 of the conductive member 910 are configured as an electric floating status.

According to an embodiment of the present disclosure, the first conductive member 910-1 and/or the second conductive member 910-2 of the conductive member 910, which are in the electric floating status, may reduce an influence of electromagnetic waves generated from the electronic device 900 on a user's body.

According to an embodiment of the present disclosure, the first conductive member 910-1 and/or the second conductive member 910-2 of the conductive member 910, which are in the electric floating status, may support maintaining the antenna performance of the antenna device that uses the antenna radiator 920.

Figure 10A:
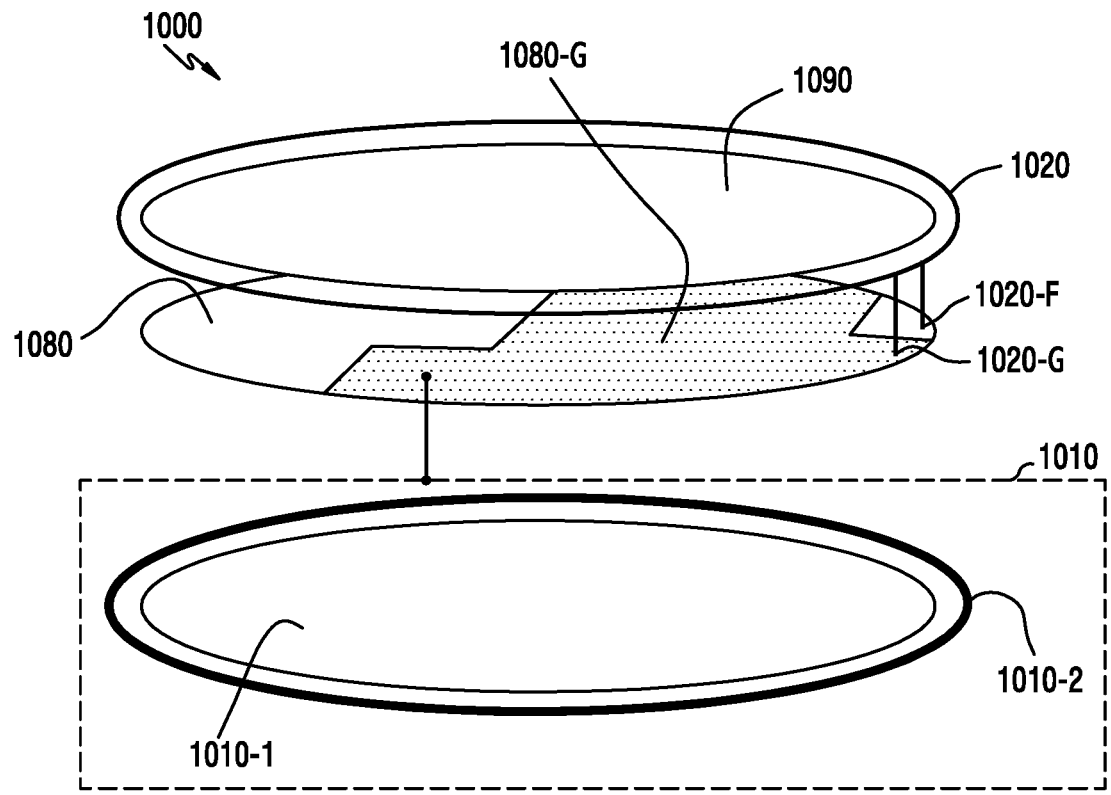
FIGS. 10A and 10B are a view and a block diagram of an electronic device according to embodiments of the present disclosure.
Figure 10B:
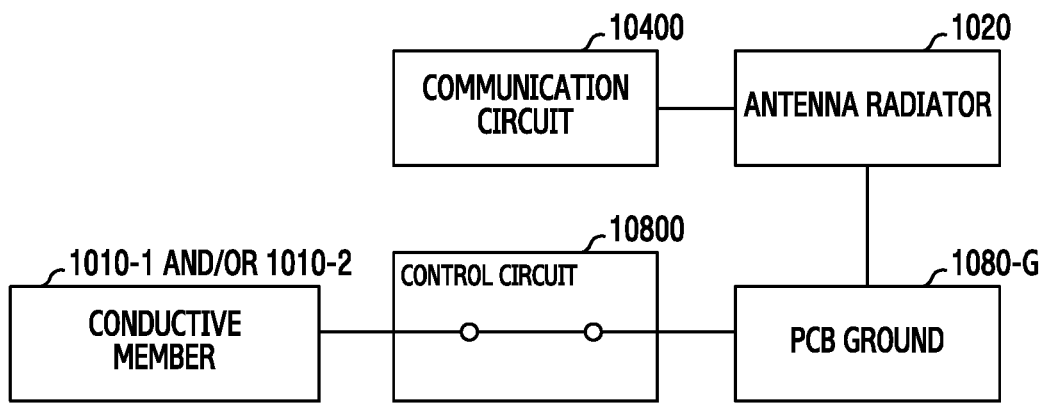

FIGS. 10A and 10B are a view and a block diagram of an electronic device 1000 according to embodiments of the present disclosure. The electronic device 1000 may be the electronic device 101 of FIG. 1.

Referring to FIGS. 10A and 10B, an electronic device 1000 may include a display 1090, a PCB 1080, an antenna radiator 1020, a conductive member 1010, a communication circuit 10400, and a control circuit 10800. The display 1090, the PCB 1080, the antenna radiator 1020, the conductive member 1010, the communication circuit 10400, and the control circuit 10800 are similar to the display 990, the PCB 980, the antenna radiator 920, the conductive member 910, the communication circuit 9400, and the control circuit 9800 of FIGS. 9A and 9B, and thus the descriptions thereof will be omitted.

According to an embodiment of the present disclosure, the antenna radiator 1020 may be electrically connected to the PCB 1080. The antenna radiator 1020 may include a power feeding member 1020-F formed at one end thereof and a ground member 1020-G formed at the other end. The power feeding member 1020-F of the antenna radiator 1020 may be electrically connected to the power feeding unit (not shown) of the PCB 1080, and the ground member 1020-G of the antenna radiator 1020 may be electrically connected to the PCB ground 1080-G of the PCB 1080.

According to an embodiment of the present disclosure, the PCB 1080 may include a ground member 1080-G (hereinafter, "a PCB ground").

According to an embodiment of the present disclosure, the PCB ground member 1080-G may include at least one ground member 430 of FIG. 4.

According to an embodiment of the present disclosure, the control circuit 10800 may provide, based on various inputs generated from the electronic device 1000, a second state, in which the first conductive member 1010-1 and/or the second conductive member 1010-2 of the conductive member 1010 are electrically connected to the PCB ground 1080-G.

According to an embodiment of the present disclosure, the control circuit 10800 may provide, at least partially based on whether a user is positioned close to the electronic device 1000, a second state, in which the first conductive member 1010-1 and/or the second conductive member 1010-2 of the conductive member 1010 are electrically connected to the PCB ground 1080-G.

According to an embodiment of the present disclosure, the control circuit 10800 may monitor a reception sensitivity of the antenna radiator 1020, and may provide, at least partially based on the monitored reception sensitivity, a second state, in which the first conductive member 1010-1 and/or the second conductive member 1010-2 of the conductive member 1010 are electrically connected to the PCB ground 1080-G.

According to an embodiment of the present disclosure, the control circuit 10800 may provide, at least partially based on a user input, a second state, in which the first conductive member 1010-1 and/or the second conductive member 1010-2 of the conductive member 1010 are electrically connected to the PCB ground 1080-G.

According to an embodiment of the present disclosure, the first conductive member 1010-1 and/or the second conductive member 1010-2 of the conductive member 1010, which are electrically connected to the PCB ground 1080-G, may support maintaining the antenna performance of the antenna device that uses the antenna radiator 1020.

According to an embodiment of the present disclosure, the first conductive member 1010-1 and/or the second conductive member 1010-2 of the conductive member 1010, which are electrically connected to the PCB ground 1080-G may reduce an influence of electromagnetic waves generated from the electronic device 1000 on a user's body.

Figure 11A:
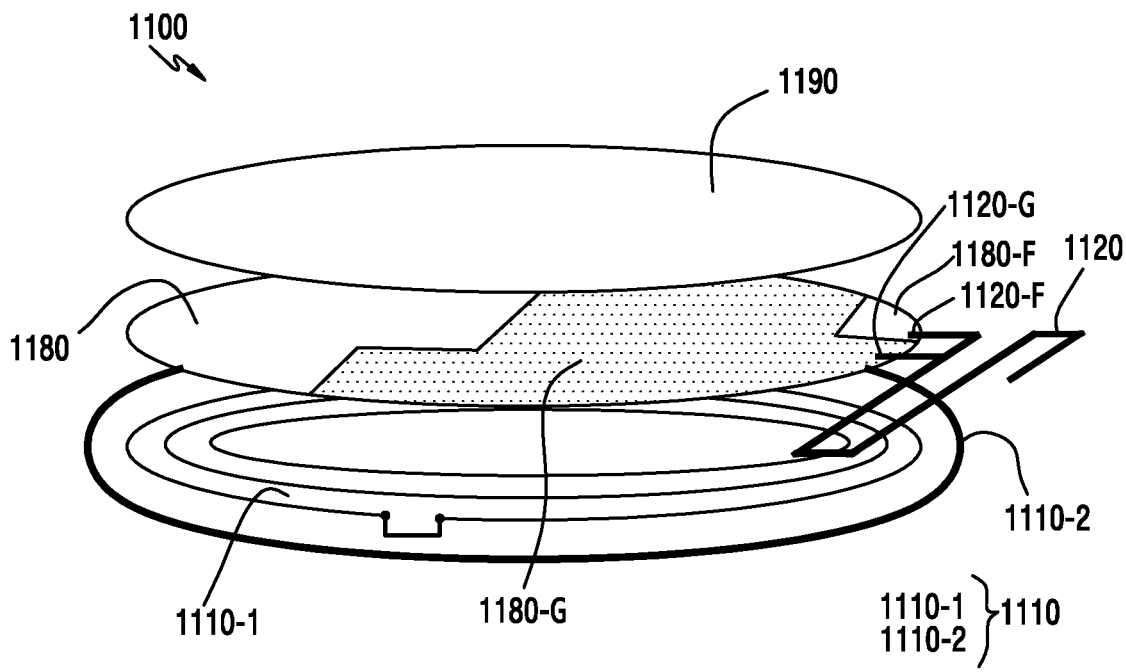
FIGS. 11A and 11B are a view and a block diagram of an electronic device according to embodiments of the present disclosure.
Figure 11B:
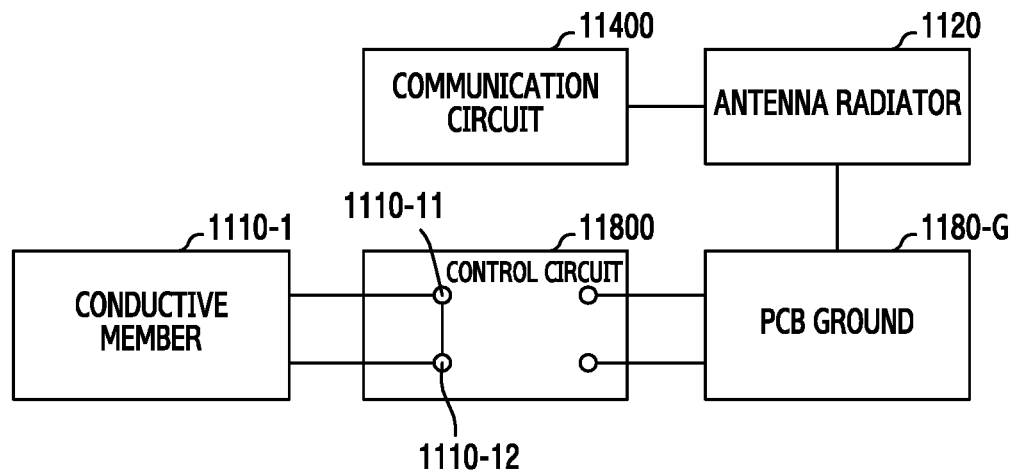

FIGS. 11A and 11B are a view and a block diagram of an electronic device 1100 according to embodiments of the present disclosure. The electronic device 1100 may be the electronic device 101 of FIG. 1.

Referring to FIGS. 11A and 11B, an electronic device 1100 may include a display 1190, a PCB 1180, an antenna radiator 1120, a conductive member 1110, a communication circuit 11400, and a control circuit 11800.

According to an embodiment of the present disclosure, the display 1190 may output an electrical signal as an image.

According to an embodiment of the present disclosure, the display 1190 may be configured to receive a touch input or a hovering input. For example, the display 1190 may include a touch panel or a digitizer for an electronic pen (or a pen sensor).

According to an embodiment of the present disclosure, the display 1190 may be exposed through one face of a housing that forms an exterior of the electronic device 1100. The housing may include a first face that forms a front face of the electronic device 1100 and a second face that faces in a direction opposite to the first face and forms a rear face of the electronic device 1100. The display 1190 may be exposed through the first face of the housing.

According to an embodiment of the present disclosure, the display 1190 may take various shapes. For example, the display 1190 may have a circular shape as illustrated. In a certain case, the display 1190 may have an oval shape, a triangular shape, or a square shape.

According to an embodiment of the present disclosure, the display 1190 may have a substantially plate-like shape.

According to an embodiment of the present disclosure, the display 1190 may have a substantially curved shape.

According to an embodiment, the PCB 1180 may be disposed between the display 1190 and the conductive member 1110. The PCB 1180 is a part that is configured to mount a plurality of electronic components thereon and configures an electrical circuit that interconnects the electronic components, and may set an execution environment of the electronic device 1100, maintain information of the electronic device 1100, and support data input/out and exchange of the electronic components within the electronic component 1100.

According to an embodiment of the present disclosure, the PCB 1180 may include a ground 1180-G (hereinafter, "a PCB ground") and a power feeding unit 1180-F. The PCB ground 1180-G may be used as an antenna ground for an antenna device that uses the antenna radiator 1120.

According to an embodiment of the present disclosure, the PCB ground 1180-G may include at least one ground member 430 of FIG. 4.

According to an embodiment of the present disclosure, the antenna radiator 1120 may be electrically connected to the PCB 1180. For example, the antenna radiator 1120 may include a power feeding member 1120-F formed at one end thereof and a ground member 1120-G formed at the other end. The power feeding member 1120-F of the antenna radiator 1120 may be electrically connected to the power feeding unit 1180-F of the PCB 1180, and the ground member 1120-G of the antenna radiator 1120 may be electrically connected to the PCB ground 1180-G of the PCB 1180.

According to an embodiment of the present disclosure, the antenna radiator 1120 may be, for example, a mono-pole antenna, a loop antenna, an IFA, or a PIFA.

According to an embodiment an embodiment of the present disclosure, the antenna radiator 1120 may be disposed internally to a housing and/or on at least a portion of the housing. For example, at least a portion of the antenna radiator 1120 may be disposed between the display 1190 and the PCB 1180 or may not be disposed between the display 1190 and the PCB 1180.

According to an embodiment of the present disclosure, a housing forming an exterior of the electronic device 1100 may be formed as the antenna radiator 1120. In the case where the housing is formed of a metal, the antenna radiator 1120 may include a partial metal region or an entire metal region of the housing. Alternatively, the antenna radiator 1120 that includes at least a portion of the housing may be exposed.

According to an embodiment of the present disclosure, the conductive member 1110 may be electrically connected to the control circuit 11800. The conductive member 1110 may be disposed internally to a housing and/or on at least a portion of the housing. For example, the conductive member 1110 may form a portion of the second face of the housing.

According to an embodiment of the present disclosure, the conductive member 1110 may include a plurality of conductive members. For example, the conductive member 1110 may include a first conductive member 1110-1 and a second conductive member 1110-2.

According to an embodiment of the present disclosure, the second conductive member 1110-2 may have a shape that surrounds, for example, at least a portion of the first conductive member 1110-1. Alternatively, the second conductive member 1110-2 may be an annular metal pattern or metal member.

According to an embodiment of the present disclosure, the communication circuit 11400 may be electrically connected to the antenna radiator 1120. For example, the communication circuit 11400 may support various types of communication (e.g., cellular communication) by using the antenna radiator 1120.

According to an embodiment of the present disclosure, the control circuit 11800 may be electrically connected to the conductive member 1110.

According to an embodiment of the present disclosure, the first conductive member 1110-1 may be an antenna radiator configured to support various types of communication. For example, the first conductive member 1110-1 may include, for example, an antenna radiator for short range communication or an antenna radiator for magnetic signal transmission/reception.

According to an embodiment of the present disclosure, in a case where a communication supported by the first conductive member 1110-1 is set as a deactivation state, the control circuit 11800 may make an adjustment such that the first conductive member 1110 is not electrically connected to the communication circuit 11400. The control circuit 11800 may provide, based on various inputs generated from the electronic device 1100, a first state, in which the first conductive member 1110-1 is configured as an electric floating status.

According to an embodiment of the present disclosure, the first conductive member 1110-1 may be a radiator configured to support wireless charging. The first conductive member 1110-1 may take the form of a metal plate, a coil type metal pattern, or an annular metal member. The coil type metal pattern may support short range communication (e.g., NFC). Alternatively, the coil type metal pattern may support MST. Alternatively, the coil type metal pattern may support wireless charging.

According to an embodiment of the present disclosure, the coil type metal pattern may support at least one of short range communication, MST, and wireless charging.

According to an embodiment of the present disclosure, in the case where the wireless charging supported by the first conductive member 1110-1 is set as a deactivation state, the control circuit 11800 may make an adjustment such that the first conductive member 1110-1 is not electrically connected to the wireless charging circuit (e.g., the wireless charging circuit 450 of FIG. 4). The control circuit 11800 may provide, based on various inputs generated from the electronic device 1100, a first state, in which the first conductive member 1110-1 is configured as an electric floating status.

According to an embodiment of the present disclosure, the second conductive member 1110-2 may be a metal member that does not support communication and wireless charging. The control circuit 11800 may provide, based on various inputs generated from the electronic device 1100, a first state, in which the second conductive member 1110-2 is configured as an electric floating status.

According to an embodiment of the present disclosure, the control circuit 11800 may provide, at least partially based on whether the user is positioned close to the electronic device 1100, a first state, in which the first conductive member 1110-1 and/or the second conductive member 1100-2 of the conductive member 1100 are configured as an electric floating status.

According to an embodiment of the present disclosure, the control circuit 11800 may monitor a reception sensitivity of the antenna radiator 1120, and may provide, at least partially based on the monitored reception sensitivity, a first state, in which the first conductive member 1110-1 and/or the second conductive member 1100-2 of the conductive member 1100 are configured as an electric floating status.

According to an embodiment of the present disclosure, the control circuit 11800 may provide, at least partially based on a user input, a first state, in which the first conductive member 1110-1 and/or the second conductive member 1100-2 of the conductive member 1100 are configured as an electric floating status.

According to an embodiment of the present disclosure, the control circuit 11800 may provide a first state, in which at least two points of the conductive member 1110 are made to be electrically connected with each other so that the conductive member 1110 is configured as an electric floating status. For example, the control circuit 11800 may electrically connect a first point 1110-11 and a second point 1110-12 of the first conductive member 1110-1, which are separated from each other. If the first point 1110-11 and the second point 1110-12 of the first conductive member 1110-1 are electrically conducted with each other, a closed-loop type electric line may be formed. The first conductive member 1110-1 may be an antenna radiator for short range communication (e.g., an NFC antenna radiator), and the control circuit 11800 may make an adjustment such that the positive (+) terminal and the negative (−) terminal of the antenna radiator for short range communication are electrically connected with each other. The first conductive member 1110-1 may be an antenna radiator (or coil) for wireless charging, and the control circuit 11800 may make an adjustment such that the positive (+) terminal and the negative (−) terminal of the antenna radiator for wireless charging are electrically connected with each other.

According to an embodiment of the present disclosure, the first conductive member 1110-1 and/or the second conductive member 1110-2 of the conductive member 1110, which are in the electric floating status, may reduce an influence of electromagnetic waves generated from the electronic device 1100 on a user's body.

According to an embodiment of the present disclosure, the first conductive member 1110-1 and/or the second conductive member 1110-2 of the conductive member 1110, which are in the electric floating status, may support maintaining the antenna performance of the antenna device that uses the antenna radiator 1120.

Figure 12A:
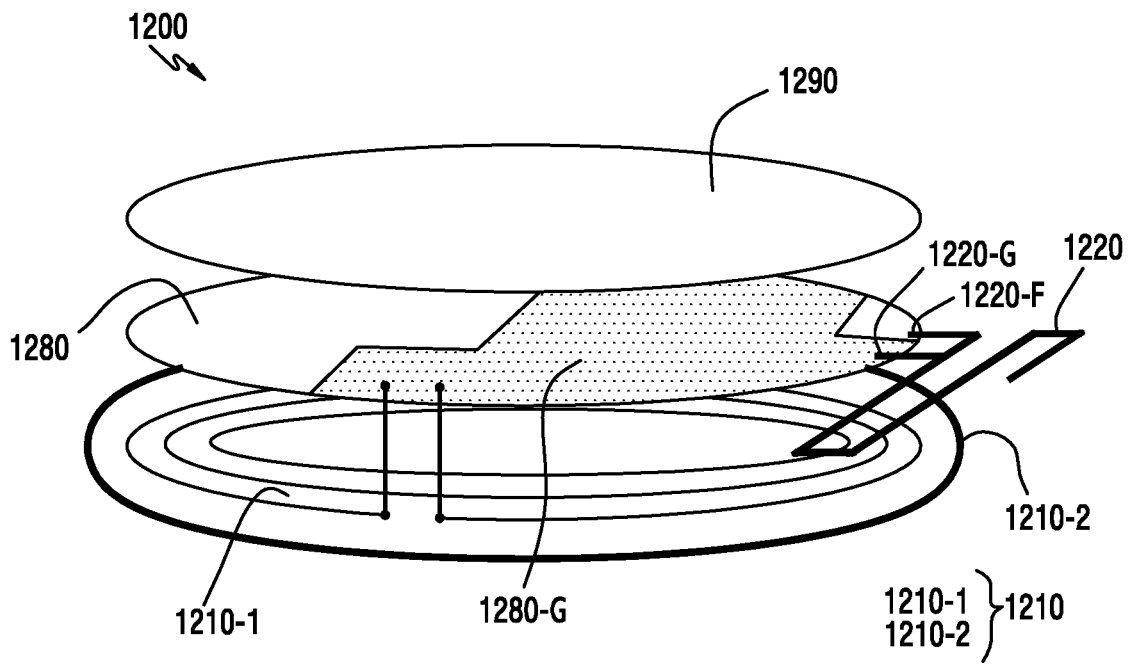
FIGS. 12A and 12B are a view and a block diagram of an electronic device according to embodiments of the present disclosure.
Figure 12B:
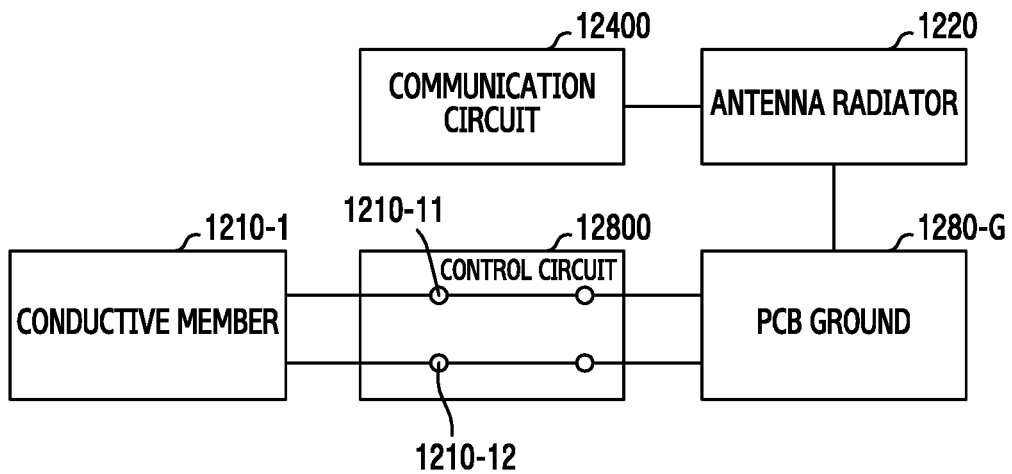

FIGS. 12A and 12B are a view and a block diagram of an electronic device 1200 according to embodiments of the present disclosure. The electronic device 1200 may be the electronic device 101 of FIG. 1.

Referring to FIGS. 12A and 12B, the electronic device 1200 may include a display 1290, a PCB 1280, an antenna radiator 1220, a conductive member 1210, a communication circuit 12400, and a control circuit 12800. The display 1290, the PCB 1280, the antenna radiator 1220, the conductive member 1210, the communication circuit 12400, and the control circuit 12800 are similar to the display 1190, the PCB 1180, the antenna radiator 1120, the conductive member 1110, the communication circuit 11400, and the control circuit 11800 of FIGS. 11A and 11B, and thus the descriptions thereof will be omitted.

According to an embodiment of the present disclosure, the antenna radiator 1220 may be electrically connected to the PCB 1280. The antenna radiator 1220 may include a power feeding member 1220-F formed at one end thereof and a ground member 1220-G formed at the other end. The power feeding member 1220-F of the antenna radiator 1220 may be electrically connected to the power feeding unit (not shown) of the PCB 1280, and the ground member 1220-G of the antenna radiator 1220 may be electrically connected to the PCB ground 1280-G of the PCB 1280.

According to an embodiment of the present disclosure, in the case where the communication supported by the first conductive member 1210-1 is set as a deactivation state, the control circuit 12800 may make an adjustment such that the first conductive member 1210-1 is not electrically connected to the communication circuit 12400. The control circuit 12800 may provide, based on various inputs generated from the electronic device 1200, a second state, in which the first conductive member 1210-1 is electrically connected to the PCB ground 1280-G.

According to an embodiment of the present disclosure, in the case where the wireless charging supported by the first conductive member 1210-1 is set as a deactivation state, the control circuit 12800 may make an adjustment such that the first conductive member 1210-1 is not electrically connected to the wireless charging circuit (e.g., the wireless charging circuit 450 of FIG. 4). The control circuit 12800 may provide, based on various inputs generated from the electronic device 1200, a second state, in which the first conductive member 1210-1 is electrically connected to the PCB ground 1280-G.

According to an embodiment of the present disclosure, the second conductive member 1210-2 may be a metal member that does not support communication and wireless charging. The control circuit 12800 may provide, based on various inputs generated from the electronic device 1100, a second state, in which the second conductive member 1210-2 is electrically connected to the PCB ground 1280-G.

According to an embodiment of the present disclosure, the control circuit 12800 may provide, at least partially based on whether a user is positioned close to the electronic device 1200, a second state, in which the first conductive member 1210-1 and/or the second conductive member 1210-2 of the conductive member 1210 are electrically connected to the PCB ground 1280-G.

According to an embodiment of the present disclosure, the control circuit 12800 may monitor a reception sensitivity of the antenna radiator 1220, and may provide, at least partially based on the monitored reception sensitivity, a second state, in which the first conductive member 1210-1 and/or the second conductive member 1210-2 of the conductive member 1210 are electrically connected to the PCB ground 1280-G.

According to an embodiment of the present disclosure, the control circuit 12800 may provide, at least partially based on a user input, a second state, in which the first conductive member 1210-1 and/or the second conductive member 1210-2 of the conductive member 1210 are electrically connected to the PCB ground 1280-G.

According to an embodiment of the present disclosure, the control circuit 12800 may make an adjustment such that at least one of two or more points of the conductive member 1210 is electrically connected to the PCB ground 1280-G For example, the control circuit 12800 may make an adjustment such that at least one of the first point 1210-11 and second point 1210-12 of the first conductive member 1210-1, which are separated from each other, is electrically connected to the PCB ground 1280-G.

According to an embodiment of the present disclosure, the first conductive member 1210-1 may be an antenna radiator for short range communication (e.g., an NFC antenna radiator), and the control circuit 12800 may make an adjustment such that at least one of the positive (+) terminal and the negative (−) terminal of the antenna radiator for short range communication is electrically connected to the PCB ground 1280-G. The first conductive member 1210-1 may be an antenna radiator (or a coil) for wireless charging, and the control circuit 12800 may make an adjustment such that at least one of the positive (+) terminal and the negative (−) terminal of the antenna radiator for wireless charging is electrically connected to the PCB ground 1280-G.

According to an embodiment of the present disclosure, the first conductive member 1210-1 and/or the second conductive member 1210-2 of the conductive member 1210, which are electrically connected to the PCB ground 1280-G, may support maintaining the antenna performance of the antenna device that uses the antenna radiator 1220.

According to an embodiment of the present disclosure, the first conductive member 1210-1 and/or the second conductive member 1210-2 of the conductive member 1210, which are electrically connected to the PCB ground 1280-G, may reduce an influence of electromagnetic waves generated from the electronic device 1200 on a user's body.

Figure 13A:
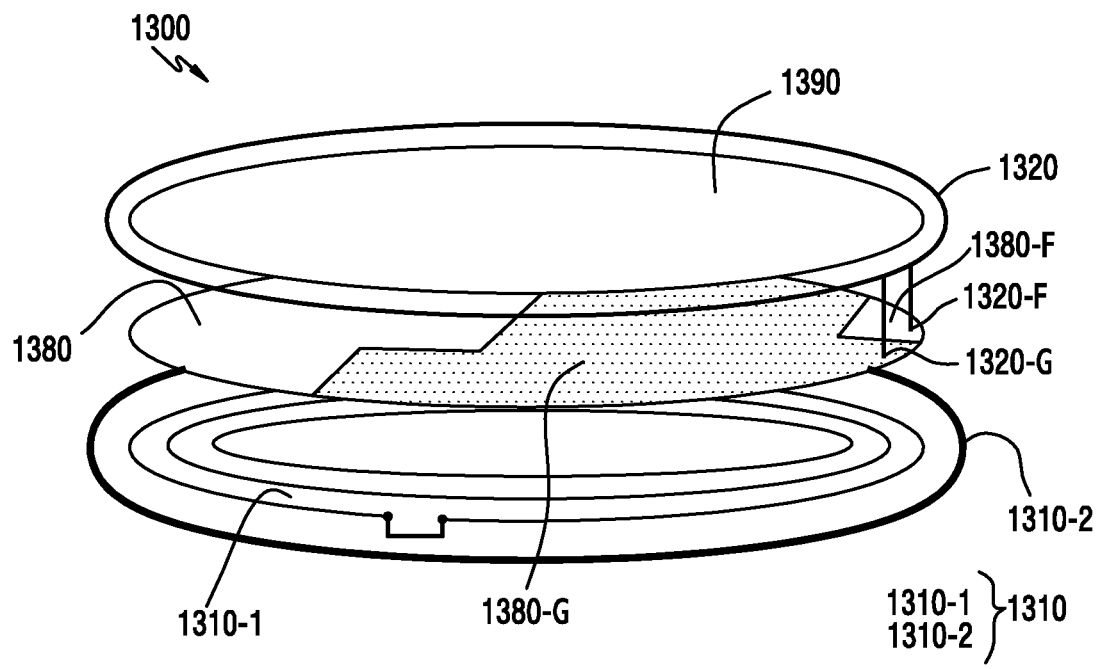
FIGS. 13A and 13B are a view and a block diagram of an electronic device according to embodiments of the present disclosure.
Figure 13B:
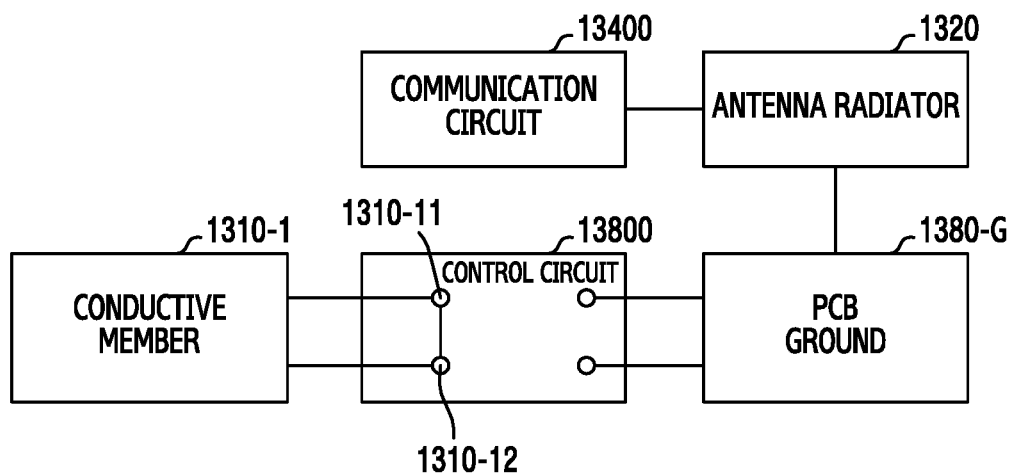

FIGS. 13A and 13B are a view and a block diagram of an electronic device 1300 according to various embodiments of the present disclosure. The electronic device 1300 may be the electronic device 101 of FIG. 1.

Referring to FIG. 13, the electronic device 1300 may include a display 1390, a PCB 1380, an antenna radiator 1320, a conductive member 1310, a communication circuit 13400, and a control circuit 13800.

According to an embodiment of the present disclosure, the display 1390 may output an electrical signal as an image.

According to an embodiment of the present disclosure, the display 1390 may be configured to receive a touch input or a hovering input. For example, the display 1390 may include a touch panel or a digitizer for an electronic pen (or a pen sensor).

According to an embodiment of the present disclosure, the display 1390 may be exposed through one face of a housing that forms the exterior of the electronic device 1300. The housing may include a first face that forms a front face of the electronic device 1300 and a second face that faces in a direction opposite to the first face and forms a rear face of the electronic device 1300. The display 1390 may be exposed through the first face of the housing.

According to an embodiment of the present disclosure, the display 1390 may take various shapes. For example, the display 1390 may have a circular shape as illustrated. In a certain case, the display 1390 may have an oval shape, a triangular shape, or a square shape.

According to an embodiment of the present disclosure, the display 1390 may have a substantially plate-like shape.

According to an embodiment of the present disclosure, the display 1390 may have a substantially curved shape.

According to an embodiment of the present disclosure, the PCB 1380 may be disposed between the display 1390 and the conductive member 1310. The PCB 1380 is a part that is configured to mount a plurality of electronic components thereon and configures an electrical circuit that interconnects the electronic components, and may set an execution environment of the electronic device 1300, maintain the information of the electronic device 1300, and support data input/out and exchange of the electronic components within the electronic device 1300.

According to an embodiment of the present disclosure, the PCB 1380 may include a ground member 1380-G (hereinafter, "a PCB ground") and a power feeding unit 1380-F. The PCB ground 1380-G may be used as an antenna ground for an antenna device that uses the antenna radiator 1320.

According to an embodiment of the present disclosure, the PCB ground member 1380-G may include at least one ground member 430 of FIG. 4.

According to an embodiment of the present disclosure, the antenna radiator 1320 may be electrically connected to the PCB 1380. The antenna radiator 1320 may include a power feeding member 1320-F formed at one end thereof and a ground member 1320-G formed at the other end. The power feeding member 1320-F of the antenna radiator 1320 may be electrically connected to the power feeding unit 1380-F of the PCB 1380, and the ground member 1320-G of the antenna radiator 1320 may be electrically connected to the PCB ground 1380-G of the PCB 1380.

According to an embodiment of the present disclosure, the antenna radiator 1320 may be, for example, a mono-pole antenna, a loop antenna, an IFA, or a PIFA.

According to an embodiment of the present disclosure, the antenna radiator 1320 may be disposed internally to the housing and/or on at least a portion of the housing.

According to an embodiment of the present disclosure, a housing forming an exterior of the electronic device 1300 may be formed as the antenna radiator 1320. In the case where the housing is formed of a metal, the antenna radiator 1320 may include a partial metal region or an entire metal region of the housing. Alternatively, the antenna radiator 1320 including at least a portion of the housing may be exposed.

According to an embodiment of the present disclosure, the antenna radiator 1320 may have a shape surrounding at least a portion of a display 1390. For example, the antenna radiator 1320 may have an annular shape.

According to an embodiment of the present disclosure, in a case where a distance between the ground member 1320-G of the antenna radiator 1320 (or a connection point between the PCB 1380 and the PCB ground 1380-G) and the power feeding unit 1380-F of the PCB 1380 is greater than or equal to a reference, the antenna radiator 1320, the power feeding unit, and the ground unit may operate as one loop antenna radiator, which operates at an electrical length of about $\lambda/2$.

According to an embodiment of the present disclosure, in a case where a distance between the ground member 1320-G of the antenna radiator 1320 (or a connection point between the PCB 1380 and the PCB ground 1380-G) and the power feeding unit 1380-F of the PCB 1380 is less than or equal to a reference (or in proximity to each other), the antenna radiator 1320 may operate as an IFA which operates at an electrical length of $\lambda/4$ between the ground unit and a radiator that is farthest from the power feeding unit.

According to an embodiment of the present disclosure, in a case where a distance between the ground member 1320-G of the antenna radiator 1320 (or a connection point between the PCB 1380 and the PCB ground 1380-G) and the power feeding unit 1380-F of the PCB 1380 is less than or equal to a reference (or in proximity to each other), the antenna radiator 1320 may operate as an IFA which operates at an electrical length of $\lambda/4$ between the power feeding unit and a radiator that is farthest from the ground unit.

According to an embodiment of the present disclosure, in a case where a distance between the ground member 1320-G of the antenna radiator 1320 (or a connection point between the PCB 1380 and the PCB ground 1380-G) and the power feeding unit 1380-F of the PCB 1380 is less than or equal to a reference (or in proximity to each other), the antenna radiator 1320 may operate as an IFA which operates at an electrical length of $\lambda/4$, that includes a radiator that is farthest from the ground unit and/or the feeding unit.

According to an embodiment of the present disclosure, the antenna radiator 1320 may form a resonance in one or more frequency bands. Alternatively, the antenna radiator 1320 may form multiple resonances in a plurality of frequency bands.

According to an embodiment of the present disclosure, the conductive member 1310 may be electrically connected to the control circuit 13800. The conductive member 1310 may be disposed internally to the housing and/or on at least a portion of the housing. For example, the conductive member 1310 may form a portion of the second face of the housing.

According to an embodiment of the present disclosure, the conductive member 1310 may include a plurality of conductive members. For example, the conductive member 1310 may include a first conductive member 1310-1 and a second conductive member 1310-2.

According to an embodiment of the present disclosure, the second conductive member 1310-2 may have a shape that surrounds, for example, at least a portion of the first conductive member 1310-1. Alternatively, the second conductive member 1310-2 may be an annular metal pattern or metal member.

According to an embodiment of the present disclosure, the communication circuit 13400 may be electrically connected to the antenna radiator 1320. For example, the communication circuit 13400 may support various types of communication (e.g., cellular communication) by using the antenna radiator 1320.

According to an embodiment of the present disclosure, the control circuit 13800 may be electrically connected to the conductive member 1310.

According to an embodiment of the present disclosure, the first conductive member 1310-1 may be an antenna radiator configured to support various types of communication. For example, the first conductive member 1310-1 may include, for example, an antenna radiator for short range communication or an antenna radiator for magnetic signal transmission/reception.

According to an embodiment of the present disclosure, in the case where the communication supported by the first conductive member 1310-1 is set as a deactivation state, the control circuit 13800 may make an adjustment such that the first conductive member 1310-1 is not electrically connected to the communication circuit 13400. The control circuit 13800 may provide, based on various inputs generated from the electronic device 1300, a first state, in which the first conductive member 1310-1 is configured as an electric floating status.

According to an embodiment of the present disclosure, the first conductive member 1310-1 may be a radiator configured to support wireless charging. The first conductive member 1310-1 may take a form of a metal plate, a coil type metal pattern, or an annular metal member. The coil type metal pattern may support short range communication (e.g., NFC). Alternatively, the coil type metal pattern may support MST. Alternatively, the coil type metal pattern may support wireless charging.

According to an embodiment of the present disclosure, the coil type metal pattern may support at least one of short range communication, MST, and wireless charging.

According to an embodiment of the present disclosure, in the case where the wireless charging supported by the first conductive member 1310-1 is set as a deactivation state, the control circuit 13800 may make an adjustment such that the first conductive member 1310-1 is not electrically connected to the wireless charging circuit (e.g., the wireless charging circuit 450 of FIG. 4). The control circuit 13800 may provide, based on various inputs generated from the electronic device 1300, a first state, in which the first conductive member 1310-1 is configured as an electric floating status.

According to an embodiment of the present disclosure, the second conductive member 1310-2 may be a metal pattern or a metal member that does not support communication and wireless charging. The control circuit 13800 may provide, based on various inputs generated from the electronic device 1300, a first state, in which the second conductive member 1310-2 is configured as an electric floating status.

According to an embodiment of the present disclosure, the control circuit 13800 may provide, at least partially based on whether the user is positioned close to the electronic device 1300, a first state, in which the first conductive member 1310-1 and/or the second conductive member 1310-2 of the conductive member 1310 are configured as an electric floating status.

According to an embodiment of the present disclosure, the control circuit 13800 may monitor a reception sensitivity of the antenna radiator 1320, and may provide, at least partially based on the monitored reception sensitivity, a first state, in which the first conductive member 1310-1 and/or the second conductive member 1310-2 of the conductive member 1310 are configured as an electric floating status.

According to an embodiment of the present disclosure, the control circuit 13800 may provide, at least partially based on a user input, a first state, in which the first conductive member 1310-1 and/or the second conductive member 1310-2 of the conductive member 1310 are configured as an electric floating status.

According to an embodiment of the present disclosure, the control circuit 13800 may provide a first state, in which at least two points of the conductive member 1310 are made to be electrically connected with each other so that the conductive member 1310 is configured as an electric floating status. For example, the control circuit 13800 may electrically connect the first point 1310-11 and the second point 1310-12 of the first conductive member 1310-1, which are separated from each other. For example, if the first point 1310-11 and the second point 1310-12 of the first conductive member 1310-1 are electrically connected with each other, a closed-loop type electric line may be formed. The first conductive member 1310-1 may be an antenna radiator for short range communication (e.g., an NFC antenna radiator), and the control circuit 13800 may make an adjustment such that the positive (+) terminal and the negative (−) terminal of the antenna radiator for short range communication are electrically connected with each other. The first conductive member 1310-1 may be an antenna radiator (or coil) for wireless charging, and the control circuit 13800 may make an adjustment such that the positive (+) terminal and the negative (−) terminal of the antenna radiator for wireless charging are electrically connected with each other.

According to an embodiment of the present disclosure, the first conductive member 1310-1 and/or the second conductive member 1310-2 of the conductive member 1310, which are in the electric floating status, may reduce an influence of electromagnetic waves generated from the electronic device 1300 on a user's body.

According to an embodiment of the present disclosure, the first conductive member 1310-1 and/or the second conductive member 1310-2 of the conductive member 1310, which are in the electric floating status, may support the maintaining of the antenna performance of the antenna device that uses the antenna radiator 1320.

Figure 14A:
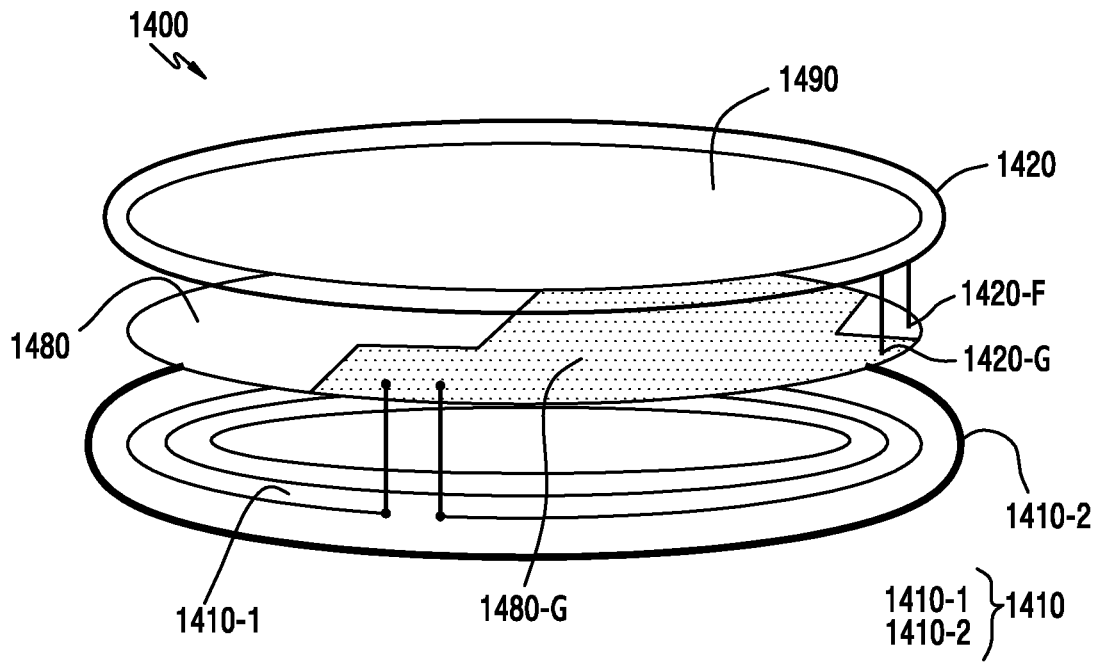
FIGS. 14A and 14B are a view and a block diagram of an electronic device according to embodiments of the present disclosure.
Figure 14B:
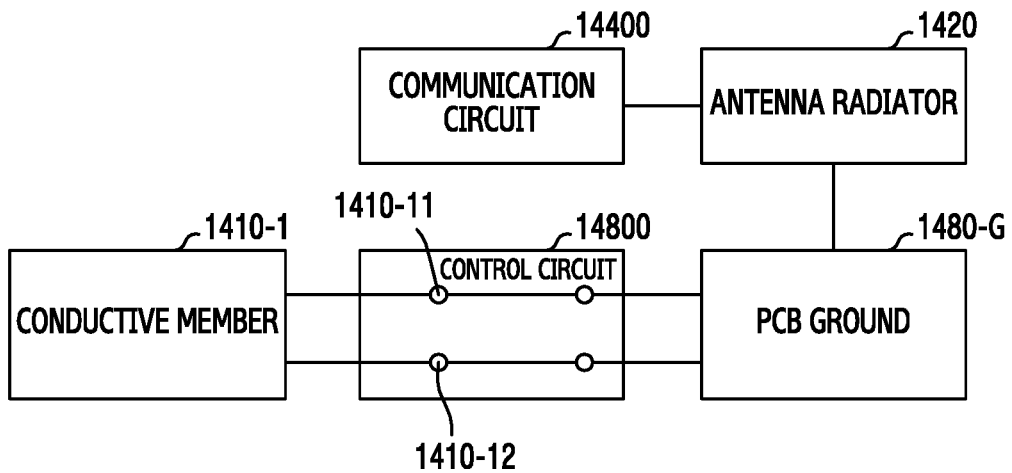

FIGS. 14A and 14B are a view and a block diagram of an electronic device 1400 according to embodiments of the present disclosure. The electronic device 1400 may be the electronic device 101 of FIG. 1.

Referring to FIG. 14, an electronic device 1400 may include a display 1490, a PCB 1480, an antenna radiator 1420, a conductive member 1410, a communication circuit 14400, and a control circuit 14800. The display 1490, the PCB 1480, the antenna radiator 1420, the conductive member 1410, the communication circuit 14400, and the control circuit 14800 are similar to the display 1390, the PCB 1380, the antenna radiator 1320, the conductive member 1310, the communication circuit 13400, and the control circuit 13800 of FIGS. 13A and 13B, and thus the descriptions thereof will be omitted.

According to an embodiment of the present disclosure, the antenna radiator 1420 may be electrically connected to the PCB 1480. The antenna radiator 1420 may include a power feeding member 1420-F formed at one end thereof and a ground member 1420-G formed at the other end. The power feeding member 1420-F of the antenna radiator 1420 may be electrically connected to the power feeding unit (not shown) of the PCB 1480, and the ground member 1420-G of the antenna radiator 1420 may be electrically connected to the PCB ground 1480-G of the PCB 1480.

According to an embodiment of the present disclosure, in the case where the communication supported by the first conductive member 1410-1 is set as a deactivation state, the control circuit 14800 may make an adjustment such that the first conductive member 1410-1 is not electrically connected to the communication circuit 14400. The control circuit 14800 may provide, based on various inputs generated from the electronic device 1400, a second state, in which the first conductive member 1410-1 is electrically connected to the PCB ground 1480-G.

According to an embodiment of the present disclosure, in the case where the wireless charging supported by the first conductive member 1410-1 is set as a deactivation state, the control circuit 14800 may make an adjustment such that the first conductive member 1410-1 is not electrically connected to the wireless charging circuit (e.g., the wireless charging circuit 450 of FIG. 4). The control circuit 14800 may provide, based on various inputs generated from the electronic device 1400, a second state, in which the first conductive member 1410-1 is electrically connected to the PCB ground 1480-G.

According to an embodiment an embodiment of the present disclosure, the second conductive member 1410-2 may be a metal member that does not support communication and wireless charging. The control circuit 14800 may provide, based on various inputs generated from the electronic device 1400, a second state, in which the second conductive member 1410-2 is electrically connected to the PCB ground 1480-G.

According to an embodiment of the present disclosure, the control circuit 14800 may provide, at least partially based on whether the user is positioned close to the electronic device 1400, a second state, in which the first conductive member 1410-1 and/or the second conductive member 1410-2 of the conductive member 1410 are electrically connected to the PCB ground 1480-G.

According to an embodiment of the present disclosure, the control circuit 14800 may monitor a reception sensitivity of the antenna radiator 1420, and may provide, at least partially based on the monitored reception sensitivity, a second state, in which the first conductive member 1410-1 and/or the second conductive member 1410-2 of the conductive member 1410 are electrically connected to the PCB ground 1480-G.

According to an embodiment of the present disclosure, the control circuit 14800 may provide, at least partially based on a user input, a second state, in which the first conductive member 1410-1 and/or the second conductive member 1410-2 of the conductive member 1410 are electrically connected to the PCB ground 1480-G.

According to an embodiment of the present disclosure, the control circuit 14800 may make an adjustment such that at least one of two or more points of the conductive member 1410 is electrically connected to the PCB ground 1480-G. For example, the control circuit 14800 may electrically connect the first point 1410-11 and second point 1410-12 of the first conductive member 1410-1, which are separated from each other.

According to an embodiment of the present disclosure, the first conductive member 1410-1 may be an antenna radiator for short range communication (e.g., an NFC antenna radiator), and the control circuit 14800 may make an adjustment such that at least one of the positive (+) terminal and the negative (−) terminal of the antenna radiator for short range communication is electrically connected to the PCB ground 1480-G The first conductive member 1410-1 may be an antenna radiator (or a coil) for wireless charging, and the control circuit 14800 may make an adjustment such that at least one of the positive (+) terminal and the negative (−) terminal of the antenna radiator for wireless charging is electrically connected to the PCB ground 1480-G.

According to an embodiment of the present disclosure, the first conductive member 1410-1 and/or the second conductive member 1410-2 of the conductive member 1410, which are electrically connected to the PCB ground 1480-G, may support maintaining the antenna performance of the antenna device that uses the antenna radiator 1420.

According to an embodiment of the present disclosure, the first conductive member 1410-1 and/or the second conductive member 1410-2 of the conductive member 1410, which are electrically connected to the PCB ground 1480-C3 may reduce an influence of electromagnetic waves generated from the electronic device 1400 on a user's body.

Figure 15:
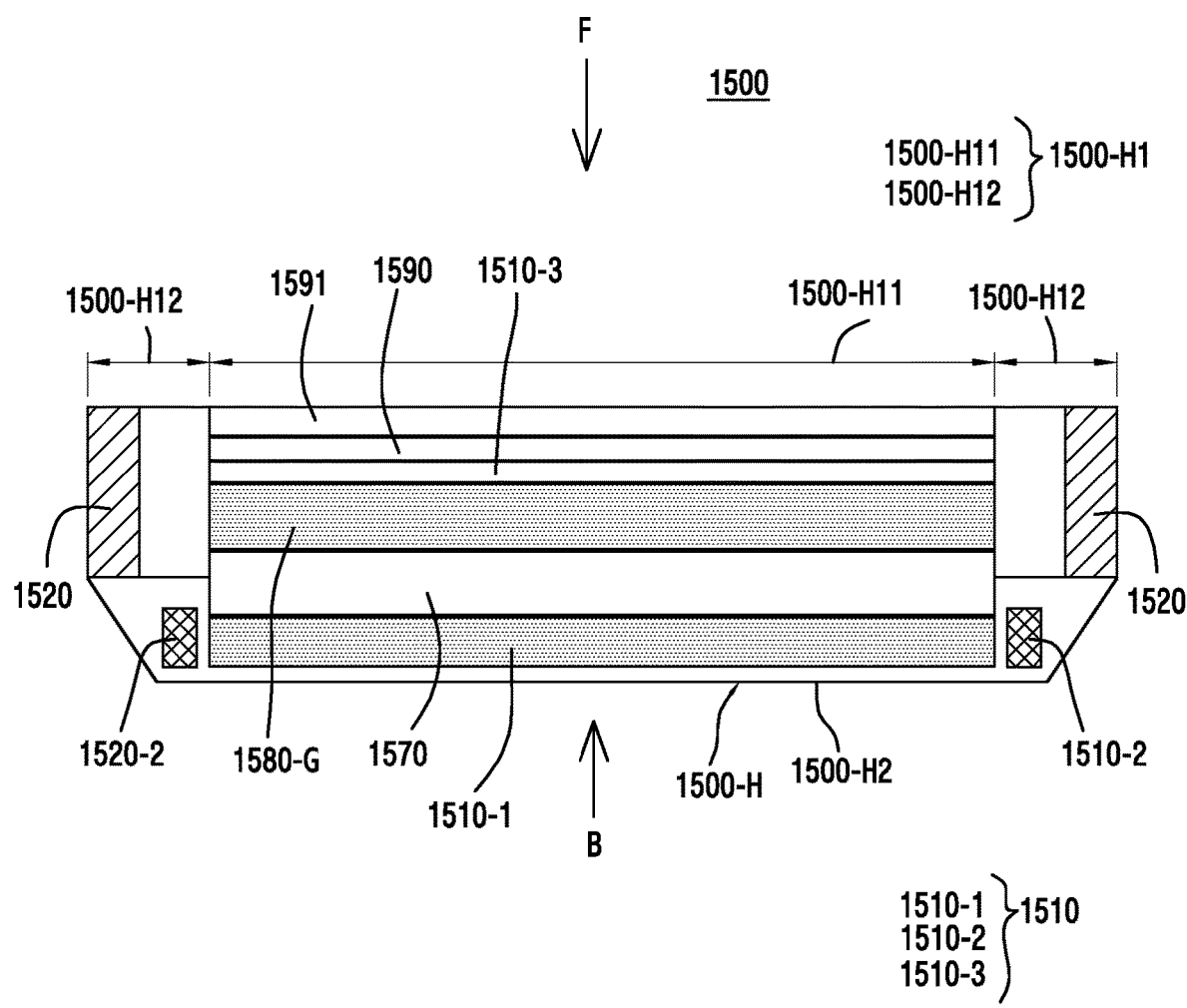
FIG. 15 is a side view of an electronic device according to one embodiment of the present disclosure.

FIG. 15 is a side view of an electronic device 1500 according to one embodiment of the present disclosure. The electronic device 1500 may be the electronic device 101 of FIG. 1.

Referring to FIG. 15, the electronic device 1500 may include a housing 1500-H, a window 1591, a display 1590, a ground member (hereinafter, a PCB ground) 1580-G, a battery 1570, a conductive member 1510, and an antenna radiator 1520.

According to an embodiment of the present disclosure, the housing 1500-H is configured to form the exterior of the electronic device 1500, and may have a substantially cylindrical shape.

According to an embodiment of the present disclosure, the housing 1500-H may include a first face 1500-H1 and a second face 1500-H2 that faces in a direction opposite to the first face 1500-H1. For example, the first face 1500-H1 may form a front face F of the electronic device 1500, and the second face 1500-H2 may form a back face B of the electronic device 1500. As described above, the housing 1500-H may have a substantially cylindrical shape. For example, the first face 1500-H1 may have a substantially circular shape if viewed in a direction from the front face F toward the back face B of the electronic device 1500. For example, the second face 1500-H2 may have a substantially circular shape if viewed in a direction from the back face B toward the front face F of the electronic device 1500.

According to an embodiment of the present disclosure, the first face 1500-H1 may include a transparent central region 1500-H11 and an edge region 1500-H12 that surrounds the transparent region 1500-H11. The transparent central region 1500-H11 may have a substantially circular shape, and the edge region 1500-H12 may have an annular shape.

According to an embodiment of the present disclosure, the transparent central region 1500-H11 of the first face 1500-H1 may be flat, and the annular edge region 1500-H12 of the first face 1500-H1 may be flat or inclined.

According to an embodiment of the present disclosure, the window 1591 may form the transparent central region 1500-H11 of the first face 1500-H1.

According to an embodiment of the present disclosure, the display 1590 may output an electrical signal as an image. The display 1590 may be disposed between the window 1591 and the PCB ground 1580-G The display 1590 may be exposed through the window 1591.

According to an embodiment of the present disclosure, the PCB ground 1580-G may be disposed between the first face 1500-H1 and the second face 1500-H2 of the housing 1500-H. For example, the PCB ground 1580-G may be disposed between a third conductive member 1510-3 (e.g., the NFC antenna radiator) and the battery 1570.

According to an embodiment of the present disclosure, the PCB ground 1580-G may be a portion of a PCB. The PCB is configured to mount a plurality of components of the electronic device 1500 thereon, and may support data input/output and exchange of electronic components within the electronic device 1500 while setting the execution environment of the electronic device 1500.

According to an embodiment of the present disclosure, the battery 1570 may be disposed between the PCB ground 1580-G and the conductive member 1510.

According to an embodiment of the present disclosure, the conductive member 1510 may include a first conductive member 1510-1, a second conductive member 1510-2, and the third conductive member 1510-3.

According to an embodiment of the present disclosure, the first conductive member 1510-1 may be disposed between the second face 1500-H2 of the housing 1500-H and the battery 1570. For example, the first conductive member 1510-1 may be at least a portion of the second face 1500-H2 of the housing 1500-H.

According to an embodiment of the present disclosure, the first conductive member 1510-1 may be used for various types of communication. For example, the first conductive member 1510-1 may be an antenna radiator configured to support short range communication.

According to an embodiment of the present disclosure, the first conductive member 1510-1 may be a wireless charging coil configured to support wireless charging.

According to an embodiment of the present disclosure, the second conductive member 1510-2 may be disposed internally to the housing 1500-H and/or on at least a portion of the second face 1500-H2 of the housing 1500-H. For example, the second conductive member 1510-2 may form a portion of the second face 1500-H2 of the housing 1500-H.

According to an embodiment of the present disclosure, the second conductive member 1510-2 may have an annular shape. For example, the first conductive member 1510-1 may be surrounded by the annular second conductive member 1510-2.

According to an embodiment of the present disclosure, the second conductive member 1510-2 may be a metal pattern or a metal member that does not support a wireless communication and a wireless charging.

According to an embodiment of the present disclosure, the third conductive member 1510-3 may be disposed internally to the housing 1500-H and/or on at least a portion of the second face 1500-H2 of the housing 1500-H. For example, the third conductive member 1510-3 may be disposed between the display 1390 and the PCB ground 1580-G.

According to an embodiment of the present disclosure, the third conductive member 1510-3 may be an antenna radiator configured to support various types of communication. For example, the third conductive member 1510-3 may be configured to support short range communication (e.g., NFC).

According to an embodiment of the present disclosure, the antenna radiator 1520 may be disposed internally to the housing 1500-H and/or on at least a portion of the housing 1500-H. For example, the housing 1500-H may include a cylindrical portion formed of a metallic material, and may be configured as at least a portion of the antenna radiator 1520.

According to an embodiment of the present disclosure, the housing 1500-H may be configured as an antenna radiators 1520 while forming the exterior of the electronic device 1500. In the case where the housing 1500-H is formed of a metal, the antenna radiator 1520 may include a partial metal region or an entire metal region of the housing 1500-H. Alternatively, the antenna radiator 1520 including at least a portion of the housing 1500-H may be exposed.

According to an embodiment of the present disclosure, the antenna radiator 1520 may be electrically connected to a power feeding unit of the PCB on which the PCB ground 1580-G is mounted, and may also be electrically connected to the ground member 1580-G.

According to an embodiment of the present disclosure, the electronic device 1500 may selectively provide, based on various inputs generated from the electronic device 1500, one of a first state, in which at least one of the first conductive member 1510-1, the second conductive member 1510-2, and the third conductive member 1510-3 is configured as the electric floating status, and a second state, in which at least one of the first conductive member 1510-1, the second conductive member 1510-2, and the third conductive member 1510-3 of the conductive member 1510 is electrically connected to the PCB ground 1580-G.

According to an embodiment of the present disclosure, in a case where the first conductive member 1510-1 is a wireless charging coil, and the wireless charging is set as a deactivation state, the electronic device 1500 may selectively provide, based on various inputs generated from the electronic device 1500, one of a first state, in which the first conductive member 1510-1 is configured as the electric floating status, and a second state, in which the first conductive member 1510-1 is electrically connected to the PCB ground 1580-G.

According to an embodiment of the present disclosure, in a case where the third conductive member 1510-3 is an NFC antenna radiator and the NFC communication is set as a deactivation state, the electronic device 1500 may selectively provide, based on various inputs generated from the electronic device 1500, one of a first state, in which the third conductive member 1510-3 is configured as the electric floating status, and a second state, in which the third conductive member 1510-3 is electrically connected to the PCB ground 1580-G.

According to an embodiment of the present disclosure, the electronic device 1500 may selectively provide, at least partially based on whether the user is positioned close to the electronic device 1500, one of a first state, in which at least one of the first conductive member 1510-1, the second conductive member 1510-2, and the third conductive member 1510-3 is configured as the electric floating status, and a second state, in which one of the first conductive member 1510-1, the second conductive member 1510-2, and the third conductive member 1510-3 of the conductive member 1510 are electrically connected to the PCB ground 1580-G.

According to an embodiment of the present disclosure, the electronic device 1500 may monitor a reception sensitivity of the antenna radiator 1520, and may selectively provide, at least partially based on the monitored reception sensitivity, one of a first state, in which at least one of the first conductive member 1510-1, the second conductive member 1510-2, and the third conductive member 1510-3 is configured as the electric floating status, and a second state, in which at least one of the first conductive member 1510-1, the second conductive member 1510-2, and the third conductive member 1510-3 of the conductive member 1510 is electrically connected to the PCB ground 1580-G.

According to an embodiment of the present disclosure, the electronic device 1500 may selectively provide, at least partially based on a user input, one of a first state, in which at least one of the first conductive member 1510-1, the second conductive member 1510-2, and the third conductive member 1510-3 is configured as the electric floating status, and a second state, in which one of the first conductive member 1510-1, the second conductive member 1510-2, and the third conductive member 1510-3 of the conductive member 1510 are electrically connected to the PCB ground 1580-G.

According to an embodiment of the present disclosure, at least portion of the conductive members 1510, which are in the electric floating status, may reduce an influence of electromagnetic waves generated from the electronic device 1500 on a user's body.

According to an embodiment of the present disclosure, at least one of the first conductive member 1510-1, the second conductive member 1510-2, and the third conductive member 1510-3 of the conductive member 1510, which are in the electric floating status, may support maintaining the antenna performance of the antenna device that uses the antenna radiator 1520.

According to an embodiment of the present disclosure, at least one of the first conductive member 1510-1, the second conductive member 1510-2, and the third conductive member 1510-3 of the conductive member 1510, which are electrically connected to the PCB ground 1580-G, may support maintaining the antenna performance of the antenna device that uses the antenna radiator 1520.

According to an embodiment of the present disclosure, at least one of the first conductive member 1510-1, the second conductive member 1510-2, and the third conductive member 1510-3 of the conductive member 1510, which are electrically connected to the PCB ground 1580-G, may reduce an influence of electromagnetic waves generated from the electronic device 1500 on the user's body.

Figure 16:
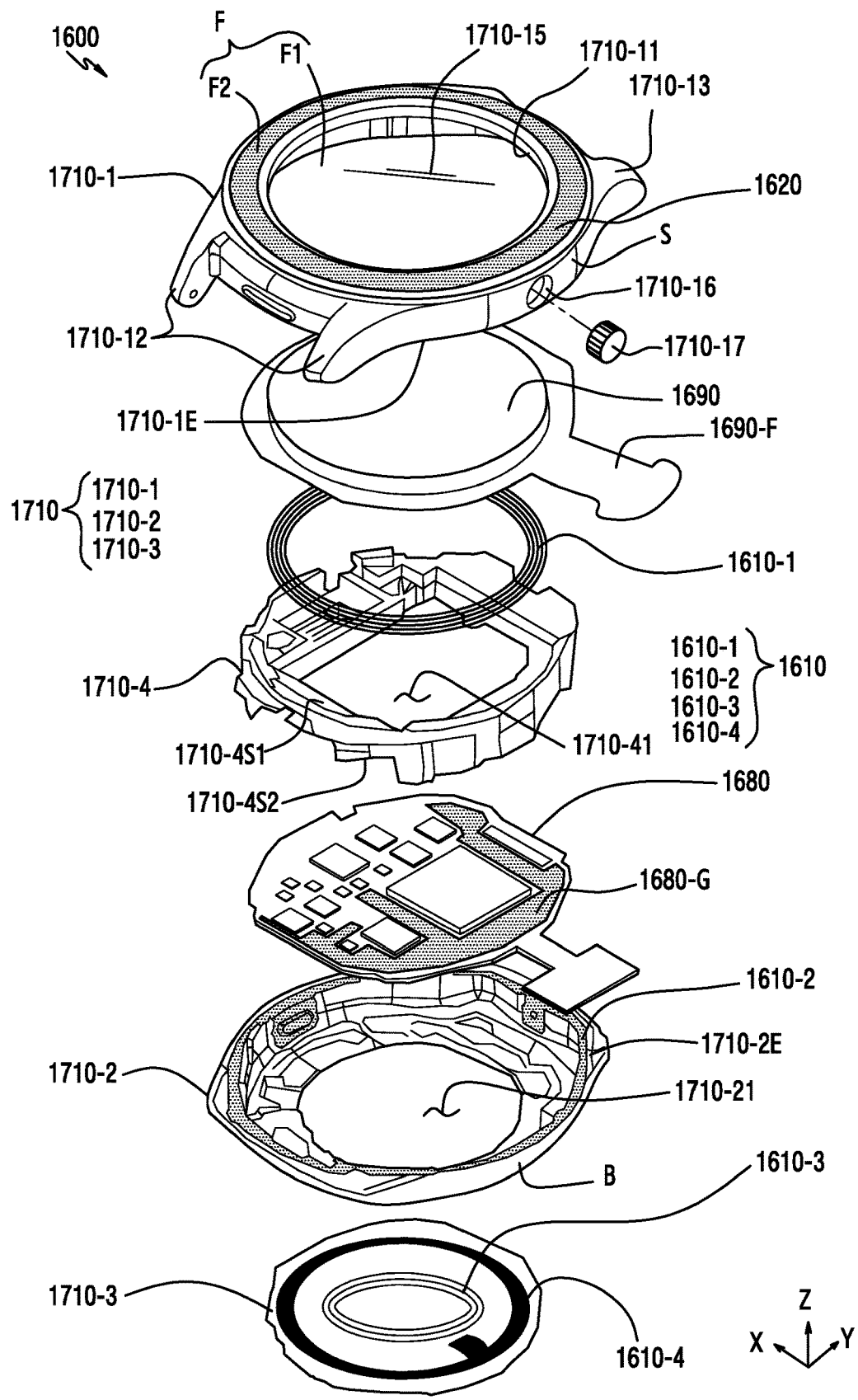
FIGS. 16 and 17 are an exploded view and a perspective view of an electronic device according to an embodiment of the present disclosure.
Figure 17:
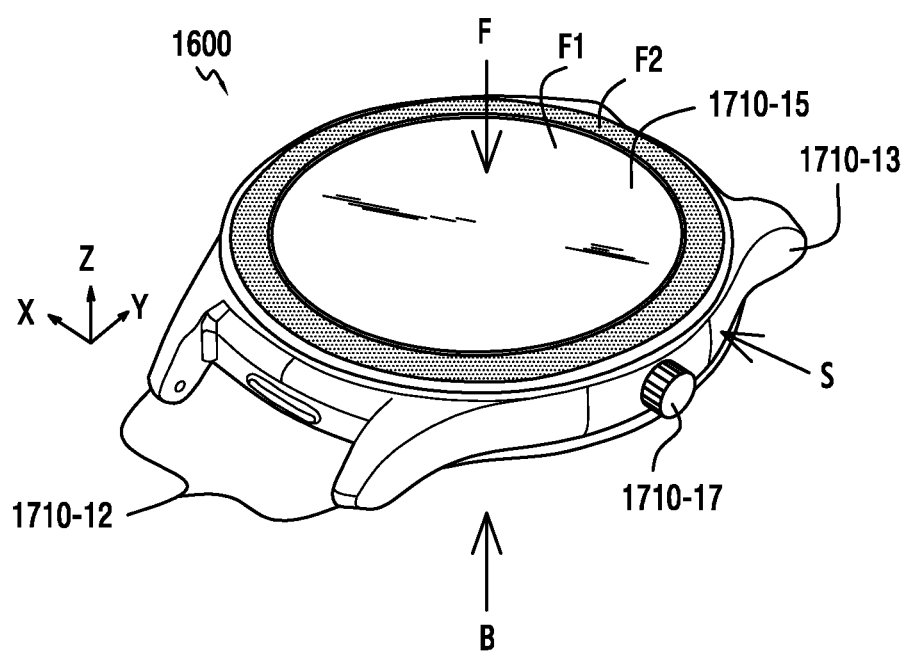

FIGS. 16 and 17 are an exploded view and a perspective view of an electronic device 1600 according to an embodiment of the present disclosure. The electronic device 1600 may be the electronic device 101 of FIG. 1.

Referring to FIGS. 16 and 17, the electronic device 1600 may have a shape that is substantially similar to a typical watch, and may be wearable on a user's wrist. In this case, the electronic device 1600 may include a housing 1710, an antenna radiator 1620, a conductive member 1610, a display 1690, a bracket 1710-4, and a PCB 1680. The electronic device 1600 may be the electronic device 101 of FIG. 1.

According to an embodiment of the present disclosure, the housing 1710 may form an exterior of the electronic device 1600. For example, the housing 1710 may provide a first face F and a second face B that faces in a direction opposite to the first face. The housing 1710 may provide a third face S between the first face F and the second face B.

According to an embodiment of the present disclosure, the housing 1710 may include a first housing 1710-1, a second housing 1710-2, and a cover 1710-3. If the first housing 1710-1, the second housing 1710-2, and the cover 1710-3 are coupled to each other, a component mounting space may be provided.

According to an embodiment of the present disclosure, the first housing 1710-1 may provide a first face F and a third face S of the electronic device 1600. The second housing 1710-2 and the cover 1710-3 may provide a second face B of the electronic device 1600.

According to an embodiment of the present disclosure, the first housing 1710-1 may have a substantially circular ring shape, and may include an opening 1710-11. Alternatively, the first housing 1710-1 may take various shapes, such as a square ring shape and an oval ring shape.

According to an embodiment of the present disclosure, the first housing 1710-1 may include a window (or a glass) 1710-15 disposed in the opening 1710-11.

According to an embodiment of the present disclosure, the first face F may include a transparent central region F1 configured by the transparent window 1710-15 and an annular edge region F2 that surrounds the transparent central region F1. The display 1690 may be exposed through the central region F1.

According to an embodiment of the present disclosure, at least a portion of the first housing 1710-1 may be formed to be connectable to a strap. For example, the first housing 1710-1 may include two pairs of extensions 1710-12 and 1710-13 that extend in opposite directions.

According to an embodiment of the present disclosure, the first housing 1710-1 may include at least one through-hole 1710-16 formed in the third face S. A wheel button 1710-17 serving as a rotary type input device may be disposed in the through-hole 1710-16.

According to an embodiment of the present disclosure, the second housing 1710-2 is coupled to the first housing 1710-1, and may have a substantially annular shape including a perforated part 1710-21. For example, the second housing 1710-2 may include an annular edge portion 1710-2E. The first housing 1710-1 may include an annular edge portion 1710-1E that is capable of being coupled to the edge portion 1710-2E of the second housing 1710-2. A coupling means may be configured between the edge portion 1710-1E of the first housing 1710-1 and the edge portion 1710-2E of the second housing 1710-2. For example, the coupling means may include, for example, mechanical coupling shapes and adhesive.

According to an embodiment of the present disclosure, the cover 1710-3 may have a plate-like shape and may be coupled to the perforated part 1710-21 of the second housing 1710-2 to block the perforated part 1710-21 of the second housing 1710-2. If the second housing 1710-2 and the cover 1710-3 are coupled to each other, a bowl shape may be formed which is substantially concave in a direction from the first face F toward the second face B of the electronic device 1600.

According to an embodiment of the present disclosure, the perforated part 1710-21 of the second housing 1710-2 may have a circular shape, and the cover 1710-3 may have a circular shape corresponding thereto.

According to an embodiment of the present disclosure, the antenna radiator 1620 may be disposed internally to the housing 1710 and/or on at least a portion of the housing 1710. For example, at least a portion of the first housing 1710-1 includes a metallic material, and may form at least a portion of the antenna radiator 1620.

According to an embodiment of the present disclosure, the housing 1710 may be configured as the antenna radiators 1620 while forming the exterior of the electronic device 1700. In a case where the housing 1710 is formed of a metal, the antenna radiator 1620 may include a partial metal region or an entire metal region of the housing 1710. Alternatively, the antenna radiator 1620 including at least a portion of the housing 1710 may be exposed.

According to an embodiment of the present disclosure, the antenna radiator 1620 may be electrically connected to a power feeding unit and a ground unit of the PCB 1680 and may be resonated to transmit or receive a wireless signal. In this case, the antenna radiator 1620 may include a power feeding member that extends to be electrically connected to the power feeding unit of the PCB 1680. The antenna radiator 1620 may include a ground member that extends to be electrically connected to the PCB ground 1680-G of the PCB 1680.

According to an embodiment of the present disclosure, the PCB ground 1680-G may include a ground member 430 of FIG. 4.

According to an embodiment of the present disclosure, the power feeding member or the ground member of the antenna radiator 1620 may have elasticity. Alternatively, the power feeding unit or the ground unit of the PCB 1680 may have elasticity. The power feeding member and the ground member of the antenna radiator 1620 may be in electrical contact with the power feeding unit and the PCB ground 1680-G of the PCB 1680 under elastic support.

According to an embodiment of the present disclosure, the antenna radiator 1620 may include, for example, a mono-pole antenna, a loop antenna, an IFA, a PIFA, or a slot antenna.

According to an embodiment of the present disclosure, the antenna radiator 1620 may be used for at least one type of communication. For example, the antenna radiator 1620 may be used for cellular communication.

According to an embodiment of the present disclosure, the conductive member 1610 may be disposed internally to the housing 1710 or may be disposed on at least a portion of the housing 1710.

According to an embodiment of the present disclosure, the conductive member 1610 may include a first conductive member 1610-1 disposed between the display 1690 and the PCB 1680. The first conductive member 1610-1 may be an antenna radiator configured to support various types of communication. For example, the first conductive member 1610-1 may support short range communication (e.g., NFC). Alternatively, the first conductive member 1610-1 may support magnetic signal transmission/reception.

According to an embodiment of the present disclosure, the conductive member 1610 may include a second conductive member 1610-2 disposed in the second housing 1710-2. For example, the second conductive member 1610-2 may have a substantially annular shape.

According to an embodiment of the present disclosure, the second conductive member 1610-2 may be an antenna radiator configured to support various types of communication. For example, the second conductive member 1610-2 may support short range communication. Alternatively, the second conductive member 1610-2 may support magnetic signal transmission/reception.

According to an embodiment of the present disclosure, the conductive member 1610 may include a third conductive member 1610-3 disposed in the cover 1710-3. For example, the third conductive member 1610-3 may support various types of communication.

According to an embodiment of the present disclosure, the third conductive member 1610-3 may include a wireless charging coil configured to support wireless charging.

According to an embodiment of the present disclosure, the conductive member 1610 may include a fourth conductive member 1610-4 disposed in the cover 1710-3. For example, the fourth conductive member 1610-4 may be an annular metal pattern or metal member that surrounds the third conductive member 1610-3.

According to an embodiment of the present disclosure, the conductive member 1610 may further include a conductive member disposed in the bracket 1710-4.

According to an embodiment of the present disclosure, the display 1690 may be disposed between the window 1710-15 and the bracket 1710-4. The display 1690 may be electrically connected to the PCB 1680, and may display an image corresponding to an electrical signal received from the PCB. The display 1690 may be exposed through the window 1710-15 of the first housing 1710-1. The display 1690 may include, for example, an LCD or an OLED (e.g., AMOLED).

According to an embodiment of the present disclosure, the display 1690 may include an electrical connection means to be electrically connected to the PCB 1680. For example, the display 1690 may include a flexible PCB (FPCB) 1690-F electrically connected to the PCB 1680.

According to an embodiment of the present disclosure, the display 1690 may further include a touch panel configured to perform a touch input or a hovering input thereon. The touch input or the hovering input induced on the display 1690 may be delivered to the PCB 1680.

According to an embodiment of the present disclosure, the display 1690 may provide a display-integrated touch screen. For example, the display 1690 may be an AMOLED-integrated touch screen (on-cell touch sensor panel (TSP) AMOLED (OCTA)).

According to an embodiment of the present disclosure, the bracket 1710-4 is a structure configured to install electronic components thereon to be supported, and may be disposed between the display 1690 and the PCB 1680. The display 1690 and the PCB 1680 may be supported by the bracket 1710-4 to secure rigidity.

According to an embodiment of the present disclosure, the bracket 1710-4 may include a first installation surface 1710-4S1 supported as a portion on which the display 1690 may be installed and a second installation surface 1710-4S2 supported as a portion on which the PCB 1680 may be installed. The installation surfaces 1710-4S1 and 1710-4S2 of the bracket 1710-4 may have a shape (e.g., a recess) that allows the display 1690 and the PCB 1680 to be mounted without being shaken.

According to an embodiment of the present disclosure, the bracket 1710-4 may include a perforated part 1710-41, and may have a substantially annular shape.

According to an embodiment of the present disclosure, the PCB 1680 may configure a plurality of electronic components and a connector to connect the electronic components. The PCB 1680 may set an execution environment of the electronic device 1600, maintain information of the electronic device 1600, and support data input/out and exchange of the electronic components within the electronic device 1600.

According to an embodiment of the present disclosure, the display 1690 may include an extension that is provided with a connector to electrically connect to the PCB 1680. Alternatively, the PCB 1680 may include an extension that is provided with a connector to electrically connect to the display 1690. The extension may pass through the perforated part 1710-41 of the bracket 1710-4 to connect the display 1690 and the PCB 1680. Alternatively, the extension may pass through a side space of the bracket 1710-4 to connect the display 1690 and the PCB 1680. Such an extension may include an FPCB, a cable, or the like.

According to an embodiment of the present disclosure, the PCB 1680 may include a communication circuit electrically connected to the antenna radiator 1620. The communication circuit may support communication that uses the antenna radiator 1620.

According to an embodiment of the present disclosure, in a case where the conductive member 1620 is configured to support various types of communication (e.g., short range communication or magnetic signal transmission/reception), the communication circuit may support the communication that uses the conductive member 1610.

According to an embodiment of the present disclosure, in a case where the conductive member 1610 is configured to support wireless charging, the electronic device 1600 may include a wireless charging circuit mounted on the PCB 1680. The wireless charging circuit may support wireless charging that uses the conductive member 1610.

According to an embodiment of the present disclosure, the PCB 1680 may include a control circuit electrically connected to the conductive member 1610 and the ground member 1630.

According to an embodiment of the present disclosure, in a case where the conductive member 1610 supports various types of communication and the communication supported by the conductive member 1610 is set as an activation state, the control circuit may make an adjustment such that the conductive member 1610 is not electrically connected to the ground member 1630, but is electrically connected to the communication circuit.

According to an embodiment of the present disclosure, in a case where the conductive member 1610 supports various types of communication and the communication supported by the conductive member 1610 is set as an activation state, the control circuit may selectively provide one of a first state, in which the conductive member 1610 is configured as an electric floating status without being electrically connected to the communication circuit, and a second state, in which the conductive member 1610 is electrically connected to the ground member 1630.

According to an embodiment of the present disclosure, the conductive member 1610 may include, for example, a first antenna radiator for wireless charging and a second antenna radiator for short range communication. In this case, the wireless charging and the short range communication may be set as an activation state or a deactivation state by a user input. For example, if both the wireless charging and the short range communication are set as the activation state, the control circuit may make an adjustment such that the first antenna radiator for wireless charging is electrically connected to the wireless charging circuit and the second antenna radiator for short range communication is electrically connected to the communication circuit. For example, if both the wireless charging and the short range communication are set as the deactivation state, the control circuit may make an adjustment such that the first antenna radiator for wireless charging is not electrically connected to the wireless charging circuit and the second antenna radiator for short range communication is not electrically connected to the communication circuit. For example, if both the wireless charging and the short range communication are set as the deactivation state, the control circuit may selectively provide one of a first state, in which at least one of the first antenna radiator for wireless charging and the second antenna radiator for short range communication is configured as the electric floating status, and a second state, in which at least one of the first antenna radiator for wireless charging and the second antenna radiator for short range communication is electrically connected to the one or more ground members 1630.

For example, if the wireless charging is set as the activation state and the short range communication is set as the deactivation state, the control circuit may make an adjustment such that the first antenna radiator for wireless charging is electrically connected to the wireless charging circuit and the second antenna radiator for short range communication is not electrically connected to the communication circuit. The control circuit may selectively provide one of a first state, in which the second antenna radiator for short range communication is configured as the electric floating status, and a second state, in which the second antenna radiator is electrically connected to the ground member 1630.

For example, if the wireless charging is set as the deactivation state and the short range communication is set as the activation state, the control circuit may make an adjustment such that the first antenna radiator for wireless charging is not electrically connected to the wireless charging circuit and the second antenna radiator for short range communication is electrically connected to the communication circuit. The control circuit may selectively provide one of a first state, in which the first antenna radiator for wireless charging is configured as the electric floating status, and a second state, in which the first antenna radiator is electrically connected to the ground member 1630.

According to an embodiment of the present disclosure, in a case where the conductive member 1610 is configured not to support communication, the control circuit may selectively provide one of a first state, in which the conductive member 1610 is configured as an electric floating status, and a second state, in which the conductive member 1610 is electrically connected to the ground member 1630.

According to an embodiment of the present disclosure, the first state, in which the conductive member 1610 is configured as the electric floating status may be a state in which the antenna radiator 1620 is electrically connected to the PCB ground 1680-G. In the first state, the conductive member 1610 may not be used as an antenna ground, and the PCB ground 1680-G may be used as an antenna ground.

According to an embodiment of the present disclosure, the second state, in which the conductive member 1610 is electrically connected to the PCB ground 1680-G may be a state, in which the antenna radiator 1620 is electrically connected to the PCB ground 1680-G and the conductive member 1610. In the second state, the conductive member 1610 may be used as an antenna ground along with the PCB ground 1680-G.

According to an embodiment of the present disclosure, the control circuit may selectively provide, at least partially based on whether the user is positioned close to the electronic device 1600, one of a first state, in which the conductive member 1610 is configured as the electric floating status, and a second state, in which the conductive member 1610 is electrically connected to the ground member 1630. The electronic device 1600 may further include a sensor configured to generate a signal indicating whether the user is positioned close to the electronic device 1600, and the control circuit may selectively provide, at least partially based on the signal from the sensor, one of a first state, in which the conductive member 1610 is configured as the electric floating status, and a second state, in which the conductive member 1610 is electrically connected to the ground member 1630. For example, if it is sensed that the user is positioned close to the electronic device 1600, the control circuit may provide the first state, in which the conductive member 1610 is configured as the electric floating status. The sensor may include a temperature sensor, a pressure sensor, a magnetic sensor, an optical sensor, a sound sensor, a proximity sensor, a weight sensor, an acceleration sensor, a gyro sensor, a fingerprint sensor, or the like. The sensor may be disposed at least one of the PCB 1680, the bracket 1710-4, and the housing 1710.

According to an embodiment of the present disclosure, the control circuit may monitor a reception sensitivity of the antenna radiator 1620, and may selectively provide, at least partially based on the monitored reception sensitivity, one of a first state, in which the conductive member 1610 is configured as the electric floating status, and a second state, in which the conductive member 1610 is electrically connected to the ground member 1630. For example, if the reception sensitivity of the antenna radiator 1620 is less than or equal to a reference, the control circuit may provide the second state where the conductive member 1610 is electrically connected to the ground members 1630.

According to an embodiment of the present disclosure, the control circuit may selectively provide, at least partially based on a user input, one of a first state, in which the conductive member 1610 is configured as the electric floating status, and a second state, in which the conductive member 1610 is electrically connected to the ground member 1630. The electronic device 1600 may further include a user interface, and the control circuit may selectively provide, at least partially based on a user input received through the user interface, one of a first state, in which the conductive member 1610 is configured as the electric floating status, and a second state, in which the conductive member 1610 is electrically connected to the ground member 1630.

According to an embodiment of the present disclosure, the conductive members 1610, which is in the electric floating status, may reduce an influence of electromagnetic waves generated from the electronic device 1600 on a user's body.

According to an embodiment of the present disclosure, the conductive member 1610, which is in the electric floating status, may support maintaining the antenna performance of an antenna device that uses the antenna radiator 1620.

According to an embodiment of the present disclosure, the conductive member 1610, which is electrically connected to the PCB ground 1680-G, may support maintaining the antenna performance of an antenna device that uses the antenna radiator 1620.

According to an embodiment of the present disclosure, the conductive member 1610, which is electrically connected to the PCB ground 1680-G, may reduce an influence of electromagnetic waves generated from the electronic device 1600 on a user's body.

Figure 18:
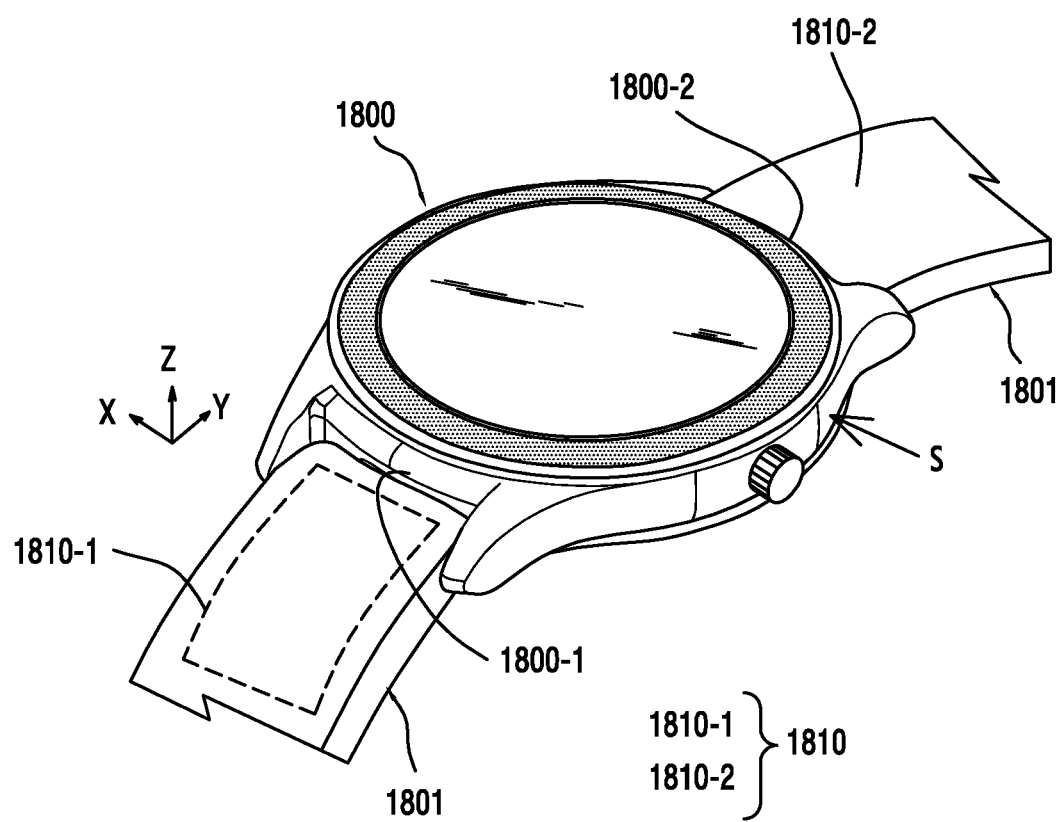
FIG. 18 is a view of an electronic device according to an embodiment of the present disclosure.

FIG. 18 is a view of an electronic device 1800 according to an embodiment of the present disclosure. The electronic device 1800 may be the electronic device 101 of FIG. 1.

Referring to FIG. 18, the external electronic device 1800 may be the electronic device 1600 of FIGS. 16A to 17B. Straps 1801 required for wrist wearing may be rotatably connected to the opposite sides of the electronic device 1800, respectively. The straps 1801 may have flexibility.

According to an embodiment of the present disclosure, each of the straps 1801 may include a conductive member 1810.

According to an embodiment of the present disclosure, the conductive member 1810 may include a first conductive member 1810-1 that supports various types of communication.

According to an embodiment of the present disclosure, the first conductive member 1810-1 may be a loop antenna.

According to an embodiment of the present disclosure, the first conductive member 1810-1 may be disposed in the inside of each strap 1801 or may be disposed on one face of each strap 1801. Alternatively, the first conductive member 1810-1 may be at least a portion of the strap 1801.

According to an embodiment of the present disclosure, the conductive member 1810 may include a second conductive member 1810-2 that includes a metal member.

According to an embodiment of the present disclosure, the second conductive member 1810-2 may be disposed internally to each strap 1801 or may be disposed on one face of each strap 1801. Alternatively, the second conductive member 1810-2 may be at least a portion of each strap 1801.

According to an embodiment of the present disclosure, each strap 1801 may be molded in a manner of coating a conductive member 1810 with a non-conductive material (e.g., insert injection molding).

According to an embodiment of the present disclosure, electrical connection units 1800-1 and 1800-2 may be disposed at connection portions between the electronic device 1800 and the straps 1801 so as to electrically connect the conductive members 1810 to the electronic device 1800.

According to an embodiment of the present disclosure, the electronic device 1800 may include a communication circuit electrically connected to an antenna radiator (e.g., the antenna radiator 1720 of FIG. 17). The communication circuit may support communication that uses the antenna radiator 1720.

According to an embodiment of the present disclosure, in a case where the first conductive member 1810-1 of each strap 1801 is configured to support various types of communication (e.g., short range communication), the communication circuit may support the communication that uses the first conductive member 1810-1.

According to an embodiment of the present disclosure, the electronic device 1800 may include a control circuit electrically connected to the conductive member 1810 and a ground member (e.g., the PCB ground 1680-G of FIG. 16).

According to an embodiment of the present disclosure, in a case where the communication supported by the first conductive member 1810-1 of a strap 1801 is set as an activation state, the control circuit may make an adjustment such that the first conductive member 1810-1 is not electrically connected to the ground member (e.g., the PCB ground 1780-G of FIG. 17), but is electrically connected to the communication circuit.

According to an embodiment of the present disclosure, in a case where the communication supported by the first conductive member 1810-1 is set as a deactivation state, the control circuit may selectively provide one of a first state, in which the first conductive member 1810-1 is configured as an electric floating status without being electrically connected to the communication circuit, and a second state, in which the first conductive member 1810-1 is electrically connected to the ground member (e.g., the PCB ground 1680-G of FIG. 16).

According to an embodiment of the present disclosure, the control circuit may selectively provide one of a first state, in which the second conductive member 1810-2 is configured as the electric floating status, and a second state, in which the second conductive member 1810-2 is electrically connected to the ground member (e.g., the PCB ground 1680-G of FIG. 16).

According to an embodiment of the present disclosure, the first state, in which the first conductive member 1810-1 and/or the second conductive member 1810-2 are configured as the electric floating status may be a state, in which the antenna radiator (e.g., the antenna radiator 1620 of FIG. 16) is electrically connected to the PCB ground (e.g., the PCB ground 1680-G of FIG. 16) and the ground member (e.g., the ground member 1630 of FIG. 16). In the first state, the first conductive member 1810-1 and/or the second conductive member 1810-2 may not be used as an antenna ground, and the ground member (e.g., the ground member 1630 of FIG. 16) and the PCB ground (the PCB ground 1680-G of FIG. 16) may be used as an antenna ground.

According to an embodiment of the present disclosure, the second state, in which the first conductive member 1810-1 and/or the second conductive member 1810-2 are electrically connected to the ground member (e.g., the ground member 1630 of FIG. 16) may be a state in which the antenna radiator (e.g., the antenna radiator 1620 of FIG. 16) is electrically connected to the ground member (the ground member 1630 of FIG. 16) and the conductive member 1810. In the second state, the first conductive member 1810-1 and/or the second conductive member 1810-2 may be used as an antenna ground together with the PCB ground (the PCB ground 1680-G of FIG. 16) and the ground member (e.g., the ground member 1630 of FIG. 16).

According to an embodiment of the present disclosure, the control circuit may selectively provide, at least partially based on whether the user is positioned close to the electronic device 1800, one of a first state, in which the conductive member 1810 is configured as the electric floating status, and a second state, in which the conductive member 1810 is electrically connected to the ground member (e.g., the PCB ground 1680-G of FIG. 16).

According to an embodiment of the present disclosure, the control circuit may monitor a reception sensitivity of the antenna radiator 1620, and may selectively provide, at least partially based on the monitored reception sensitivity, one of a first state, in which the conductive member 1810 is configured as the electric floating status, and a second state, in which the conductive member 1810 is electrically connected to the ground member (e.g., the PCB ground 1680-G of FIG. 16).

According to an embodiment of the present disclosure, the control circuit may selectively provide, at least partially based on a user input, one of a first state, in which the conductive member 1810 is configured as the electric floating status, and a second state, in which the conductive member 1810 is electrically connected to the ground member (e.g., the PCB ground 1680-G of FIG. 16).

According to an embodiment of the present disclosure, the conductive members 1810, which is in the electric floating status, may reduce an influence of electromagnetic waves generated from the electronic device 1800 on a user's body.

According to an embodiment of the present disclosure, the conductive member 1810, which is in the electric floating status, may support maintaining the antenna performance of an antenna device that uses the antenna radiator 1820.

According to an embodiment of the present disclosure, the conductive member 1810, which is electrically connected to the PCB ground (e.g., the PCB ground 1680-G of FIG. 16), may support maintaining the antenna performance of an antenna device that uses the antenna radiator (e.g., the antenna radiator 1620 of FIG. 16).

According to an embodiment of the present disclosure, the conductive member 1810, which is electrically connected to the PCB ground (e.g., the PCB ground 1680-G of FIG. 16), may reduce an influence of electromagnetic waves generated from the electronic device 1800 on a user's body.

According to an embodiment of the present disclosure, an electronic device may include a housing including a first face and a second face that faces in a direction opposite to the first face; a display exposed through the first face of the housing; a ground member disposed between the first face and the second face; an antenna radiator at least partially disposed within the housing and/or on a portion of the housing; a communication circuit electrically connected to the antenna radiator; a conductive member disposed within the housing or forming a portion of the second face of the housing; and a control circuit electrically connected to the ground member and the conductive member. In this case, the control circuit may be configured to selectively connect the conductive member to the ground member if the antenna radiator and the communication circuit are electrically connected to each other.

According to an embodiment of the present disclosure, the control circuit may be configured to selectively provide one of a first state, in which the antenna radiator is electrically connected to the ground member, but is not electrically connected to the conductive member; and a second state, in which the antenna radiator is electrically connected to the ground member and the conductive member.

According to an embodiment of the present disclosure, the control circuit may be configured to selectively provide one of the first state and the second state at least partially based on whether a user is positioned close to the electronic device.

According to an embodiment of the present disclosure, the control circuit may be configured to monitor a reception sensitivity of the antenna radiator, and to selectively provide one of the first state and the second state at least partially based on the monitored reception sensitivity.

According to an embodiment of the present disclosure, the electronic device may further include a sensor configured to generate a signal that indicates whether the user is positioned close to the electronic device, and the control circuit may be configured to selectively provide one of the first state and the second state at least partially based on the signal from the sensor.

According to an embodiment of the present disclosure, the electronic device may further include a user interface, and the control circuit may be configured to selectively provide one of the first state and the second state at least partially based on a user input received through the user interface.

According to an embodiment of the present disclosure, the electronic device may further include a wireless charging circuit, and the control circuit may be configured to electrically connect the wireless charging circuit and the conductive member in the first state, and to wirelessly receive power from outside by using the conductive member and the wireless charging circuit.

According to an embodiment of the present disclosure, the communication circuit may include a short range communication circuit, and the control circuit may be configured to electrically connect the short range communication circuit and the conductive member in the first state, and to perform communication with an external device by using the short range communication circuit.

According to an embodiment of the present disclosure, the communication circuit may include a communication circuit based on a magnetic signal, and may electrically connect the communication circuit based on the magnetic signal and the conductive member in the first state. The control circuit may be configured to perform communication with an external device by using the communication circuit based on the magnetic signal.

According to an embodiment of the present disclosure, the conductive member may include at least one of a metal plate, a coil type metal pattern, and an annular metal member.

According to an embodiment of the present disclosure, the antenna radiator may have a shape that surrounds at least a portion of the display.

According to an embodiment of the present disclosure, the conductive member may include a conductive pattern that includes a first end and a second end, and the control circuit may be configured to selectively electrically connect the first end and the second end on the conductive member to the ground member.

According to an embodiment of the present disclosure, the conductive member may include a conductive pattern that includes a first end and a second end, and the control circuit may be configured to electrically connect the first end and the second end in a state where the conductive member is not connected to the ground member.

According to an embodiment of the present disclosure, the electronic device may further include a wearing instrument attached to the housing and configured to be detachable from/attachable to a portion of a user's body.

According to an embodiment of the present disclosure, the electronic device may further include a PCB, and the ground member may include a portion of the PCB.

According to an embodiment of the present disclosure, the display may include an OLED display, the OLED display may include a FPCB, and the FPCB may include a portion to be connected to a structure that includes the ground member.

Figure 19:
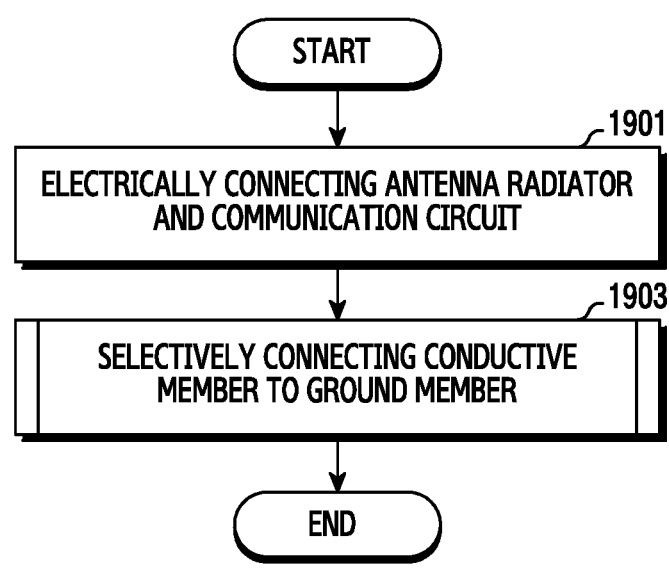
FIG. 19 is a flowchart of an operation procedure of an electronic device according to an embodiment of the present disclosure.

FIG. 19 is a flowchart of an operation procedure of an electronic device according to an embodiment of the present disclosure. The operation procedure of FIG. 19 will be described below with reference to FIG. 4.

Referring to FIG. 19, in operation 1901, the antenna radiator 420 may be electrically connected to the communication member 440.

In operation 1903, the control circuit 480 may selectively connect the conductive member 410 to the ground member 430.

According to an embodiment of the present disclosure, in a case where the conductive member 410 supports various types of communication and the communication supported by the conductive member 410 is set as a deactivation state, the control circuit 480 may selectively provide one of a first state, in which the conductive member 410 is configured as an electric floating status without being electrically connected to the communication circuit, and a second state, in which the conductive member 410 is electrically connected to the ground member 430.

According to an embodiment of the present disclosure, the conductive member 410 may include a plurality of antenna radiators that support different types of communication. For example, the conductive member 410 may include an antenna radiator for first communication (e.g., an antenna radiator for short range communication) and an antenna radiator for second communication (e.g., an antenna radiator for magnetic signal transmission/reception). In this case, the first communication and the second communication may be set as an activation state or a deactivation state by a user input. If both the first communication and the second communication are set as the activation state, the control circuit 480 may make an adjustment such that the antenna radiator for first communication and the antenna radiator for second communication are electrically connected to the communication member 440. If both the first communication and the second communication are set as the deactivation state, the control circuit 480 may make an adjustment such that the antenna radiator for first communication and the antenna radiator for second communication are not electrically connected to the communication member 440. If both the first communication and the second communication are set as the deactivation state, the control circuit 480 may selectively provide one of a first state, in which at least one of the antenna radiator for first communication and the antenna radiator for second communication is configured as the electric floating status, and a second state, in which at least one of the antenna radiator for first communication and the antenna radiator for second communication is connected to the ground member 430.

For example, if the first communication is set as the activation state and the second communication is set as the deactivation state, the processor 480-1 may control the switch 480-2 such that the antenna radiator for first communication of the conductive member 410 is electrically connected to the communication member 440. The processor 480-1 may selectively provide one of a first state, in which the antenna radiator for second communication of the conductive member 410 is configured as the electric floating status 490 without being electrically connected to the communication member 440, and a second state, in which the antenna radiator for second communication of the conductive member 410 is electrically connected to the ground member 430.

According to an embodiment of the present disclosure, the conductive member 410 may include, for example, a first antenna radiator for wireless charging and a second antenna radiator for short range communication. In this case, the wireless charging and the short range communication may be set as an activation state or a deactivation state by a user input. If both the wireless charging and the short range communication are set as the activation state, the control circuit 480 may make an adjustment such that the first antenna radiator for wireless charging is electrically connected to the wireless charging circuit 450 and the second antenna radiator for short range communication is electrically connected to the communication member 440. If both the wireless charging and the short range communication are set as the deactivation state, the control circuit 480 may make an adjustment such that the first antenna radiator for wireless charging is not electrically connected to the wireless charging circuit 450 and the second antenna radiator for short range communication is not electrically connected to the communication member 440. If both the wireless charging and the short range communication are set as the deactivation state, the control circuit 480 may selectively provide a first state, in which at least one of the first antenna radiator for wireless charging and the second antenna radiator for short range communication is configured as the electric floating status, or a second state, in which at least one of the first antenna radiator for wireless charging and the second antenna radiator for short range communication is electrically connected to the ground member 430.

For example, if the wireless charging is set as the activation state and the short range communication is set as the deactivation state, the control circuit 480 may make an adjustment such that the first antenna radiator for wireless charging is electrically connected to the wireless charging circuit and the second antenna radiator for short range communication is not electrically connected to the communication circuit. The control circuit 480 may selectively provide one of a first state, in which the second antenna radiator for short range communication is configured as the electric floating status, and a second state, in which the second antenna radiator is electrically connected to the ground member 430.

For example, if the wireless charging is set as the deactivation state and the short range communication is set as the activation state, the control circuit 480 may make an adjustment such that the first antenna radiator for wireless charging is not electrically connected to the wireless charging circuit and the second antenna radiator for short range communication is electrically connected to the communication circuit. The control circuit 480 may selectively provide one of a first state, in which the first antenna radiator for wireless charging is configured as the electric floating status, and a second state, in which the first antenna radiator is electrically connected to the ground member 430.

According to an embodiment of the present disclosure, in a case where the conductive member 410 is configured not to support various types of communication, the control circuit 480 may selectively provide one of a first state, in which the conductive member 410 is configured as the electric floating status, and a second state, in which the conductive member 410 is electrically connected to the ground member 430.

According to an embodiment of the present disclosure, the first state, in which the conductive member 410 is configured as the electric floating status may be a state, in which the antenna radiator 420 is electrically connected to a ground member 430 (e.g., the PCB ground 580-G of FIG. 6). In the first state, the conductive member 410 may not be used as an antenna ground, and the ground member 430 (e.g., a PCB ground) may be used as an antenna ground.

According to an embodiment of the present disclosure, the second state, in which the conductive member 410 is electrically connected to the ground member 430 may be a state, in which the antenna radiator 420 is electrically connected to the ground member 430 and the conductive member 410. In the second state, the conductive member 410 may be used as an antenna ground along with the ground member 430.

According to an embodiment of the present disclosure, the conductive members 410, which is in the electric floating status, may reduce an influence of electromagnetic waves generated from the electronic device 400 on a user's body.

According to an embodiment of the present disclosure, the conductive member 410, which is in the electric floating status, may support maintaining the antenna performance of an antenna device that uses the antenna radiator 420.

According to an embodiment of the present disclosure, the conductive member 410, which is electrically connected to the ground member 430, may support maintaining the antenna performance of an antenna device that uses the antenna radiator 520.

According to an embodiment of the present disclosure, the conductive member 410, which is electrically connected to the ground member 430, may reduce an influence of electromagnetic waves generated from the electronic device 400 on a user's body.

Figure 20:
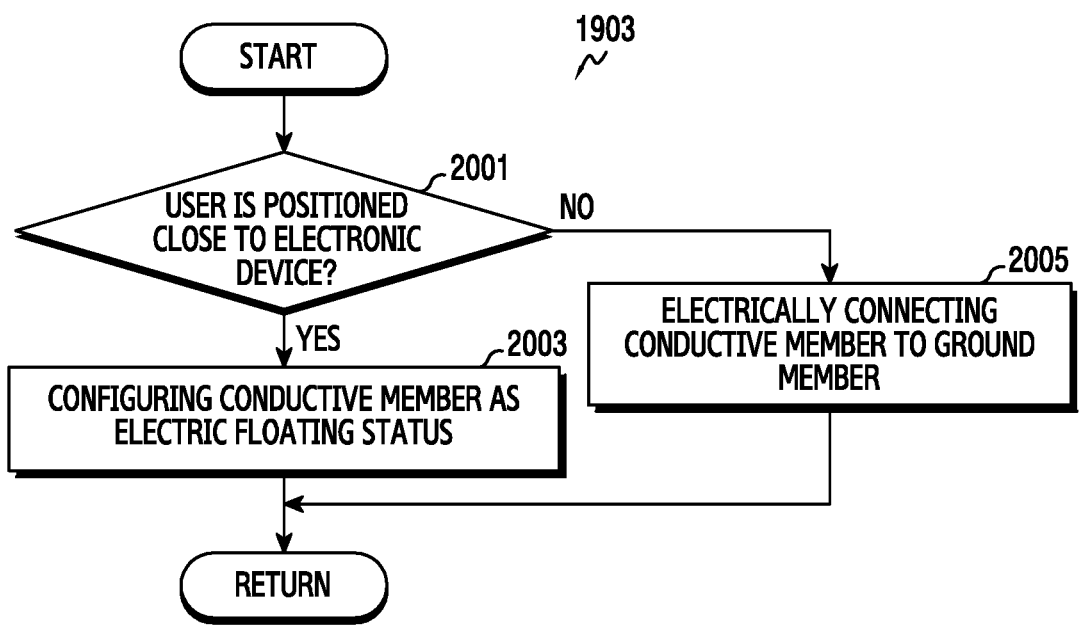
FIG. 20 is a flowchart of operation 1903 of FIG. 19 of selectively connecting a conductive member to a ground member according to an embodiment of the present disclosure.

FIG. 20 is a flowchart of operation 1903 of FIG. 19 of selectively connecting a conductive member to a ground member according to an embodiment of the present disclosure. The operation procedure of FIG. 20 is described below with reference to FIG. 4. In this case, the conductive member 410 may be a metal member that does not support communication.

Referring to FIG. 20, if a user is positioned close to the electronic device 400 in operation 2001, the control circuit 480 may sense this and may perform operation 2003. For example, the electronic device 400 may further include a sensor configured to generate a signal indicating whether the user is positioned close to the electronic device 400 (e.g., a heart rate sensor, a temperature sensor, an acceleration sensor, a gyro sensor, or a proximity sensor). In response to the signal from the sensor, the control circuit 480 may confirm that the user is positioned close to the electronic device 400.

In operation 2003, the control circuit 480 may make an adjustment such that the conductive member 410 is configured as the electric floating status 490.

If it is sensed that the user is not positioned close to the electronic device 400 in operation 2001, the control circuit 480 may sense this and may perform operation 2005.

In operation 2005, the control circuit 480 may make an adjustment such that the conductive member 410 is electrically connected to the ground member 430 (e.g., the PCB ground 580-G of FIG. 6).

Figure 21:
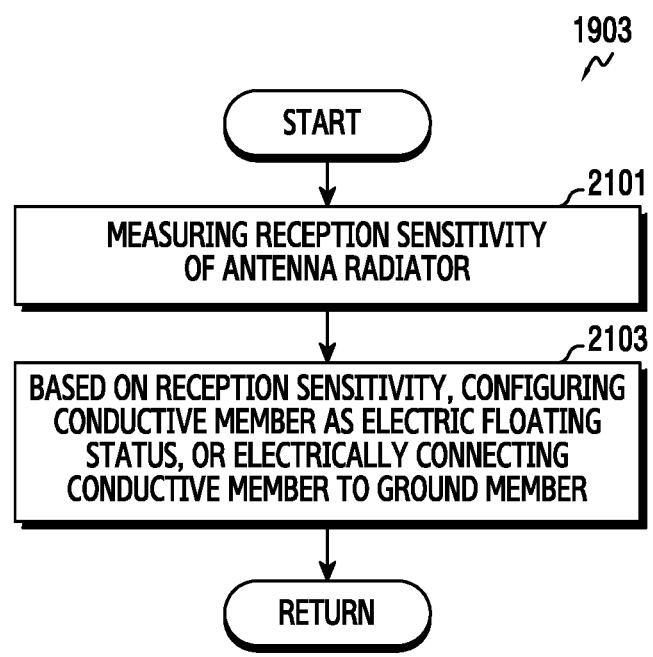
FIG. 21 is a flowchart of operation 1903 of FIG. 19 of selectively connecting a conductive member to a ground member according to an embodiment of the present disclosure.

FIG. 21 is a flowchart of operation 1903 of FIG. 19 of selectively connecting a conductive member to a ground member according to an embodiment of the present disclosure. The operation procedure of FIG. 21 is described below with reference to FIG. 4. In this case, the conductive member 410 may be a metal member that does not support communication.

In operation 2101, the control circuit 480 may measure a reception sensitivity of the antenna radiator 420.

In operation 2103, the control circuit 480 may selectively provide, based on the reception sensitivity, one of a first state, in which the conductive member 410 is configured as the electric floating status 490, and a second state, in which the conductive member 410 is electrically connected to the ground member 430. For example, if the reception sensitivity of the antenna radiator 420 is equal to or less than a reference, the control circuit 480 may provide the second state, in which the conductive member 410 is electrically connected to the ground member 430 (e.g., the PCB ground 580-G of FIG. 6).

Figure 22:
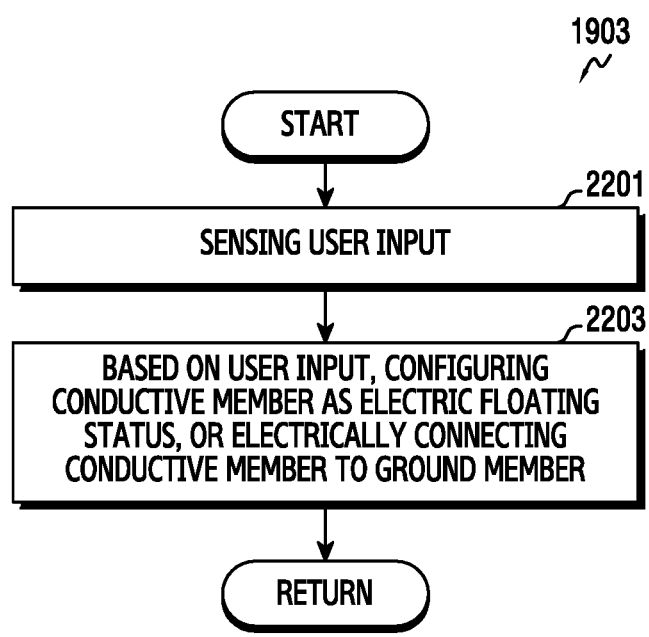
FIG. 22 is a flowchart of operation 1903 of FIG. 19 of selectively connecting a conductive member to a ground according to an embodiment of the present disclosure.

FIG. 22 is a flowchart of operation 1903 of FIG. 19 of selectively connecting a conductive member according to various embodiments of the present disclosure to a ground. The operation procedure of FIG. 22 is described below with reference to FIG. 4. In this case, the conductive member 410 may be a metal member that does not support communication.

Referring to FIG. 22, in operation 2201, the control circuit 480 may sense a user input. For example, the electronic device 400 may further include a user interface, and the control circuit 480 may sense a user input generated through the user interface.

In operation 2203, based on the user input, the control circuit 480 may make an adjustment such that the conductive member 410 is configured as the electric floating state, or is electrically connected to the ground member 430 (e.g., the PCB ground 580-G of FIG. 6).

For example, in a case where the electronic device 400 provides an antenna performance improvement mode, and the antenna performance improvement mode is activated by the user input, the control circuit 480 may selectively provide a first state, in which the conductive member 410 is configured as the electric floating status 490, or a second state, in which the conductive member 410 is electrically connected to the ground member 430. According to an embodiment of the present disclosure, in the antenna performance improvement mode, the control circuit 480 may selectively provide, depending on whether the user is positioned close to the electronic device 400, one of a first state, in which the one or more conductive members 410 are configured as the electric floating status 490, and a second state, in which the one or more conductive members 410 are electrically connected to the one or more ground members 430. In a case where it is sensed in the antenna performance improvement mode that the user is not positioned close to the electronic device 400, the control circuit 480 may provide a second state, in which at least one antenna radiator is electrically connected to the ground member 430. The control circuit 480 may selectively provide, based on the reception sensitivity of the one or more antenna radiators 420, one of a first state, in which at least one conductive member 410 is configured as the electric floating status 490, and a second state, in which the at least one conductive member 410 is electrically connected to the ground member 430.

For example, in a case where the electronic device 400 provides an SAR reduction mode, and the SAR reduction mode is activated by a user input, the control circuit 480 may selectively provide one of a first state, in which at least one conductive member 410 is configured as the electric floating status 490, and a second state, in which the conductive member 410 is electrically connected to at least one ground member 430. In the SAR reduction mode, the control circuit 480 may selectively provide, depending on whether the user is positioned close to the electronic device 400, one of a first state, in which at least one conductive member 410 is configured as the electric floating status 490, and a second state, in which the conductive member 410 is electrically connected to at least one ground member 430. In the SAR reduction mode, if it is sensed that the user is positioned close to the electronic device 400, the control circuit 480 may provide a first state, in which the at least one conductive member 410 is configured as the electric floating status 490.

For example, in a case where the electronic device 400 provides a wearing mode and the wearing mode is activated based on at least a part of a user input or information acquired from at least one sensor, the control circuit 480 may selectively provide one of a first state, in which at least one conductive member 410 is configured as the electric floating status 490, and a second state, in which the conductive member 410 is electrically connected to at least one ground member 430. For example, the wearing mode may include a watch mode that refers to a wrist-wearing mode of the electronic device 400 and a necklace mode that refers to a neck-wearing mode of the electronic device 400. In the wearing mode, the processor 480-1 may provide a first state, in which the one or more conductive members 410 are configured as the electric floating status 490.

Figure 23:
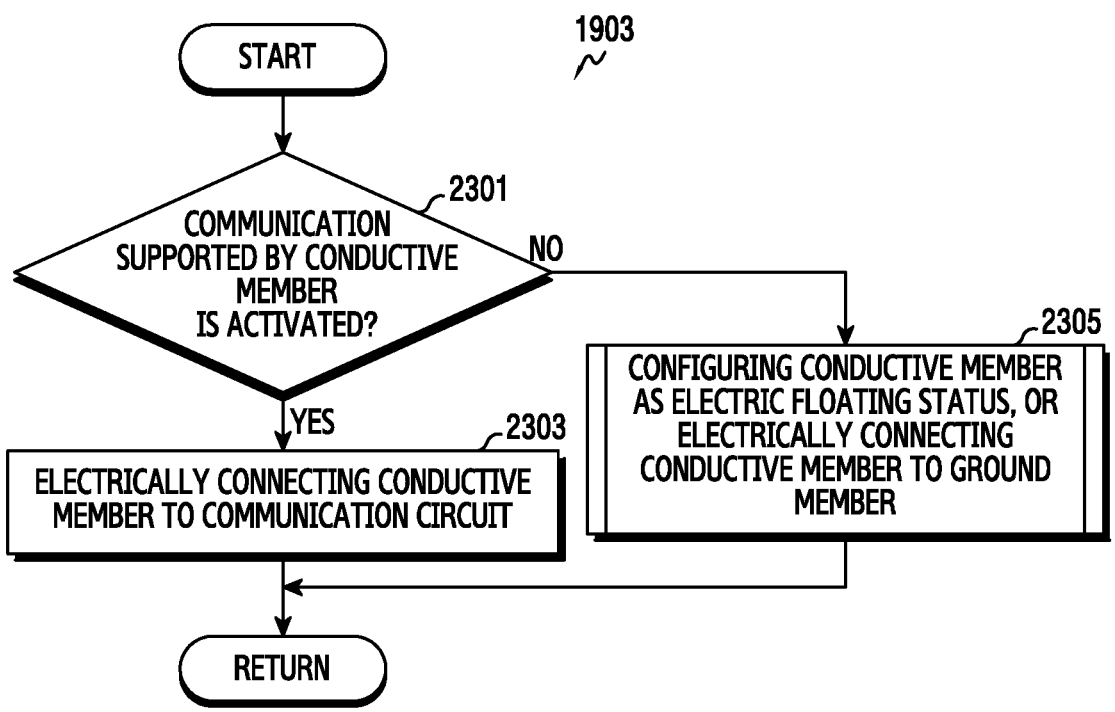
FIG. 23 is a flowchart of operation 1903 of FIG. 19 of selectively connecting a conductive member to a ground according to an embodiment of the present disclosure.

FIG. 23 is a flowchart of operation 1903 of FIG. 19 of selectively connecting a conductive member to ground according to an embodiment of the present disclosure. The operation procedure of FIG. 23 is described below with reference to FIG. 4. In this case, the conductive member 410 may be an antenna radiator that supports communication (e.g., short range communication or magnetic signal transmission/reception).

Referring to FIG. 23, in operation 2301, the control circuit 480 may confirm whether the communication supported by the conductive member 410 is set as the activation state. In the case where the communication supported by the conductive member 410 is set as the activation state, the control circuit 480 may perform operation 2303, or otherwise may perform operation 2305.

In operation 2303, the control circuit 480 may make an adjustment such that the conductive member 410 is electrically connected to the communication member 440. In the case where the conductive member 410 supports short range communication (e.g., NFC communication), and the short range communication is set as an activation state, the control circuit 480 may make an adjustment such that the conductive member 410 is electrically connected to the communication member 440 that supports the short range communication. For example, in the case where the conductive member 410 supports magnetic signal transmission/reception, and the magnetic signal transmission/reception is set as the activation state, the control circuit 480 may make an adjustment such that the conductive member 410 is electrically connected to the communication member 440 that supports the magnetic signal transmission/reception. In this case, the control circuit 480 may provide a first electric path configured to transmit a signal to the outside or to receive a signal from the outside between the conductive member 410 and the communication member 440.

In operation 2305, the control circuit 480 may selectively provide one of a first state, in which the conductive member 410 is configured as the electric floating status, and a second state, in which the conductive member 410 is electrically connected to the ground member 430 (e.g., the PCB ground 580-G of FIG. 6). For example, if the conductive member 410 is electrically connected to the ground member 430, the control circuit 480 may provide a second electric path configured such that the conductive member 410 is electrically connected to the ground member 430.

Figure 24:
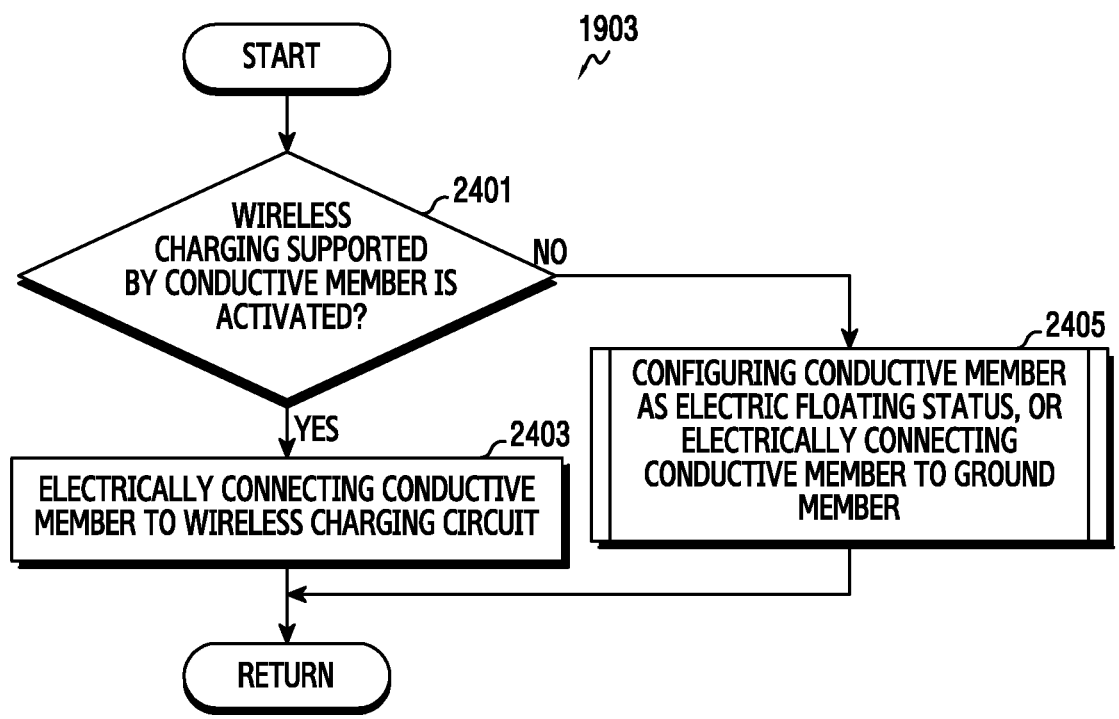
FIG. 24 is a flowchart of operation 1903 of FIG. 19 of selectively connecting a conductive member to a ground according to an embodiment of the present disclosure.

FIG. 24 is a flowchart of operation 1903 of FIG. 19 of selectively connecting a conductive member to a ground according to an embodiment of the present disclosure. The operation procedure of FIG. 23 is described below with reference to FIG. 4. In this case, the conductive member 410 may support wireless charging.

Referring to FIG. 24, in operation 2401, the control circuit 480 may confirm whether the wireless charging supported by the conductive member 410 is set as the activation state. In the case where the wireless charging supported by the conductive member 410 is set as the activation state, the control circuit 480 may perform operation 2403, or otherwise may perform operation 2405.

In operation 2403, the control circuit 480 may make an adjustment such that the conductive member 410 is electrically connected to the wireless charging circuit 450. In this case, the control circuit 480 may provide a third electric path configured to wirelessly receive power from the outside or to wirelessly transmit power to the outside between the conductive member 410 and the wireless charging circuit 450.

In operation 2405, the control circuit 480 may selectively provide one of a first state, in which the conductive member 410 is configured as the electric floating status, and a second state, in which the conductive member 410 is electrically connected to at least one ground member 430 (e.g., the PCB ground 580-G of FIG. 6).

Figure 25:
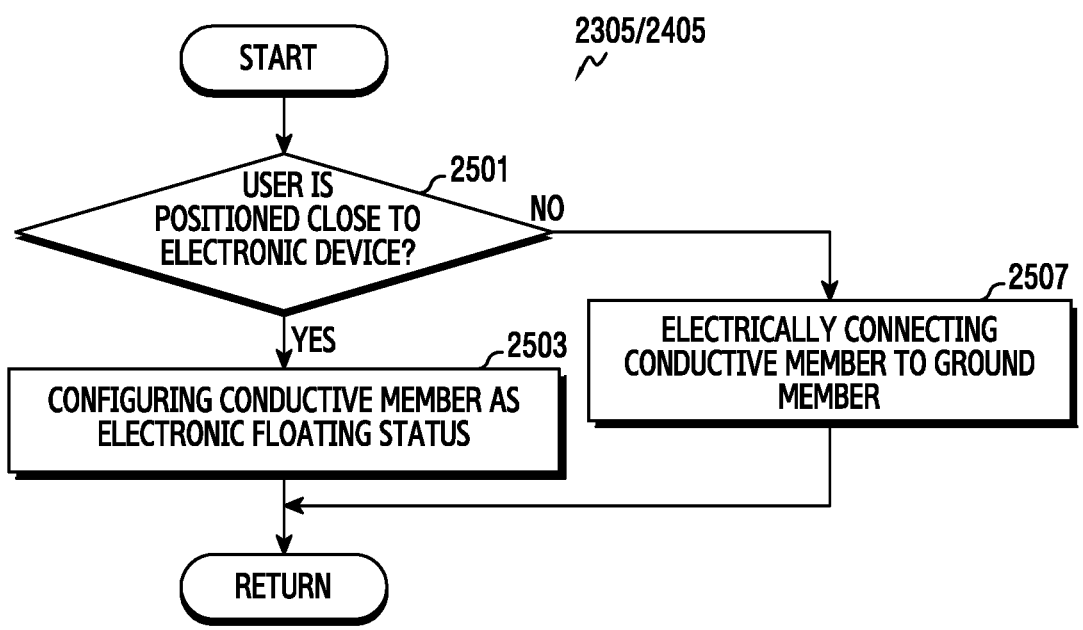
FIG. 25 is a flowchart of operation 2305 of FIG. 23 or operation 2405 of FIG. 24 of selectively connecting a conductive member to a ground member according to an embodiment of the present disclosure.

FIG. 25 is a flowchart of an operation procedure of operation 2305 of FIG. 23 or operation 2405 of FIG. 24 of selectively connecting a conductive member to a ground member according to an embodiment of the present disclosure. The operation procedure of FIG. 25 is described below with reference to FIG. 4.

Referring to FIG. 25, if a user is positioned close to the electronic device 400 in operation 2501, the control circuit 480 may sense this and may perform operation 2503.

In operation 2503, the control circuit 480 may make an adjustment such that the conductive member 410 is configured as the electric floating status 490.

If it is sensed that the user is not positioned close to the electronic device 400 in operation 2501, the control circuit 480 may sense this and may perform operation 2505.

In operation 2505, the control circuit 480 may make an adjustment such that the conductive member 410 is electrically connected to the ground member 430 (e.g., the PCB ground 580-G of FIG. 6).

Figure 26:
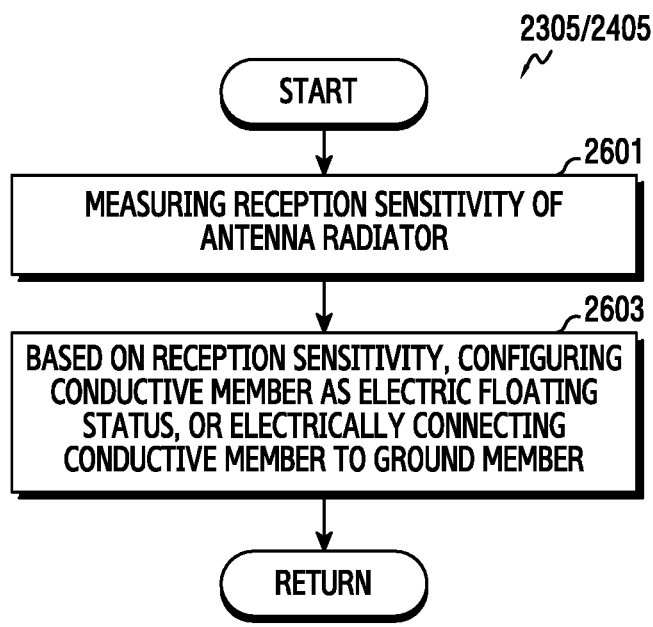
FIG. 26 is a flowchart of operation 2305 of FIG. 23 or operation 2405 of FIG. 24 of selectively connecting a conductive member to a ground member according to an embodiment of the present disclosure.

FIG. 26 is a flowchart of an operation procedure of operation 2305 of FIG. 23 or operation 2405 of FIG. 24 of selectively connecting a conductive member to a ground member according to an embodiment of the present disclosure. The operation procedure of FIG. 26 is described below with reference to FIG. 4.

In operation 2601, the control circuit 480 may measure a reception sensitivity of the antenna radiator 420.

In operation 2603, the control circuit 480 may selectively provide, based on the reception sensitivity, one of a first state, in which the conductive member 410 is configured as the electric floating status 490, and a second state, in which the conductive member 410 is electrically connected to the ground member 430 (e.g., the PCB ground 580-G of FIG. 6).

Figure 27:
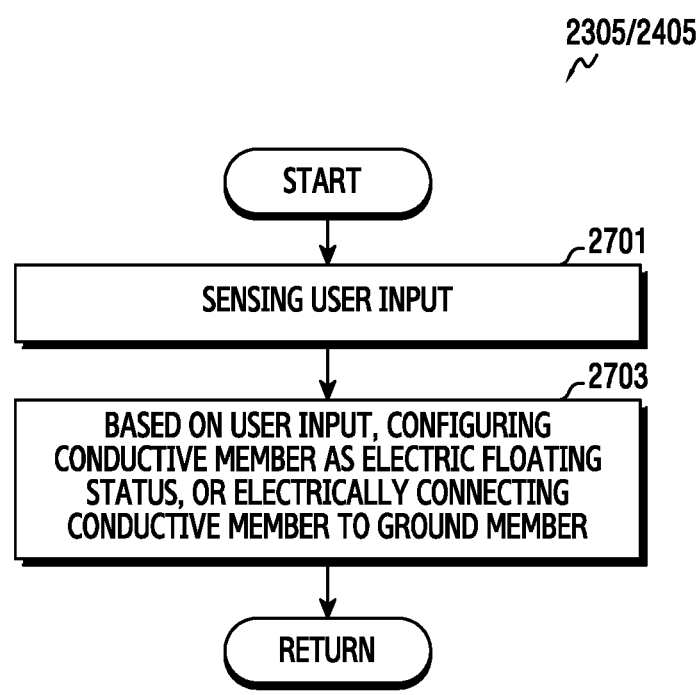
FIG. 27 is a flowchart of operation 2305 of FIG. 23 or operation 2405 of FIG. 24 of selectively connecting a conductive member to a ground member according to an embodiment of the present disclosure.

FIG. 27 is a flowchart of an operation procedure of operation 2305 of FIG. 23 or operation 2405 of FIG. 24 of selectively connecting a conductive member to a ground member according to an embodiment of the present disclosure. The operation procedure of FIG. 27 is described below with reference to FIG. 4.

Referring to FIG. 27, in operation 2701, the control circuit 480 may sense a user input. For example, the electronic device 400 may further include a user interface, and the control circuit 480 may sense a user input generated through the user interface.

In operation 2703, based on the user input, the control circuit 480 may make an adjustment such that the conductive member 410 is configured as the electric floating state, or is electrically connected to the ground member 430 (e.g., the PCB ground 580-G of FIG. 6).

Figure 28:
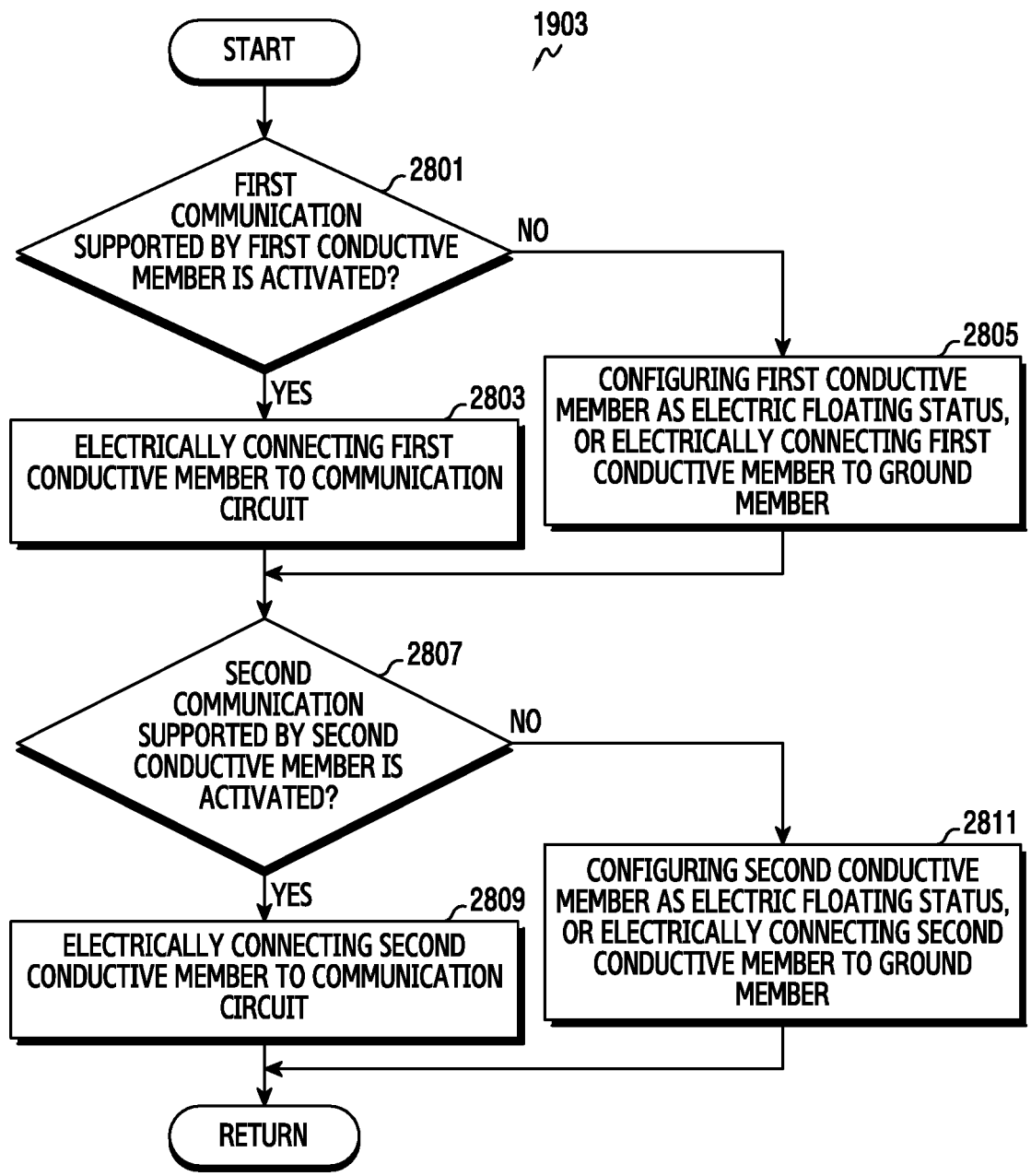
FIG. 28 is a flowchart of operation 1903 of FIG. 19 of selectively connecting a conductive member to a ground according to an embodiment of the present disclosure.

FIG. 28 is a flowchart of operation 1903 of FIG. 19 of selectively connecting a conductive member to a ground according to an embodiment of the present disclosure. The operation procedure of FIG. 28 is described below with reference to FIG. 4. In this case, the conductive member 410 may include a first conductive member that supports first communication (e.g., short range communication) and a second conductive member that supports a second communication (e.g., MST) that is different from the first communication.

In operation 2801, the control circuit 480 may confirm whether the first communication supported by the first conductive member of the conductive member 410 is set as the activation state. In the case where the first communication supported by the first conductive member of the conductive member 410 is set as the activation state, the control circuit 480 may perform operation 2803, or otherwise may perform operation 2805.

In operation 2803, the control circuit 480 may make an adjustment such that the first conductive member of the conductive member 410 is electrically connected to the communication member 440. For example, in the case where the first conductive member of the conductive member 410 supports short range communication (e.g., NFC communication), and the short range communication is set as the activation state, the control circuit 480 may make an adjustment such that the first conductive member of the conductive member 410 is electrically connected to the communication member 440 that supports the short range communication.

In operation 2805, the control circuit 480 may selectively provide one of a first state, in which the first conductive member of the conductive member 410 is configured as the electric floating status, and a second state, in which the first conductive member of the conductive member 410 is electrically connected to the ground member 430 (e.g., the PCB ground 580-G of FIG. 6).

In operation 2807, the control circuit 480 may confirm whether the second communication supported by the second conductive member of the conductive member 410 is set as the activation state. In the case where the second communication supported by the second conductive member of the conductive member 410 is set as the activation state, the control circuit 480 may perform operation 2809, or otherwise may perform operation 2811.

In operation 2809, the control circuit 480 may make an adjustment such that the second conductive member of the conductive member 410 is electrically connected to the communication member 440. For example, in the case where the second conductive member of the conductive member 410 supports MST, and the MST is set as the activation state, the control circuit 480 may make an adjustment such that the second conductive member of the conductive member 410 is electrically connected to the communication member 440 that supports the magnetic signal transmission/reception.

In operation 2811, the control circuit 480 may selectively provide one of a first state, in which the second conductive member of the conductive member 410 is configured as the electric floating status, and a second state, in which the second conductive member of the conductive member 410 is electrically connected to the ground member 430 (e.g., the PCB ground 580-G of FIG. 6).

According to an embodiment of the present disclosure, operation 2805 and/or operation 2811 may be performed through the operation procedure of at least one of FIGS. 25 to 27 described above.

Figure 29:
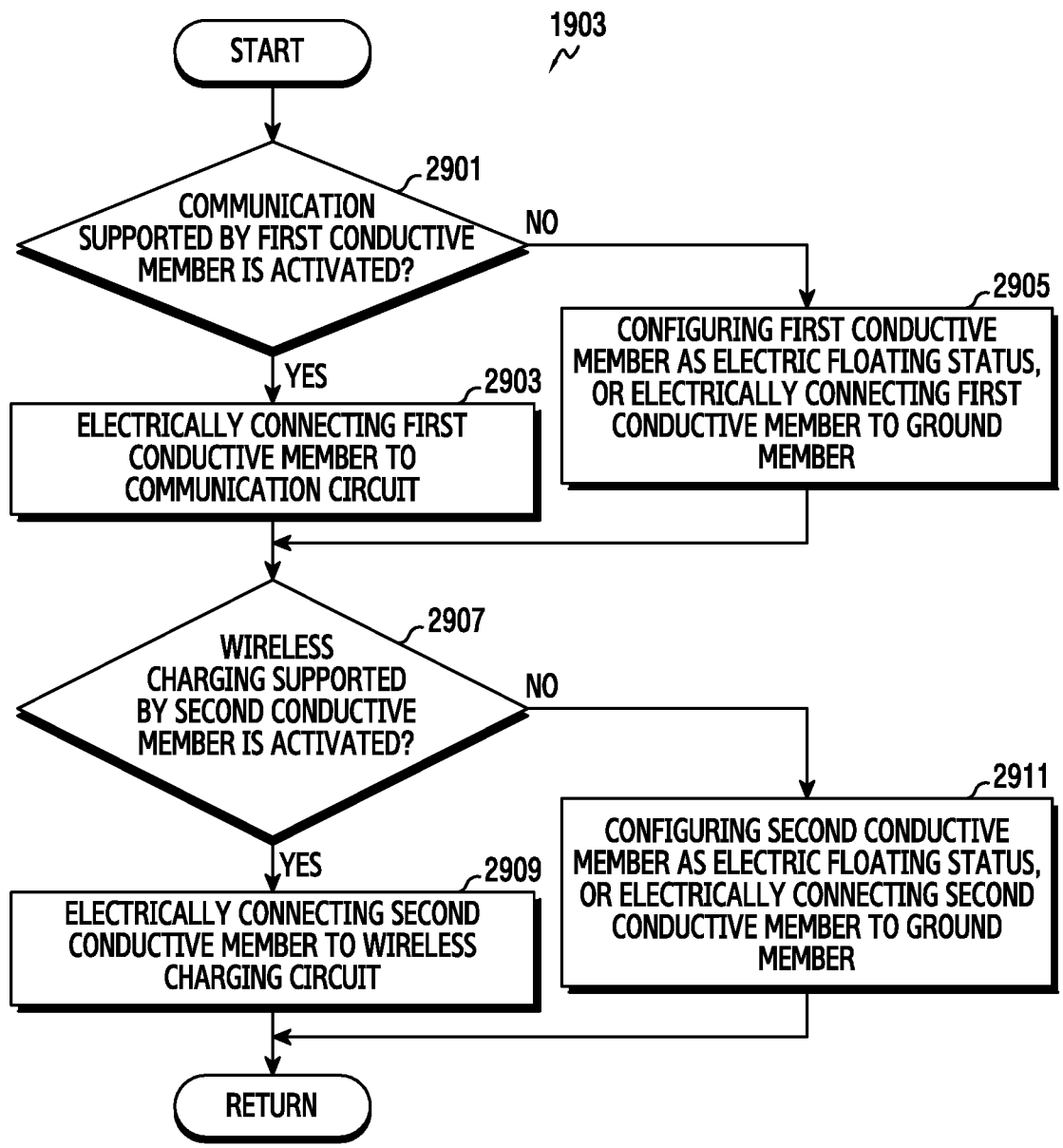
FIG. 29 is a flowchart of operation 1903 of FIG. 19 of selectively connecting a conductive member to a ground according to an embodiment of the present disclosure.

FIG. 29 is a flowchart of operation 1903 of FIG. 19 of selectively connecting a conductive member to a ground according to an embodiment of the present disclosure. The operation procedure of FIG. 29 is described below with reference to FIG. 4. In this case, the conductive member 410 may include a first conductive member that supports communication (e.g., short range communication or magnetic signal transmission/reception) and a second conductive member that supports wireless charging.

In operation 2901, the control circuit 480 may confirm whether the communication supported by the first conductive member of the conductive member 410 is set as the activation state. In the case where the communication supported by the first conductive member of the conductive member 410 is set as the activation state, the control circuit 480 may perform operation 2903, or otherwise may perform operation 2905.

In operation 2903, the control circuit 480 may make an adjustment such that the first conductive member of the conductive member 410 is electrically connected to the communication member 440. For example, in the case where the first conductive member of the conductive member 410 supports short range communication (e.g., NFC communication), and the short range communication is set as the activation state, the control circuit 480 may make an adjustment such that the first conductive member of the conductive member 410 is electrically connected to the communication member 440 that supports the short range communication. For example, in the case where the first conductive member of the conductive member 410 supports MST, and the MST is set as the activation state, the control circuit 480 may make an adjustment such that the first conductive member of the conductive member 410 is electrically connected to the communication member 440 that supports the magnetic signal transmission/reception.

In operation 2905, the control circuit 480 may selectively provide one of a first state, in which the first conductive member of the conductive member 410 is configured as the electric floating status, and a second state, in which the first conductive member of the conductive member 410 is electrically connected to the ground member 430 (e.g., the PCB ground 580-G of FIG. 6).

In operation 2907, the control circuit 480 may confirm whether the wireless charging supported by the second conductive member of the conductive member 410 is set as the activation state. In the case where the wireless charging supported by the second conductive member of the conductive member 410 is set as the activation state, the control circuit 480 may perform operation 2909, or otherwise may perform operation 2911.

In operation 2909, the control circuit 480 may make an adjustment such that the second conductive member of the conductive member 410 is electrically connected to the wireless charging circuit 450.

In operation 2911, the control circuit 480 may selectively provide one of a first state, in which the second conductive member of the conductive member 410 is configured as the electric floating status, and a second state, in which the second conductive member of the conductive member 410 is electrically connected to the ground member 430 (e.g., the PCB ground 580-G of FIG. 6).

According to an embodiment of the present disclosure of the present disclosure, operation 2905 and/or operation 2911 may be performed through the operation procedure of at least one of FIGS. 25 to 27 described above.

FIGS. 30AA to 30CB illustrate an influence by a human body depending on whether a conductive member according to various embodiments of the present disclosure is used.

Referring to FIGS. 30AA and 30AB, an electronic device 3000-1 may include a display 3090-1, an antenna radiator 3020-1, and a PCB 3080-1. The PCB 3080-1 may include a power feeding unit and a PCB ground 3080-1G The antenna radiator 3020-1 may be electrically connected to the power feeding unit and the PCB ground 3080-1G of the PCB 3080-1. In this case, the electronic device 3000-1 may not include a conductive member (e.g., the conductive member 410 of FIG. 4).

According to an embodiment of the present disclosure, if a user is positioned close to the electronic device 3000-1, electromagnetic waves generated from the antenna radiator 3020-1 may have an influence on the user's body. For example, an antenna radiating performance may be deteriorated by being affected by the user's body.

Referring to FIGS. 30BA and 30BB, an electronic device 3000-2 may include a display 3090-2, an antenna radiator 3020-2, a PCB 3080-2, and a conductive member 3010-2. The PCB 3080-1 may include a power feeding unit (not illustrated) and a PCB ground 3080-2G. The antenna radiator 3020-2 may be electrically connected to the power feeding unit and the PCB ground 3080-2G of the PCB 3080-2. In this case, the PCB ground 3080-2G may be used as an antenna ground for the resonance of the antenna radiator 3020-2.

According to an embodiment of the present disclosure, the conductive member 3010-2 may be configured as an electric floating status (e.g., the electric floating status 490 of FIG. 4).

According to an embodiment of the present disclosure, the conductive member 3010-2 may be a metal member that does not support communication (e.g., short range communication or magnetic signal transmission/reception). Alternatively, the conductive member 3010-2 may be a metal member that does not support wireless charging.

According to an embodiment of the present disclosure, the conductive member 3010-2 may be an antenna radiator that supports communication (e.g., short range communication or magnetic signal transmission/reception). In this case, if the communication supported by the conductive member 3010-2 is set as a deactivation state, the conductive member 3010-2 may be configured as the electric floating status without being electrically connected to a corresponding communication circuit (e.g., the communication member 440 of FIG. 4).

According to an embodiment of the present disclosure, the conductive member 3010-2 may be a wireless charging coil that supports wireless charging. In this case, if the wireless charging supported by the conductive member 3010-2 is set as a deactivation state, the conductive member 3010-2 may be configured as the electric floating status without being electrically connected to a wireless charging circuit (e.g., the wireless charging circuit 450 of FIG. 4).

According to an embodiment, if the user is positioned close to the electronic device 3000-2, the conductive member 3010-2 in the electric floating state may reduce the influence on the user's body affected by the electromagnetic waves generated from the antenna radiator 3020-2. For example, the conductive member 3010-2 configured as the electric floating state may reduce the SAR related to the electronic device 3000-2.

According to an embodiment of the present disclosure, if the user is positioned close to the electronic device 3000-2, the conductive member 3010-2 in the electric floating state may support the maintaining of the antenna radiating performance of the antenna radiator 3020-2. For example, the electronic device 3000-2 may be a wearable electronic device, and the electronic device 3000-2 may be designed to have a desired antenna radiating performance in a state where the electronic device 3000-2 is worn on a user's body. In a case where the electronic device 3000-2 is in the state of being worn on a user's body, the conductive member 3010-2 may be configured as the electric floating state to support the maintaining antenna radiating performance. Alternatively, the conductive member 3010-2 in the electric floating state may improve the influence of electromagnetic waves on the user's body.

Referring to FIGS. 30CA and 30CB, an electronic device 3000-3 according to an embodiment of the present disclosure may include a display 3090-3, an antenna radiator 3020-3, a PCB 3080-3, and a conductive member 3010-3. The PCB 3080-3 may include a power feeding unit and a PCB ground 3080-3G. The antenna radiator 3020-3 may be electrically connected to the power feeding unit and the PCB ground 3080-3G of the PCB 3080-3.

According to an embodiment of the present disclosure, the conductive member 3010-3 may be electrically connected to the PCB ground 3080-3G. In this case, the conductive member 3010-3 may be used as an antenna ground for the resonance of the antenna radiator 3020-3 together with the PCB ground 3080-3G.

According to an embodiment of the present disclosure, the conductive member 3010-3 may be a metal member that does not support communication (e.g., short range communication or magnetic signal transmission/reception). Alternatively, the conductive member 3010-3 may be a metal member that does not support wireless charging.

According to an embodiment of the present disclosure, the conductive member 3010-3 may be an antenna radiator that supports communication (e.g., short range communication or magnetic signal transmission/reception). In this case, if the communication supported by the conductive member 3010-3 is set as a deactivation state, the conductive member 3010-3 may be electrically connected to the PCB ground 3080-3G without being electrically connected to a corresponding communication circuit (e.g., the communication member 440 of FIG. 4).

According to an embodiment of the present disclosure, the conductive member 3010-3 may be a wireless charging coil that supports wireless charging. In this case, if the wireless charging supported by the conductive member 3010-3 is set as a deactivation state, the conductive member 3010-3 may be electrically connected to the PCB ground 3080-3G without being electrically connected to a corresponding wireless charging circuit (e.g., the wireless charging circuit 450 of FIG. 4).

According to an embodiment of the present disclosure, if the user is positioned close to the electronic device 3000-3, the conductive member 3010-3, which is electrically connected to the PCB ground 3080-3G, may reduce the influence on a user's body affected by the electromagnetic waves generated from the antenna radiator 3020-3. For example, the deterioration of the antenna radiating performance, which is caused by being positioned close to a user's body, may be reduced.

According to an embodiment of the present disclosure, if a user is positioned close to the electronic device 3000-3, the conductive member 3010-3 in the electric floating state may support the maintaining the antenna radiating performance of the antenna radiator 3020-3. For example, as described above with reference to FIGS. 30BA and 30BB, the electronic device 3000-2 may be a wearable electronic device, and the electronic device 3000-2 may be designed to have a desired antenna radiating performance in a state where the electronic device 3000-2 is worn on a user's body. If the electronic device 3000-2 is changed to a state where the electronic device 3000-2 is not worn on the user's body, the user's body as a potential body is spaced away from the electronic device 3000-2 and the electrical length of the antenna radiator 3020-2 is reduced to have a relatively high resonance frequency, which may cause the performance deterioration of the antenna device. In a case where the electronic device 3000-3 is in the state of not being worn on the user's body, the conductive member 3010-3 may be electrically connected to the PCB ground 3080-3G to reduce the deterioration of the above-mentioned antenna radiating performance. Even in a state where the electronic device 3000-3 is not worn on a user's body, the antenna performance may be maintained.

FIGS. 31AA to 31CC are views and diagrams of maintaining an antenna performance by using a conductive member according to embodiments of the present disclosure.

Referring to FIGS. 31AA to 31BC, an electronic device 3100-11 may include a display 3190-11, an antenna radiator 3120-11, a PCB 3180-11, and a conductive member 3110-11. The PCB 3180-11 may include a power feeding unit and a PCB ground 3180-11G. The antenna radiator 3120-11 may be electrically connected to the power feeding unit and the PCB ground 3180-11G of the PCB 3180-11.

According to an embodiment of the present disclosure, the conductive member 3110-11 may be configured as an electric floating status. In this case, the conductive member 3110-11 may be a metal member that does not support communication (e.g., short range communication or magnetic signal transmission/reception). Alternatively, the conductive member 3110-11 may be a metal member that does not support wireless charging.

An electronic device 3100-12 according to an embodiment of the present disclosure may include a display 3190-12, an antenna radiator 3120-12, a PCB 3180-12, and a conductive member 3110-12. The PCB 3180-12 may include a power feeding unit and a PCB ground 3180-12G The antenna radiator 3120-12 may be electrically connected to the power feeding unit and the PCB ground 3180-12G of the PCB 3180-12.

According to an embodiment of the present disclosure, the conductive member 3110-12 may be an antenna radiator that supports communication (e.g., short range communication or magnetic signal transmission/reception). For example, if the communication supported by the conductive member 3110-12 is set as a deactivation state, the conductive member 3110-12 may be configured as the electric floating status without being electrically connected to a corresponding communication circuit (e.g., the communication member 440 of FIG. 4).

According to an embodiment of the present disclosure, the conductive member 3110-12 may be a wireless charging coil that supports wireless charging. In this case, if the wireless charging supported by the conductive member 3110-12 is set as a deactivation state, the conductive member 3110-12 may be configured as the electric floating status without being electrically connected to a wireless charging circuit (e.g., the wireless charging circuit 450 of FIG. 4).

Referring to FIGS. 31AA to 31AC, in the state where a user is positioned close to the electronic device 3100-11 or 3100-12, the conductive member 3110-11 or 3110-12 may be configured as an electric floating state. For example, the electronic device 3100-11 or 3100-12 may be a wearable electronic device. The electronic device 3100-11 or 3100-12 may be designed to have a desired antenna radiating performance in a state where the electronic device 3100-11 or 3100-12 is worn on the user's body, and thus, the conductive member 3110-11 or 3110-12 may be configured as an electric floating status to support the maintaining of the antenna performance.

Referring to FIGS. 31BA to 31BC, if the conductive member 3110-11 or 3110-12 is changed to a state, in which the electronic device 3100-11 or 3100-12 is not positioned close to the user from a state where the conductive member 3110-11 or 3110-12 is configured as an electric floating status, the antenna radiating performance may be deteriorated. For example, in the state where the user body is positioned close to the electronic device 3100-11 or 3100-12, the conductive member 3110-11 or 3110-12 may be designed to be configured as an electric floating status in order to secure the antenna radiating performance. If the conductive member 3110-11 or 3110-12 is changed to a state, in which the electronic device 3100-11 or 3100-12 is not positioned close to the user from a state where the conductive member 3110-11 or 3110-12 is configured as an electric floating status, the user body as a potential body is spaced away from the electronic device 3100-11 or 3100-12, which may deteriorate the antenna radiating performance. For example, if the conductive member 3110-11 or 3110-12 is changed to a state, in which the electronic device 3100-11 or 3100-12 is not positioned close to the user from a state where the conductive member 3110-11 or 3110-12 is configured as an electric floating status, a frequency shift may be caused.

Referring to FIGS. 31CA to 31CC, an electronic device 3100-21 according to an embodiment of the present disclosure may include a display 3190-21, an antenna radiator 3120-21, a PCB 3180-21, and a conductive member 3110-21. The PCB 3180-21 may include a power feeding unit and a PCB ground 3180-21G. The antenna radiator 3120-21 may be electrically connected to the power feeding unit and the PCB ground 3180-21G of the PCB 3180-21.

According to an embodiment of the present disclosure, the conductive member 3110-21 may be electrically connected to the PCB ground 3180-21G. The conductive member 3110-21 may be used as an antenna ground for the resonance of the antenna radiator 3120-21 with the PCB ground 3180-21G. In this case, the conductive member 3110-21 may be a metal member that does not support communication (e.g., short range communication or magnetic signal transmission/reception). Alternatively, the conductive member 3110-21 may be a metal member that does not support wireless charging.

An electronic device 3100-22 according to an embodiment of the present disclosure may include a display 3190-22, an antenna radiator 3120-22, a PCB 3180-22, and a conductive member 3110-22. The PCB 3180-22 may include a power feeding unit and a PCB ground 3180-22G The antenna radiator 3120-22 may be electrically connected to the power feeding unit and the PCB ground 3180-22G of the PCB 3180-22.

According to an embodiment of the present disclosure, the conductive member 3110-22 may be electrically connected to the PCB ground 3180-22G. The conductive member 3110-22 may be used as an antenna ground for the resonance of the antenna radiator 3120-22 with the PCB ground 3180-22G.

According to an embodiment of the present disclosure, the conductive member 3110-22 may be an antenna radiator that supports communication (e.g., short range communication or magnetic signal transmission/reception). For example, if the communication supported by the conductive member 3110-22 is set as a deactivation state, the conductive member 3110-22 may be configured to be electrically connected to the PCB ground 3180-22G without being electrically connected to a corresponding communication circuit (e.g., the communication member 440 of FIG. 4).

According to an embodiment of the present disclosure, the conductive member 3110-22 may be a wireless charging coil that supports wireless charging. In this case, if the wireless charging supported by the conductive member 3110-22 is set as a deactivation state, the conductive member 3110-22 may be configured to be electrically connected to the PCB ground 3180-22G without being electrically connected to a corresponding wireless charging circuit (e.g., the wireless charging circuit 450 of FIG. 4).

According to an embodiment of the present disclosure, the conductive member 3110-21 or 3110-22 may be electrically connected to a PCB ground 3180-21G or 3180-22G to be used as an additional antenna ground, thereby supporting the maintaining of the antenna radiating performance of the antenna radiator 3120-21 or 3120-22. As described above, referring to FIGS. 31BA to 31BC, if the conductive member 3110-11 or 3110-12 is changed to a state, in which the electronic device 3100-11 or 3100-12 is not positioned close to the user from a state where the conductive member 3110-11 or 3110-12 is configured as the electric floating status, the antenna radiating performance may be deteriorated. If the electronic device 3100-21 or 3100-22 is changed to a state where the electronic device 3100-21 or 3100-22 is not positioned close to a user, the electronic device 3100-21 or 3100-22 may make an adjustment such that the conductive member 3110-21 or 3110-22 is configured as an additional antenna ground in the electric floating status to maintain the antenna performance.

According to an embodiment of the present disclosure, a method of operating an electronic device may include electrically connecting the antenna radiator of the electronic device and the communication circuit; and selectively connecting the conductive member of the electronic device to the ground member.

According to an embodiment of the present disclosure, the operation of selectively connecting the conductive member to the ground member may be configured to selectively provide one of a first state, in which the antenna radiator is electrically connected to the ground member, but is not electrically connected to the conductive member; and a second state, in which the antenna radiator is electrically connected to the ground member and the conductive member.

According to an embodiment of the present disclosure, the operation of selectively connecting the conductive member to the ground member may include determining whether the electronic device is positioned close to a user; and selectively providing one of the first state and the second state based on the determining.

According to an embodiment of the present disclosure, the operation of selectively connecting the conductive member to the ground member may include monitoring a reception sensitivity of the antenna radiator; and selectively providing one of the first state and the second state at least partially based on the monitored reception sensitivity.

According to an embodiment of the present disclosure, the operation of selectively connecting the conductive member to the ground member may include receiving a user input; and selectively providing one of the first state and the second state based on the user input.

According to an embodiment of the present disclosure, the method of operating an electronic device may further include providing an electrical path including at least a portion of the conductive member and configured to transmit a signal to the outside or to receive a signal from outside in the first state; and wirelessly receiving power from the outside, performing short range communication with an external device, performing an NFC communication externally, or performing communication based on the magnetic signal externally by using the electrical path.

Each of the above-described component elements of hardware according to the present disclosure may be configured with one or more components, and the names of the corresponding component elements may vary based on the type of electronic device. In an embodiment of the present disclosure, an electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Various embodiments of the present disclosure disclosed in this specification and the accompanying drawings are merely examples presented in order to describe the present disclosure and to facilitate understanding of the present disclosure, but are not intended to limit the scope of the present disclosure. Therefore, it is intended that the present disclosure be construed that, in addition to the embodiments disclosed herein, all modifications and changes or modified and changed forms derived from the the present disclosure fall within the scope of the present disclosure, as defined by the appended claims and their equivalents.

What is claimed is:

1. A portable communication device, comprising:
a housing forming at least one portion of a surface of the portable communication device, wherein the at least one portion of the surface includes a first surface and a second surface that faces in a direction opposite to the first surface;
a display at least partially housed in the housing and including a display area visible via at least one portion of the first surface;
a radiating element at least partially forming the first surface, wherein the radiating element has a substantially circular shape;
a ground element disposed between the first surface and the second surface;
another radiating element electrically connected with the ground element, a conductive element;
wireless communication circuitry electrically connected with the radiating element and configured to establish a communication connection with an external electronic device; and
a processor configured to:
electrically connect the conductive element with the ground element if a radiation characteristic relative to the radiating element satisfies a specified condition; and
electrically disconnect the conductive element with the ground element if the radiation characteristic does not satisfy the specified condition.

2. The portable communication device of claim 1, wherein the processor is further configured to:
perform the connecting of the conductive element based at least in part on a determination that the communication connection corresponds to a specified frequency band as at least part of the specified condition.

3. The portable communication device of claim 1, further comprising a switch configured to connect the conductive element with the ground element, and wherein the switch is configured to selectively connect the conductive element with the ground element based at least in part on a control signal generated by the processor in relation with the radiation characteristic.

4. The portable communication device of claim 1, further comprising a printed circuit board (PCB), wherein the conductive element is separated from the PCB on which the processor and the ground element are mounted.

5. The portable communication device of claim 4, wherein the conductive element is electrically connected with the PCB, as at least part of the connecting of the conductive element.

6. The portable communication device of claim 4, wherein the PCB is electrically connected with the radiating element using a feeding element mounted on the PCB, and wherein the radiating element is selectively electrically connected with the ground element using another conductive element.

7. The portable communication device of claim 6, wherein the another conductive element comprises a C-clip, and
wherein the radiation characteristic relative to the radiating element is changed based at least in part on a determination that the ground element is electrically disconnected with the radiating element while the feeding element is electrically connected with the radiating element.

8. The portable communication device of claim 1, wherein the processor is further configured to:
identify, as at least part of the radiation characteristic, a frequency band supported by the wireless communication circuitry, a diversity or a radiation efficiency of the radiating element, a resonance frequency of the frequency band, or any combination thereof.

9. The portable communication device of claim 1, wherein the conductive element is configured to be operable to radiate a wireless signal corresponding to another communication connection.

10. The portable communication device of claim 9, wherein the another communication connection comprises a cellular communication connection, a wireless charging connection, a wireless local area network connection, a near field communication connection, a global navigation satellite system connection, or a global positioning system connection.

11. The portable communication device of claim 1, wherein the conductive element comprises a metal plate, a coil, or an annular metal member.

12. The portable communication device of claim 1, further comprising a non-conductive cover forming at least one portion of the second surface, wherein at least one portion of the conductive element is disposed in the non-conductive cover.

13. A portable communication device, comprising:
a housing configured to form at least one portion of a surface of the portable communication device, wherein the at least one portion of the surface includes a first surface and a second surface that faces in a direction opposite to the first surface;
a display at least partially housed in the housing and including a display area visible via at least one portion of the first surface;
a radiating element at least partially forming at least one portion of the first surface;
a printed circuit board (PCB) including a ground element;
another radiating element electrically connected with the ground element;
a conductive element;
a processor configured to transmit a control signal; and
a switch configured to selectively electrically connect the conductive element with the ground element based at least in part on the control signal.

14. The portable communication device of claim 13, wherein the processor is further configured to:
perform the transmitting based at least in part on a selection of a frequency band selected from a plurality of frequency bands.

15. The portable communication device of claim 13, wherein the conductive element comprises a loop antenna.

16. The portable communication device of claim 13, wherein the radiating element is configured to form a substantially circular shape.

17. The portable communication device of claim 13, wherein the conductive element comprises a coil to receive wireless power.

18. The portable communication device of claim 13, wherein the processor is further configured to:
detect an accessory attached to the portable communication device, wherein the accessory includes the another conductive element; and
selectively electrically connect the ground element with the other conductive element based at least in part on detecting the accessory.

19. A wearable electronic device, comprising:
a display including a display area visible via at least one portion of a front surface of the wearable electronic device;
a radiating element at least partially surrounding the at least one portion of the front surface;
a printed circuit board (PCB) including a ground element;
another radiating element electrically connected with the ground element;
a conductive element electrically connected with the radiating element;
a processor configured to transmit a control signal; and
a switch adapted to selectively electrically connect the conductive element with the ground element based at least in part on the control signal.

* * * * *